US012737645B2

(12) United States Patent
Narayanan et al.

(10) Patent No.: US 12,737,645 B2
(45) Date of Patent: Sep. 15, 2026

(54) GRAPH-BASED MACHINE LEARNING MODEL WITH FEATURE-AGNOSTIC TRAINING AND HOLISTIC FEATURE METRICS

(71) Applicant: Optum Services (Ireland) Limited, Dublin (IE)

(72) Inventors: Premnath Kandhasamy Narayanan, Athione (IE); David S. Monaghan, Dublin (IE); Brian Carter, Dublin (IE); Amirhossein Yazdavar, Scottsdale, AZ (US); Triet Pham, Eden Prairie, MN (US)

(73) Assignee: Optum Services (Ireland) Limited, Dublin (IE)

( * ) Notice: Subject to any disclaimer, the term of this patent is extended or adjusted under 35 U.S.C. 154(b) by 661 days.

(21) Appl. No.: 18/178,047

(22) Filed: Mar. 3, 2023

(65) Prior Publication Data

US 2024/0256832 A1 Aug. 1, 2024

Related U.S. Application Data

(60) Provisional application No. 63/479,874, filed on Jan. 13, 2023.

(51) Int. Cl.
*G06N 5/022* (2023.01)
*G06N 3/045* (2023.01)
(Continued)

(52) U.S. Cl.
CPC ............ *G06N 5/022* (2013.01); *G06N 3/045* (2023.01); *G06N 3/08* (2013.01); *G06N 20/00* (2019.01)

(58) Field of Classification Search
None
See application file for complete search history.

(56) References Cited

U.S. PATENT DOCUMENTS 11,256,989 B2 2/2022 Dalli et al.
11,263,550 B2 3/2022 Vasconcelos et al.
(Continued)

OTHER PUBLICATIONS

Dai et al., Say No to the Discrimination: Learning Fair Graph Neural Networks with Limited Sensitive Attribute Information, WSDM' 21, Mar. 8-12, 2021, Virtual Event, Israel; pp. 680-688 (Year: 2021).*

(Continued)

*Primary Examiner* — Alan Chen
(74) *Attorney, Agent, or Firm* — Alston & Bird LLP

(57) ABSTRACT

Various embodiments of the present disclosure describe data evaluation techniques that leverage a graph-based machine learning model to evaluate a knowledge graph. The techniques include using a target graph model to generate a predictive representation for a graph node of a graph training dataset. The techniques include using a feature prediction model to generate predicted feature values for the graph node based on the predictive representation. The techniques include generating a data evaluation score for the graph training dataset based on the predicted feature values. The techniques include using the target graph model to generate a predictive output for the graph node based on the predictive representation and then generating an evaluation output for the target graph model based on the evaluation score and the predictive output.

20 Claims, 13 Drawing Sheets

(51) Int. Cl.
*G06N 3/08* (2023.01)
*G06N 20/00* (2019.01)

(56) References Cited

U.S. PATENT DOCUMENTS

| | | | |
|---|---|---|---|
| 2020/0364859 A1 | 11/2020 | Najarian et al. |
| 2021/0073627 A1 | 3/2021 | Sarferaz |
| 2021/0357316 A1 | 11/2021 | Chang et al. |
| 2021/0406727 A1 | 12/2021 | Wang et al. |
| 2022/0114399 A1 | 4/2022 | Castiglione et al. |
| 2022/0129794 A1 | 4/2022 | McGrath et al. |
| 2022/0318639 A1 | 10/2022 | Upadhyay et al. |
| 2022/0318640 A1 | 10/2022 | Malur Srinivasan et al. |
| 2023/0074606 A1 | 3/2023 | Jesus et al. |

OTHER PUBLICATIONS

Fan et al., Debiasing Graph Neural Networks via Learning Disentangled Causal Substructure; arXiv:2209.14107v1 [cs. LG] Sep. 28, 2022; Total p. 18 (Year: 2022).*

Dong et al., EDITS: Modeling and Mitigating Data Bias for Graph Neural Networks; arXiv:2108.05233v2 [cs.LG] Feb. 19, 2022; Total p. 11 (Year: 2022).*

Linardatos et al., Explainable AI: A Review of Machine Learning Interpretability Methods; Entropy 2021, 23, 18. https://dx.doi.org/10.3390/e23010018; Total p. 45 (Year: 45).*

"MDClone—The World's Most Powerful Healthcare Data Platform," (Year: 2023), (6 pages), [Retrieved from the Internet May 12, 2023] <URL: https://www.mdclone.com/>.

"Safely Incorporate Generative AI Into Your Data." Gretel, Aug. 27, 2018, (6 pages), [Retrieved from the Internet May 12, 2023] <URL: https://gretel.ai/>.

"Synthetic Data For Machine Learning: Its Nature, Types, and Means of Generation," Altexsoft, Mar. 22, 2022, (18 pages), [Retrieved from the Internet May 12, 2023] <URL: https://www.altexsoft.com/blog/synthetic-data-generation/>.

"Text Generation API," DeepAI, (10 pages), (online), [Retrieved from the Internet May 12, 2023] <URL: https://deepai.org/machine-learning-model/text-generator>.

"What is an EDI 837?" TrueCommerce, May 4, 1997, (6 pages), [Retrieved from the Internet May 12, 2023] <URL: https://www.truecommerce.com/edi-transaction-codes/edi-837>.

"What is X12?" X12, Oct. 19, 1998, (8 pages), [Retrieved from the Internet May 12, 2023] <URL: https://x12.org/>.

Anderson, Lydia et al. "Census Bureau Survey Explores Sexual Orientation and Gender Identity," United States Census Bureau, Nov. 4, 2021, (8 pages), available online: https://www.census.gov/library/stories/2021/11/census-bureau-survey-explores-sexual orientation-and-gender-identity.html.

Barry, Laurence et al. "The Fairness of Machine Learning In Insurance: New Rags for an Old Man?" arXiv:2205.08112v1 [econ. GN], May 17, 2022, pp. 1-18, available online: https://arxiv.org/abs/2205.08112.

Bommasani, Rishi et al. "On The Opportunities and Risks of Foundation Models," Center for Research on Foundation Models (CRFM), arXiv:2108.07258v3 [cs.LG], Jul. 12, 2022, pp. 1-214, available online: https://arxiv.org/pdf/2108.07258.pdf.

Centers for Medicate & Medicaid Services. "CMS 2008-2010 Data Entrepreneurs' Synthetic Public Use File (DE-SynPUF)," Jun. 24, 2022, (4 pages), [Retrieved from the Internet May 12, 2023] <URL: https://www.cms.gov/Research-Statistics-Data-and-Systems/Downloadable-Public-Use-Files/SynPUFs/DE_Syn_PUF>.

Cheng, James et al. "GraphGen—A Synthetic Graph Data Generator," (2 pages), [Retrieved from the Internet May 12, 2023] <URL: https://cse.hkust.edu.hk/graphgen/>.

CitiusTech. "Improving Claims Auto Adjudication Rate Using AI/ML," May 13, 2020, (4 pages), YouTube, available online: https://www.youtube.com/watch?v=KiKMKnMJyi4.

Dandl, Susanne et al. "9.3 Counterfactual Explanations," Interpretable Machine Learning: a Guide for Making Black Box Models Explainable, Feb. 28, 2022, (14 pages), [Retrieved from the Internet May 12, 2023] <URL: https://christophm.github.io/interpretable-ml-book/counterfactual.html>.

Datacebo. "SDV—The Synthetic Data Vault," (Year: 2023), (8 pages), [Retrieved from the Internet May 12, 2023] <URL: https://sdv.dev/>.

Devaux, Elise et al. "An Overview of Synthetic Data Types and Generation Methods," KD Nuggets, (Year: 2023), (6 pages), [Retrieved from the Internet May 12, 2023] <URL: https://www.kdnuggets.com/2021/02/overview-synthetic-data-types-generation-methods.html>.

Documentation. "Model-Assisted Labeling," Jul. 1, 2022, (2 pages), [Retrieved from the Internet May 12, 2023] <URL: https://docs.segments.ai/tutorials/model-assisted-labeling>.

European Commission. "A European Approach to Artificial Intelligence" Shaping Europe's Digital Future, Jan. 26, 2023, (10 pages), [Retrieved from the Internet May 12, 2023] <URL: https://digital-strategy.ec.europa.eu/en/policies/european-approach-artificial-intelligence#:~:text=The%20European%20approach%20to%20artificial,in%20AI%20and%20trustworthy%20AI>.

European Commission. "Proposal for a Regulation Laying Down Harmonised Rules on Artificial Intelligence," Shaping Europe's Digital Future, Apr. 21, 2021, (2 pages), [Retrieved from the Internet May 12, 2023] <URL: https://digital-strategy.ec.europa.eu/en/library/proposal-regulation-laying-down-harmonised-rules-artificial intelligence>.

European Commission. "Regulatory Framework Proposal on Artificial Intelligence," Shaping Europe's Digital Future, Sep. 29, 2022, (7 pages), [Retrieved from the Internet May 13, 2023] <URL: https://digital-strategy.ec.europa.eu/en/policies/regulatory-framework-ai>.

Federico, Arenas L. "Generate Synthetic Data With Blender and Python," GitHub, Feb. 13, 2021, (5 pages), [Retrieved from the Internet May 12, 2023] <URL: https://github.com/federicoarenasl/Data-Generation-with-Blender>.

Friedman, Jerome H. "Greedy Function Approximation: A Gradient Boosting Machine." Annals of Statistics, vol. 29, No. 5, (Year:2001), pp. 1189-1232.

Goodfellow, Ian J. et al. "Generative Adversarial Nets," arXiv:1406.2661v1 [stat.ML], Jun. 10, 2014, pp. 1-9, available online: https://arxiv.org/pdf/1406.2661.pdf.

Google AI. "Responsible AI Practices," (Year: 2022), (12 pages), (online), [Retrieved from the Internet May 12, 2023] <URL: https://ai.google/responsibility/responsible-ai-practices/>.

Hugging Face. "Mustang/Bert_responsible_AI," Jan. 26, 2022, (2 pages), [Retrieved from the Internet May 12, 2023] <URL: https://huggingface.co/Mustang/BERT_responsible_AI>.

Kingma, Diederik P. et al. "Auto-Encoding Variational Bayes," arXiv:1312.6114v11 [stat.ML], Dec. 10, 2022, pp. 1-14, available online: https://arxiv.org/pdf/1312.6114.pdf.

Kusner, Matt et al. "Counterfactual Fairness," 31st Conference on Neural Information Processing System (NIPS 2017), Long Beach, CA, USA, (11 pages), available online: https://proceedings.neurips.cc/paper/2017/file/a486cd07e4ac3d270571622f4f316ec5-Paper.pdf.

Marina, Gretchen. "GPT-3: Language Models Are Few-Shot Learners," GitHub, Sep. 18, 2020, (3 pages), [Retrieved from the Internet May 12, 2023] <URL: https://github.com/openai/gpt-3>.

MLOps. "MLOps Principles," Jan. 22, 2023, (23 pages), [Retrieved from the Internet May 12, 2023] <URL: https://ml-ops.org/content/mlops-principles.

Morocho-Cayamcela, Manuel Eugenio et al. "Machine Learning For 5G/B5G Mobile and Wireless Communications: Potential, Limitations, and Future Directions," IEEE Access, vol. 7, Sep. 19, 2019, pp. 137184-137206, DOI: 10.1109/ACCESS.2019.2942390.

Mostly AI. "bn-learn—An R Package for Bayesian Network Learning and Inference," Dec. 15, 2017, (3 pages), [Retrieved from the Internet May 12, 2023] <URL: https://mostly.ai/synthetic-data/fair-synthetic-data>.

Mostly AI. "Fair Synthetic Data for Bias Free Machine Learning," Dec. 15, 2017, (7 pages), [Retrieved from the Internet May 12, 2023] <URL: https://mostly.ai/synthetic-data/fair-synthetic-data>.

(56) References Cited

OTHER PUBLICATIONS

Narayanan, Premnath K. et al. "Sequencing of Autonomous Network Functions Using eXplainable AI Methods," 2022 3rd International Conference on Intelligent Engineering and Management (ICIEM), London, United Kingdom, Apr. 27-29, 2022, pp. 973-977, IEEE, Doi: 0.1109/ICIEM54221.2022.9853175.

Obermeyer, Ziad et al. "Dissecting Racial Bias in an Algorithm Used to Manage the Health of Populations," Science, vol. 366, pp. 447-453, Oct. 25, 2019, DOI: 10.1126/science.aax2342.

Pandas. "pandas.cut," (3 pages), [Retrieved from the Internet May 12, 2023] <URL: https://pandas.pydata.org/docs/reference/api/pandas.cut.html>.

Pawelczyk, Martin et al. "Carla: A Python Library to Benchmark Algorithmic Recourse and Counterfactual Explanation Algorithms," arXiv:2108.00783v1 [cs.LG], Aug. 2, 2021, (22 pages), available online: https://arxiv.org/pdf/2108.00783.pdf.

Pessach, Dana et al. "Algorithmic Fairness," arXiv:2001.09784v2 [cs.CY], Jan. 21, 2020, pp. 1-31 pages, available online: https://arxiv.org/pdf/2001.09784.pdf.

Python Package Index. "ethnicolr: Predict Race and Ethnicity From Name," ethnicolr 0.9.6, Apr. 17, 2023, (20 pages), [Retrieved from the Internet May 12, 2023] <URL: https://pypi.org/project/ethnicolr/>.

Python Package Index. "gender-guesser 0.4.0," Dec. 5, 2016, (4 pages), [Retrieved from the Internet May 12, 2023] <URL: https://pypi.org/project/gender-guesser/>.

Sarmento, David. "Chapter 22: Correlation Types and When to Use Them, " Ademos, (14 pages), [Retrieved from the Internet May 12, 2023] <URL: https://ademos.people.uic.edu/Chapter22.html>.

Scarselli, Franco et al. "The Graph Neural Network Model," IEEE Transactions on Neural Networks, vol. 20, No. 1, pp. 61-80, Jan. 1, 2009, available online: https://citeseerx.ist.psu.edu/viewdoc/download?doi=10.1.1.1015.7227&rep=rep1&type=pdf>.

Settles, Burr. "Active Learning Literature Survey," Computer Sciences Technical Report 1648, University of Wisconsin—Madison, Jan. 26, 2010, (67 pages), available online: https://burrsettles.com/pub/settles.activelearning.pdf.

Singh, Amitojdeep et al. "Explainable Deep Learning Models in Medical Image Analysis," Journal of Imaging, vol. 6, No. 52, Jun. 20, 2020, pp. 1-19, DOI: 10.3390/jimaging6060052.

Solomou, Chris et al. "Utilizing Chest X-Rays for Age Prediction and Gender Classification," In Proceedings of the 4th International Seminar on Research of Information Technology and Intelligent Systems (ISRITI), International Seminar on Research of Information Technology and Intelligent Systems, Dec. 16-17, 2021, pp. 356-361, IEEE, available online: https://eprints.whiterose.ac.uk/183419/1/UtilizingChestX_raysforAgePredictionandGenderClassification.pdf.

Stanford University. "Introducing The Center for Research on Foundation Models (CRFM)," Aug. 18, 2021, (2 pages), (article), [Retrieved from the Internet May 12, 2023] <URL: https://hai.stanford.edu/news/introducing-center-research-foundation-models-crfm>.

The White House. "Blueprint for an AI Bill of Rights—Making Automated Systems Work for the American People," (8 pages), [Retrieved from the Internet May 12, 2023] <URL: https://www.whitehouse.gov/ostp/ai-bill-of-rights/>.

Thesmar, David et al. "Combining the Power of Artificial Intelligence With the Richness of Healthcare Claims Data—Opportunities and Challenges," PharmacoEconomics, Vo. 37, pp. 745-752, Mar. 8, 2019, DOI: 10.1007/s40273-019-00777-6.

United States Census Bureau. "Why We Ask Questions About . . . Race," American Community Survey, (Year: 2023), (2 pages), available online: https://www.census.gov/acs/www/about/why-we-ask-each-question/race/#:~:text=The%20U.S.%20Census%20Bureau%20collects,a%20social%20definition%20of%20race.

West, Jeremy. "A Theoretical Foundation for Inductive Transfer—Abstract," Spring Research Presentation—Brigham Young University, College of Physical and Mathematical Sciences, (Year: 2009), (1 page), available online: https://web.archive.org/web/20110726195244/https://cpms.byu.edu/springresearch/abstract-entry?id=861.

Xu, Lei et al. "Modeling Tabular Data Using Conditional GAN," arXiv:1907.005032v2 [cs.LG], Oct. 28, 2019, (15 pages), 33rd Conference on Neural Information Processing Systems (NeurIPS 2019), Vancouver Canada, available online: https://arxiv.org/pdf/1907.00503.pdf.

Xue, Zhiyun et al. "Gender Detection From Spine X-Ray Images Using Deep Learning," 2018 IEEE 31st International Symposium on Computer-Based Medical Systems (CBMS), Jun. 18, 2018, pp. 54-58, DOI: 10.1109/CBMS.2018.00017.

ZumoLabs. "zpy-Synthetic Data for Computer Vision. An Open Source Toolkit Using Blender and Python," GitHub, Aug. 4, 2021, (3 pages), [Retrieved from the Internet May 12, 2023] <URL: https://github.com/ZumoLabs/zpy>.

Mehrabi, Ninareh, et al., "A Survey on Bias and Fairness in Machine Learning" Jul. 13, 2021, 36 pages, ACM Computing Surveys, vol. 54, No. 6, article 115, Association of Computing Machinery, US.

Mothilal, Ramaravind, et al., "Explaining Machine Learning Classifiers through Diverse Counterfactual Explanations", submitted Dec. 6, 2019 to Cornell University Olin Online Library Archive, available on the Internet at https://arxiv.org/pdf/1905.07697v2, 13 pages.

Non-Final Rejection Mailed on Jan. 12, 2026 for U.S. Appl. No. 18/178,043, 27 page(s).

Non-Final Rejection Mailed on Jan. 22, 2026 for U.S. Appl. No. 18/178,056, 61 page(s).

Wan, Cen, et al., "Protein function prediction is improved by creating synthetic feature samples with generative adversarial networks", Nature Machine Intelligence, Aug. 31, 2020, 26 pages, vol. 2, No. 9, Springer Science and Business Media LLC, Germany.

Final Rejection Mailed on Jul. 7, 2026 for U.S. Appl. No. 18/178,043, 32 page(s).

Final Rejection Mailed on Jun. 24, 2026 for U.S. Appl. No. 18/178,056, 74 page(s).

* cited by examiner

Figure 4A:
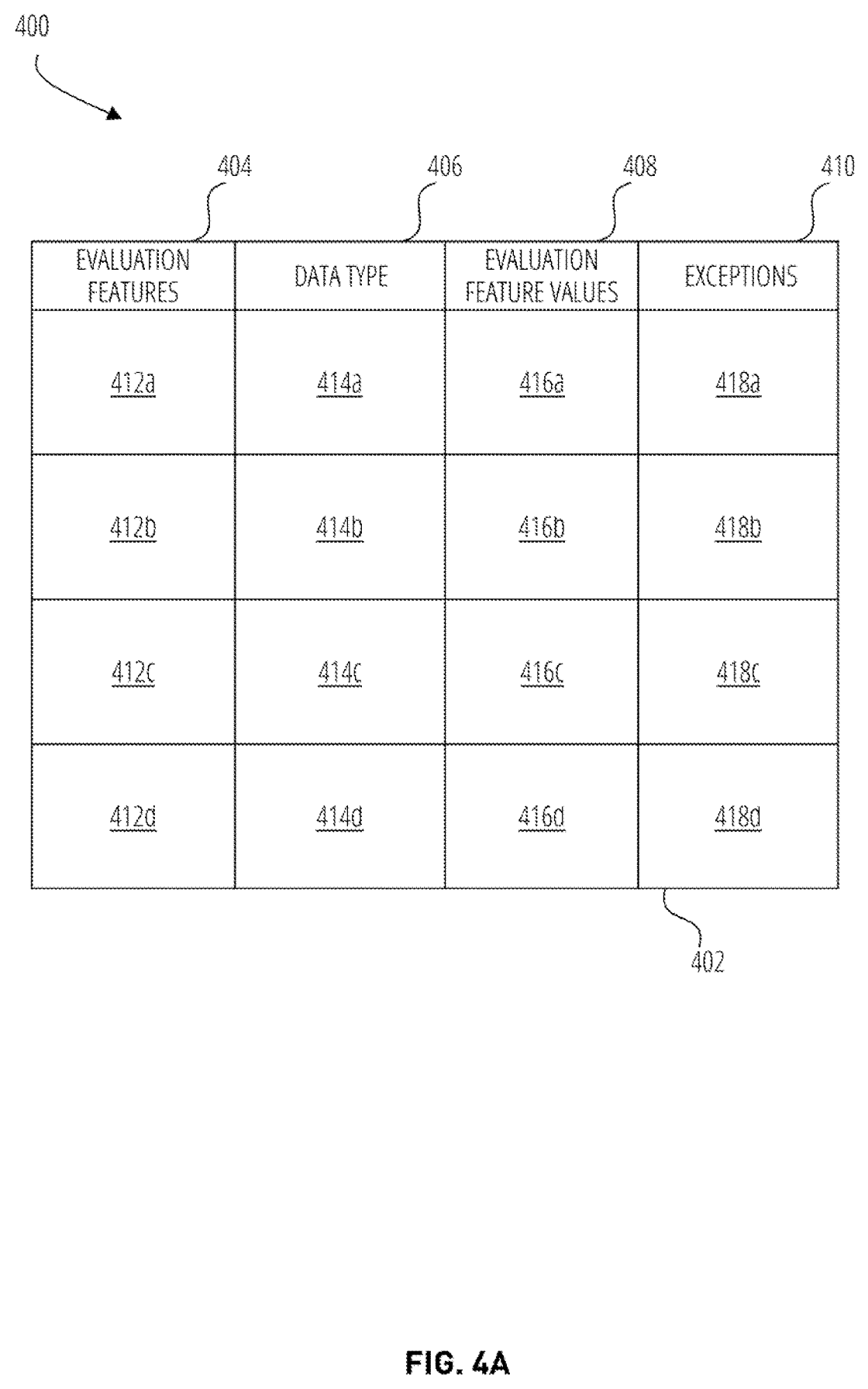

400

404 406 408 410

| EVALUATION FEATURES | DATA TYPE | EVALUATION FEATURE VALUES | EXCEPTIONS |
|---|---|---|---|
| 412a | 414a | 416a | 418a |
| 412b | 414b | 416b | 418b |
| 412c | 414c | 416c | 418c |
| 412d | 414d | 416d | 418d |

| INPUT FEATURES 422 | EVALUATION FEATURES 404 | DATA STATUS 424 | FEATURE CONFIDENCE SCORE 426 |
|---|---|---|---|
| 428 | 412a | 430a | 432a |
| 428 | 412b | 430b | 432b |
| 428 | 412c | 430c | 432c |
| 428 | 412d | 430d | 432d |

FIG. 4B

RECEIVE TRAINING DATASET 902

904

NO

YES

GENERATE TABULAR DATA 906

IDENTIFY EVALUATION FEATURES 908

IMPUTE EVALUATION FEATURE VALUES 912

NO

910

YES

IDENTIFY TARGET RATIO 914

GENERATE SYNTHETIC DATA OBJECT 918

NO

916

YES

GENERATE INPUT FEATURE PROFILE 920

GRAPH-BASED MACHINE LEARNING MODEL WITH FEATURE-AGNOSTIC TRAINING AND HOLISTIC FEATURE METRICS

CROSS-REFERENCE TO RELATED APPLICATIONS

This application claims the benefit of U.S. Provisional Application No. 63/479,874, entitled "ARTIFICIAL INTELLIGENCE AND MACHINE LEARNING AUTO ADJUDICATION FAIRNESS RISK SCORE," and filed Jan. 13, 2023, the entire contents of which are hereby incorporated by reference.

BACKGROUND

Various embodiments of the present disclosure address technical challenges related to the evaluation and training of machine learning models given limitations of existing machine learning techniques. Existing techniques for evaluating models, for example, may be tailored to a single aspect of the machine learning model and/or a certain stage of the model's lifecycle (e.g., training, inference, post-deployment, etc.). These techniques may include black box algorithms for evaluating the performance of a model based on its outputs, mitigation algorithms for evaluating training datasets, artificial intelligence systems and/or transfer learning techniques for counteracting unfairness after deployment, and/or other techniques that address individual aspects of a machine learning model. Each of these techniques present technical challenges, such as a lack of explainability, a dependence on the availability and sufficiency of training data, and/or a lack of traceability to a root cause of a machine learning model's degraded performance. While these techniques may be used to address different facets of artificial intelligence and/or machine learning algorithms, they (i) fail to address responsible artificial intelligence metrics, (ii) lack holistic metrics for evaluating the complete life cycle of machine learning systems, (iii) are not applicable to graph neural networks or graph training datasets, and (iv) fail to provide a holistic and systematic process for reporting and improving responsible artificial intelligence metrics for machine learning models. Various embodiments of the present disclosure make important contributions to various existing machine learning evaluation and training techniques by addressing each of these technical challenges.

BRIEF SUMMARY

Various embodiments of the present disclosure provide machine learning evaluation, training, and data balancing approaches for holistically evaluating machine learning models of various types for different prediction domains. The techniques of the present disclosure leverage a pipeline of various evaluation techniques to generate a holistic evaluation score for a machine learning model. Unlike conventional evaluation metrics, the holistic evaluation score may be based on each stage of a machine learning model lifecycle and may be universally applied to any type of dataset regardless of the underlying data formats of the dataset. For instance, the present disclosure provides for new graph-based data evaluation and training techniques, among others, for handling complex knowledge graphs such that the holistic evaluation score may be universally applied across tabular, media, text, and graph-based datasets. Moreover, the holistic evaluation score may be traceable such that low and/or degrading holistic evaluation scores may be traced back to the root of the issue (e.g., training data set, model parameters, model decisions, etc.). By doing so, the present disclosure provides improved machine learning evaluation, training, and monitoring techniques that overcome the technical challenges of conventional machine learning techniques.

In some embodiments, a computer-implemented method includes generating, by one or more processors, a holistic evaluation vector for a target machine learning model based on a plurality of evaluation scores for the target machine learning model, wherein the plurality of evaluation scores comprises: (i) a data evaluation score corresponding to a training dataset for the target machine learning model, (ii) a model evaluation score corresponding to one or more performance metrics for the target machine learning model, and (iii) a decision evaluation score corresponding to an output class of the target machine learning model; generating, by the one or more processors, a holistic evaluation score for the target machine learning model based on an aggregation of the holistic evaluation vector; and providing, by the one or more processors, an evaluation output for the target machine learning model based on the holistic evaluation score.

In some embodiments, a computing apparatus comprises memory and one or more processors communicatively coupled to the memory. The one or more processors are configured to: generate a holistic evaluation vector for a target machine learning model based on a plurality of evaluation scores for the target machine learning model, wherein the plurality of evaluation scores comprises: (i) a data evaluation score corresponding to a training dataset for the target machine learning model, (ii) a model evaluation score corresponding to one or more performance metrics for the target machine learning model, and (iii) a decision evaluation score corresponding to an output class of the target machine learning model; generate a holistic evaluation score for the target machine learning model based on an aggregation of the holistic evaluation vector; and provide an evaluation output for the target machine learning model based on the holistic evaluation score.

In some embodiments, one or more non-transitory computer-readable storage media include instructions that, when executed by one or more processors, cause the one or more processors to: generate a holistic evaluation vector for a target machine learning model based on a plurality of evaluation scores for the target machine learning model, wherein the plurality of evaluation scores comprises: (i) a data evaluation score corresponding to a training dataset for the target machine learning model, (ii) a model evaluation score corresponding to one or more performance metrics for the target machine learning model, and (iii) a decision evaluation score corresponding to an output class of the target machine learning model; generate a holistic evaluation score for the target machine learning model based on an aggregation of the holistic evaluation vector; and provide an evaluation output for the target machine learning model based on the holistic evaluation score.

A computer-implemented method includes generating, by one or more processors and using a target graph model, a predictive representation for a graph node of a graph training dataset; generating, by the one or more processors and using a feature prediction model, one or more predicted feature values for the graph node based on the predictive representation; generating, by the one or more processors, a data evaluation score for the graph training dataset based on the one or more predicted feature values; generating, by the one or more processors and using the target graph model, a predictive output for the graph node based on the predictive representation, wherein the predictive output comprises a node classification for the graph node, wherein the one or more predicted feature values correspond to one or more evaluation features of the graph training dataset, and wherein the target graph model is previously trained to generate an evaluation feature-agnostic predictive representation that at least partially prevents the target graph model from generating the predictive output based on the one or more evaluation features; and generating, by the one or more processors, an evaluation output for the target graph model based on the data evaluation score and the predictive output.

In some embodiments, a computing apparatus comprises memory and one or more processors communicatively coupled to the memory. The one or more processors are configured to: generate, using a target graph model, a predictive representation for a graph node of a graph training dataset; generate, using a feature prediction model, one or more predicted feature values for the graph node based on the predictive representation; generate data evaluation score for the graph training dataset based on the one or more predicted feature values; generate, using the target graph model, a predictive output for the graph node based on the predictive representation, wherein the predictive output comprises a node classification for the graph node, wherein the one or more predicted feature values correspond to one or more evaluation features of the graph training dataset, and wherein the target graph model is previously trained to generate an evaluation feature-agnostic predictive representation that at least partially prevents the target graph model from generating the predictive output based on the one or more evaluation features; and generate an evaluation output for the target graph model based on the data evaluation score and the predictive output.

In some embodiments, one or more non-transitory computer-readable storage media include instructions that, when executed by one or more processors, cause the one or more processors to: generate, using a target graph model, a predictive representation for a graph node of a graph training dataset; generate, using a feature prediction model, one or more predicted feature values for the graph node based on the predictive representation; generate data evaluation score for the graph training dataset based on the one or more predicted feature values; generate, using the target graph model, a predictive output for the graph node based on the predictive representation, wherein the predictive output comprises a node classification for the graph node, wherein the one or more predicted feature values correspond to one or more evaluation features of the graph training dataset, and wherein the target graph model is previously trained to generate an evaluation feature-agnostic predictive representation that at least partially prevents the target graph model from generating the predictive output based on the one or more evaluation features; and generate an evaluation output for the target graph model based on the data evaluation score and the predictive output.

In some embodiments, computer-implemented method includes receiving, by one or more processors, a request to process an input data object with a target machine learning model, wherein the target machine learning model is previously trained using a training dataset comprising a plurality of synthetic data objects and a plurality of historical data objects; identifying, by the one or more processors, a synthetic data object of the plurality of synthetic data objects that corresponds to the input data object based on one or more corresponding input feature values shared by the synthetic data object and the input data object; and in response to identifying the synthetic data object: modifying, by the one or more processors, a holistic evaluation score for the target machine learning model, initiating, by the one or more processors, the performance of a labeling process for assigning a ground truth label to the input data object, and augmenting, by the one or more processors, a supplemental training dataset with the input data object and the ground truth label.

In some embodiments, a computing apparatus comprises memory and one or more processors communicatively coupled to the memory. The one or more processors are configured to: receive a request to process an input data object with a target machine learning model, wherein the target machine learning model is previously trained using a training dataset comprising a plurality of synthetic data objects and a plurality of historical data objects; identify a synthetic data object of the plurality of synthetic data objects that corresponds to the input data object based on one or more corresponding input feature values shared by the synthetic data object and the input data object; and in response to identifying the synthetic data object: modify a holistic evaluation score for the target machine learning model, initiate the performance of a labeling process for assigning a ground truth label to the input data object, and augment a supplemental training dataset with the input data object and the ground truth label.

In some embodiments, one or more non-transitory computer-readable storage media include instructions that, when executed by one or more processors, cause the one or more processors to: receive a request to process an input data object with a target machine learning model, wherein the target machine learning model is previously trained using a training dataset comprising a plurality of synthetic data objects and a plurality of historical data objects; identify a synthetic data object of the plurality of synthetic data objects that corresponds to the input data object based on one or more corresponding input feature values shared by the synthetic data object and the input data object; and in response to identifying the synthetic data object: modify a holistic evaluation score for the target machine learning model, initiate the performance of a labeling process for assigning a ground truth label to the input data object, and augment a supplemental training dataset with the input data object and the ground truth label.

BRIEF DESCRIPTION OF THE DRAWINGS

FIG. 4A is an operational example of a data evaluation profile in accordance with some embodiments discussed herein.

FIG. 4B is an operational example of an input feature profile in accordance with some embodiments discussed herein.

DETAILED DESCRIPTION

Figure 1:
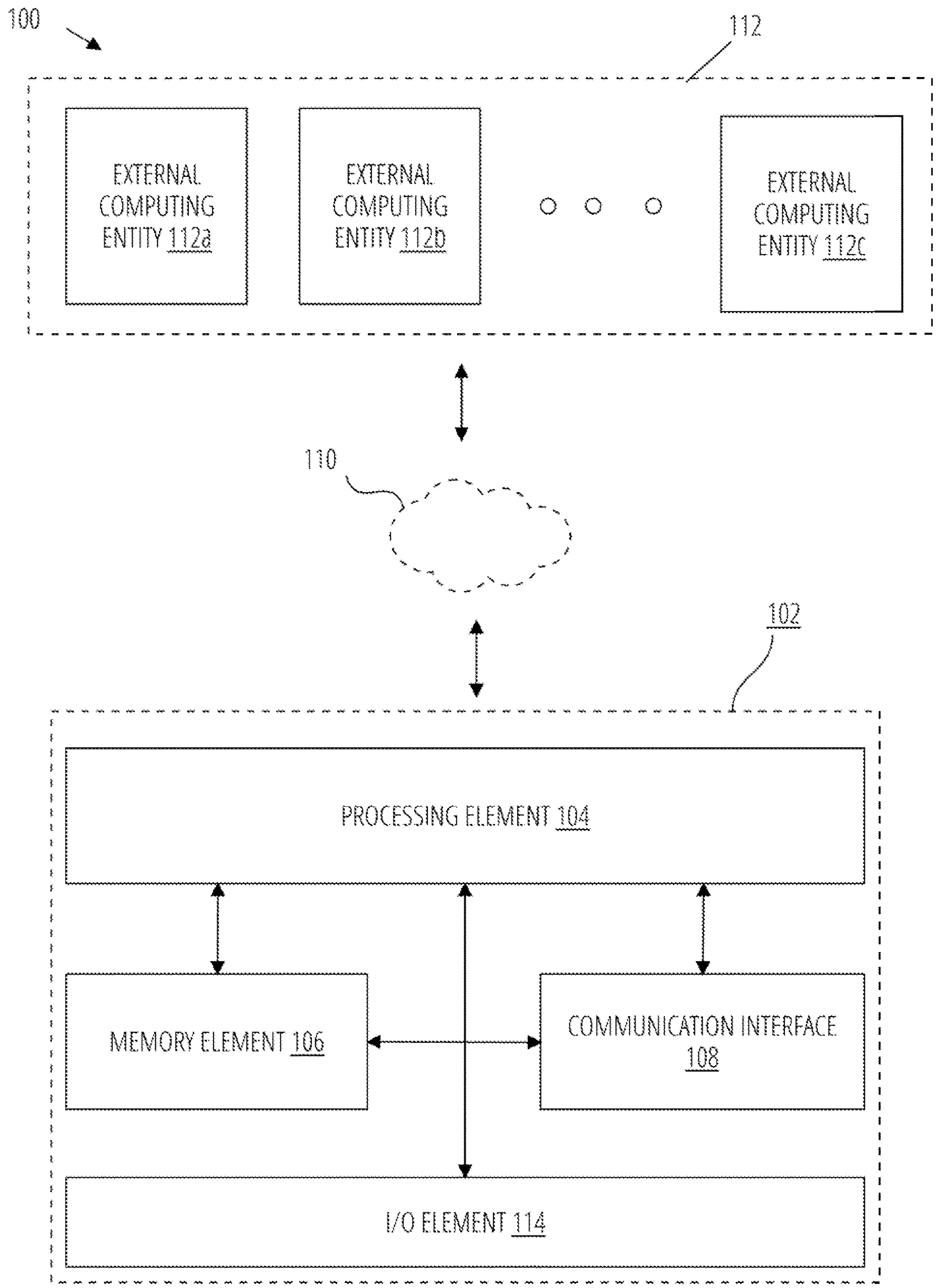
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc readonly memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random-access memory (CBRAM), phase-change random-access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random-access memory (FJG RAM), Millipede memory, racetrack memory, and/or the like.

In some embodiments, a volatile computer-readable storage medium may include random-access memory (RAM), dynamic random-access memory (DRAM), static random-access memory (SRAM), fast page mode dynamic random-access memory (FPM DRAM), extended data-out dynamic random-access memory (EDO DRAM), synchronous dynamic random-access memory (SDRAM), double data rate synchronous dynamic random-access memory (DDR SDRAM), double data rate type two synchronous dynamic random-access memory (DDR2 SDRAM), double data rate type three synchronous dynamic random-access memory (DDR3 SDRAM), Rambus dynamic random-access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random-access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specially configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 illustrates an example computing system 100 in accordance with one or more embodiments of the present disclosure. The computing system 100 may include a predictive computing entity 102 and/or one or more external computing entities 112*a-c* communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112*a-c* to perform one or more steps/operations of one or more techniques (e.g., evaluation techniques, training techniques, data augmentation techniques, monitoring techniques, etc.) described herein.

The external computing entities 112*a-c*, for example, may include and/or be associated with one or more data centers, claim centers, health care providers, and/or any other external entity that may be configured to receive, store, and/or process input data objects, such medical claims, and/or the like. The data centers, for example, may be associated with one or more data repositories storing historical, synthetic, and/or real time input data (e.g., medical claims, etc.) that may, in some circumstances, be processed by the predictive computing entity 102 to generate one or more predictive outputs as described herein. In some embodiments, one or more of the external computing entities 112*a-c* may include one or more processing entities that leverage one or more machine learning models (e.g., a targeted machine learning model, etc.) to generate the one or more predictive outputs. In such a case, the predictive computing entity 102 may be configured to evaluate the one or more machine learning models using one or more of the techniques described herein.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112*a-c*, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
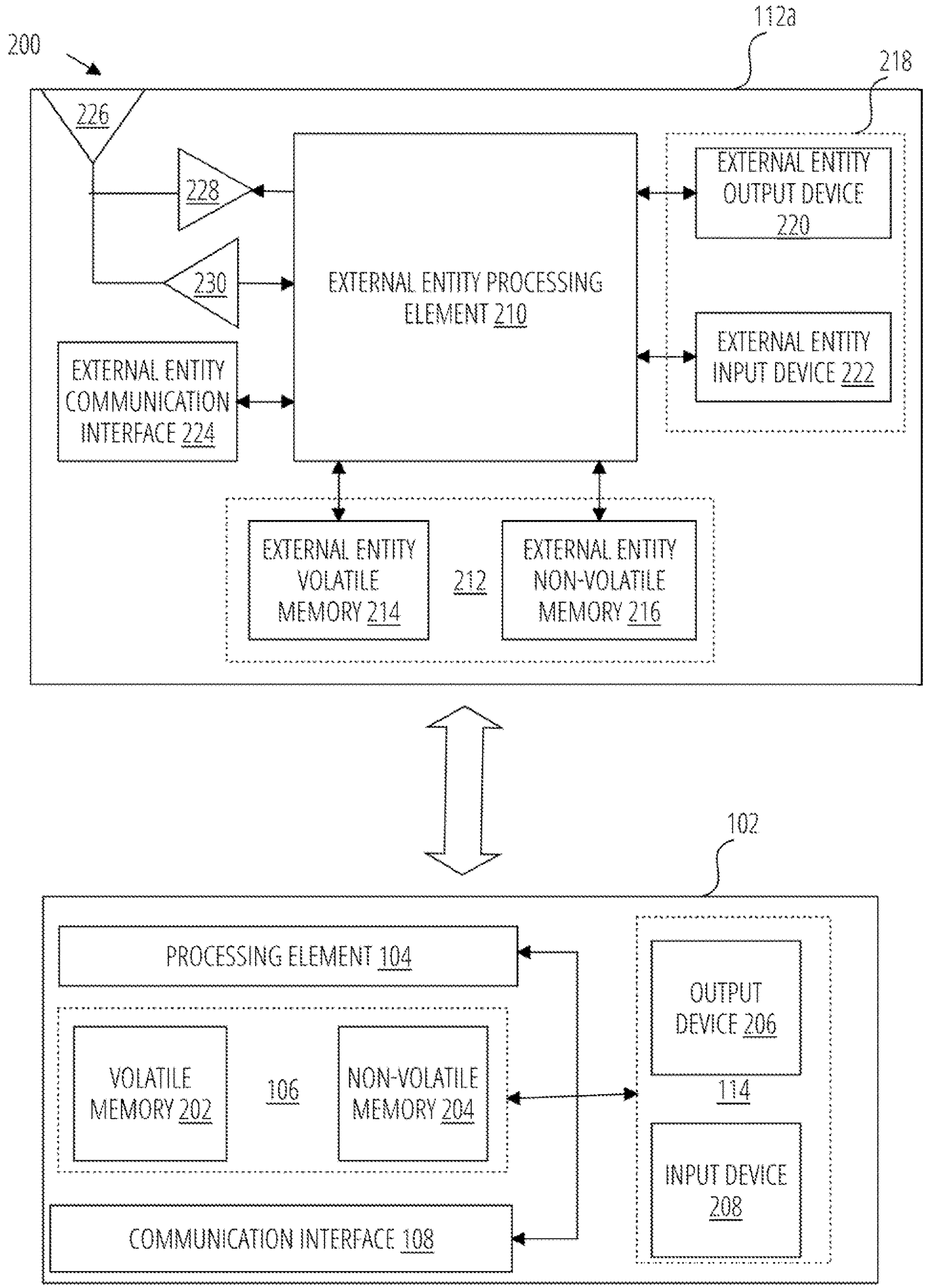
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112*a* of the computing system 100. The predictive computing entity 102 and/or the external computing entity 112*a* may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry and/or similar terms used herein interchangeably). In one embodiment, a volatile memory 202 may include random-access memory (RAM), dynamic random-access memory (DRAM), static random-access memory (SRAM), fast page mode dynamic random-access memory (FPM DRAM), extended data-out dynamic random-access memory (EDO DRAM), synchronous dynamic random-access memory (SDRAM), double data rate synchronous dynamic random-access memory (DDR SDRAM), double data rate type two synchronous dynamic random-access memory (DDR2 SDRAM), double data rate type three synchronous dynamic random-access memory (DDR3 SDRAM), Rambus dynamic random-access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random-access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The memory element 106 may include non-volatile memory 204 (also referred to as non-volatile storage, memory, memory storage, memory circuitry and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FORAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random-access memory (CBRAM), phase-change random-access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random-access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices, such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112*a*. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112*a* may include an external entity processing element 210, an external entity memory element 212, an external entity communication interface 224, and/or one or more external entity I/O elements 218 that communicate within the external computing entity 112*a* via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112*a* may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112*a* may be capable of operating with one or more air interface standards, communication protocols, modulation types, and access types. More particularly, the external computing entity 112*a* may operate in accordance with any of a number of wireless communication standards and protocols, such as those described above with regard to the predictive computing entity 102.

Via these communication standards and protocols, the external computing entity 112*a* may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112*a* may also download changes, add-ons, and updates, for instance, to its firmware, software (e.g., including executable instructions, applications, program modules), operating system, and/or the like.

According to one embodiment, the external computing entity 112*a* may include location determining embodiments, devices, modules, functionalities, and/or the like. For example, the external computing entity 112*a* may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD). Degrees, Minutes, Seconds (DMS), Universal Transverse Mercator (UTM), Universal Polar Stereographic (UPS) coordinate systems, and/or the like. Alternatively, the location information/data may be determined by triangulating a position of the external computing entity 112*a* in connection with a variety of other systems, including cellular towers, Wi-Fi access points, and/or the like. Similarly, the external computing entity 112*a* may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112*a* to interact with and/or cause the display, announcement, and/or the like of information/data to a user. The user input interface may include any of a number of input devices or interfaces allowing the external computing entity 112*a* to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112*a* and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. Examples of Certain Terms

In some embodiments, the term "target machine learning model" refers to a data entity that describes parameters, hyper-parameters, and/or defined operations of a machine learning model (e.g., model including at least one of one or more rule-based layers, one or more layers that depend on trained parameters, coefficients, and/or the like). The target machine learning model may include a machine learning model that is the target of one or more evaluation, monitoring, and/or training techniques of the present disclosure.

As described herein, the evaluation, monitoring, and/or training techniques of the present disclosure may be implemented for a plurality of different prediction domains. The configuration, type, and/or other characteristics of the target machine learning model may be dependent on the particular domain. The model, for example, may be configured, trained, and/or the like to perform and/or facilitate one or more different operations based on the domain. As one example, the evaluation, monitoring, and/or training techniques of the present disclosure may be implemented for a claim adjudication prediction domain. In such a case, the target machine learning model may include a predictive claim adjudication model configured, trained, and/or the like to predict a claim decision (e.g., accept, deny, etc.) for a medical claim. By way of example, the techniques of the present disclosure may be applied to an auto-adjudication process in which a sequence of autonomous steps are performed to make an initial determination of whether to pay or deny insurance and/or public benefit medical claims before manually reviewing each claim. The target machine learning model may include a machine learning model adapted to perform one or more steps of the auto-adjudication process.

The target machine learning model may include one or more of any type of machine learning model including one or more supervised, unsupervised, semi-supervised, and/or reinforcement learning models. In some examples, the target machine learning model may include multiple models configured to perform one or more different stages of a predictive process. In some examples, the target machine learning model may include a machine learning model trained, using one or more supervised training techniques, to generate a predictive output (e.g., a claim decision in an auto-adjudication prediction domain) for an input data object (e.g., a claim in an auto-adjudication prediction domain). The target machine learning model may include one or more supervised classifier models implemented using one or more model architectures such as neural networks, regression models, and/or the like. As some examples, the target machine learning model may include one or more neural networks, such as BERT models, GPT-3 models, Contrastive Language-Image Pre-Training (CLIP) models, Codex models, Dall-E models, and/or the like. In some embodiments, the target machine learning model is trained, using a training dataset, to output a predictive output for an input data object.

In some embodiments, the term "input data object" refers to a data entity that describes data provided to an algorithm to generate a predictive output. The type, format, and parameters of the input data object may be based on the prediction domain. The input data object may include a plurality of input feature values that may be considered by an algorithm to generate the predictive output. In some embodiments, the algorithm is a machine learning model that may be trained to generate the predictive output based on the input feature values of the input data object. As one example, in an auto-adjudication prediction domain, the input data object may correspond to a medical claim for a patient. In such a case, the input feature values may include (i) one or more patient feature values that describe a patient's medical history, previous claims, demographic features, and/or the like, (ii) one or more claim feature values that describe a claim's procedure type, diagnosis code, medical equipment, insurer requirements, physician deadlines, and/or the like, and/or any other value descriptive of an auto-adjudication process.

In some embodiments, the term "entity data object" refers to a data entity that describes an entity corresponding to an input data object. The type, format, and parameters of the entity data object may be based on the prediction domain. The entity data object may include a plurality of input feature values that may be considered by an algorithm to generate a predictive output. In some examples, the algorithm may include a machine learning model that is trained to generate a predictive output for an input data object based on one or more input feature values of a corresponding entity data object. As one example, in an auto-adjudication prediction domain, the entity data object may correspond to a patient for which a medical claim has been filed. In such a case, the input features may include one or more patient feature values that describe a patient's medical history, previous claims, demographic features, and/or the like.

In some examples, one or more input data objects may correspond to an entity data object. For instance, an input data object may include an input feature value that identifies the corresponding entity data object. The entity data object may be a common entity shared by one or more input data objects with input feature values identifying the entity data object. As one example, in an auto-adjudication prediction domain, an input data object may include a medical claim for a patient that is represented by an entity data object. The patient (e.g., the entity data object) may have a plurality of medical claims each corresponding to a separate input data object that may be separately processed by an algorithm. Each input data object corresponding to an entity data object may incorporate the input feature values of the entity data object for analysis by an algorithm. For instance, the input data object and the entity data object may each include a plurality of input feature values that may be jointly considered by the algorithm to generate a predictive output for the input data object.

In some embodiments, the term "input feature" refers to a data entity that describes an attribute of an input data object and/or an entity data object. An input feature may describe a class of feature values for an input data object and/or entity data object. For instance, an input feature may include one or more defined feature values. A respective input data object and/or entity data object may include one of the one or more defined feature values for one or more of a plurality of input features. A defined feature value may depend on the input feature and may include a classification, category, binary value, and/or the like.

The type, format, and parameters of the input features may be based on the prediction domain. As one example, in an auto-adjudication prediction domain, the input features may include one or more medical history features, previous claim features, demographic features, procedure features, diagnosis code features, medical equipment features, insurer requirement features, physician deadline features, and/or the like. Each of the input features may define a class of values that describe a particular characteristic of a medical claim and/or associated patient. By way of example, a medical history feature may include one or more defined feature values that identify one or more medical conditions, previous medical procedures, and/or the like for a patient. As another example, the diagnosis code features may include one or more defined feature values that identify one or more diagnosis classifications for a medical claim. As yet another example, the demographic features may include one or more defined feature values that identify a particular demographic class of a patient. These input features are provided for means of illustration. The listed features do not represent a closed list and those with ordinary skill in the art will understand that any of a plurality of different input features may be used in an auto-adjudication prediction domain.

In some embodiments, the term "evaluation feature" refers to an input feature that describes a potentially sensitive attribute of an input data object and/or entity data object. An evaluation feature may describe an input feature that is evaluated by the evaluation techniques of the present disclosure. As an example, the evaluation techniques of the present disclosure may evaluate the impact of evaluation features at each phase (e.g., training, inference, monitoring, etc.) of a machine learning model to ensure the evaluation features do not bias predictive outputs of the machine learning model with respect to particular evaluation feature values of the evaluation features.

The type, format, and parameters of the evaluation features may be based on the prediction domain. As one example, in an auto-adjudication prediction domain, the evaluation features may include demographic features that, in some circumstances, should not be considered by a machine learning model when generating a predictive output. As examples, evaluation features may include a gender feature (e.g., defining one or more feature values indicative of a gender classification, such as man, woman, etc.), a race feature (e.g., defining one or more feature values indicative of a race classification, such as Caucasian, African American, Native American, etc.), an income feature (e.g., defining one or more income levels, etc.), an age feature (e.g., defining one or more age ranges, etc.), and/or any other protected or sensitive attribute.

In some embodiments, the term "non-evaluation feature" refers to an input feature that is not an evaluation feature of an input data object and/or entity data object. A nonevaluation feature may include an input feature that is not designated as an evaluation feature for an evaluation process.

In some embodiments, the term "predictive output" refers to a data entity that describes an output from an algorithm. The predictive output may include any type of data entity generated using a predictive algorithm, such as the target machine learning model 302. In some embodiments, the predictive output includes a classification for an input data object. For example, in an auto-adjudication prediction domain, the predictive output may include an auto-adjudication decision for a medical claim. The auto-adjudication decision may describe whether the medical claim should be approved (e.g., paid for, etc.) and/or denied. The predictive output may be associated with one or more predictive output classes that define one or more different types of outputs. The predictive output classes may include at least one positive output class and at least one negative output class. By way of example, in an auto-adjudication prediction domain, a positive output class may include a claim approval, whereas a negative output class may include a claim denial. In such a case, predictive outputs of a positive output class may include claim approvals, whereas predictive outputs of a negative output class may include claim denials. In some examples, additional consideration may be drawn to predictive outputs of a negative output class to prevent unfair outcomes, such as claim denials based on potentially irrelevant information.

In some embodiments, the term "training dataset" refers to a data entity that includes a plurality of data objects associated with a prediction domain. The type, format, and parameters of each data object may be based on the prediction domain. For example, the training dataset may include a plurality of historical and/or synthetic input data objects and/or entity data objects. As an example, in an auto-adjudication prediction domain, a historical and/or synthetic input data object may include a historical and/or synthetic medical claim. In the same domain, a historical and/or synthetic entity data object may include an existing (e.g., previously identified) and/or synthetic patient.

In some embodiments, the training dataset includes a collection of a plurality of data objects and/or contextual data associated therewith that is used to train the target machine learning model. The training dataset may include a balanced training dataset that includes a historical dataset that is augmented by one or more synthetic datasets. The historical dataset may include a plurality of historical data objects that correspond to historical and/or preexisting events (e.g., previously adjudicated medical claims, etc.), entities (e.g., previously identified patients, etc.), and/or the like for a prediction domain. The synthetic datasets may each include a plurality of synthetic data objects that are generated to balance the historical dataset by adding synthetic data objects with underrepresented input feature values. The synthetic data objects may correspond to synthetic events (e.g., a medical claim generated with one or more underrepresented input feature values), synthetic entities (e.g., patients generated with one or more underrepresented input feature values, etc.), and/or the like for a prediction domain.

In some embodiments, the training dataset includes one or more of a plurality of different data representations, structures, and/or formats. For example, the training dataset may include tabular data, text data, media data, graph data, and/or the like. Each input data object may include input features that are represented in one or more of these data formats. Tabular data, for example, may include data that is organized in a table with rows, columns, and/or the like. Text data may include data that is expressed by natural language and/or computer interpretable languages. Media data may include data that is described by media data structures, such as pictures, video, and/or the like. Graph data may include data that is described by a knowledge graph with one or more nodes connected by a set of edges.

In some embodiments, the term "evaluation score" refers to a discrete component of a holistic evaluation data entity for a target machine learning model. An evaluation score may include any data type, format, and/or value that evaluates a particular aspect of the target machine learning model. By way of example, a first evaluation score may be dependent on a training dataset used to train the target machine learning model, a second evaluation score may be dependent on a performance of the target machine learning model, a third evaluation score may be dependent on one or more particular predictive outputs of the target machine learning model, and/or the like. The type, format, and/or value of an evaluation score may be based on the prediction domain. As an example, in an auto-adjudication prediction domain, an evaluation score may describe a biasness and/or fairness of a training dataset, a machine learning model, machine learning model decisions, and/or the like. An evaluation score, for example, may include a data evaluation score, a model evaluation score, a decision evaluation score, among others.

In some embodiments, the term "holistic evaluation vector" refers to a data entity that describes a plurality of evaluation scores for a target machine learning model. The holistic evaluation vector may include vector, array, deque, linked list, map, multiset, and/or any other data structure that may describe multiple, different, evaluation scores for a target machine learning model. Each component (e.g., evaluation score) of the holistic evaluation vector may describe the metric for a different component of the target machine learning model and/or a process in which the target machine learning model is generated. As examples, a first component (e.g., first evaluation score, etc.) may evaluate a training phase of the target machine learning model, a second component (e.g., a second evaluation score, etc.) may evaluate an inference phase for an initially trained model, a third component (e.g., a third evaluation score, etc.) may evaluate a post-deployment, monitoring phase for a trained model, and/or the like. In this way, the holistic evaluation vector may include a multi-component vector that, taken as whole, holistically evaluates various potentially interrelated aspects of a target machine learning model at one or more phases of development and/or use.

In some embodiments, the holistic evaluation vector includes a fairness vector with at least three evaluation scores. The evaluation scores may include any type of evaluation score for any aspect and/or phase of the target machine learning model. In some examples, the evaluation scores may include: (i) a data evaluation score (e.g., denoted as featureRiskFairnessScore) configured to evaluate a training dataset for the target machine learning model, (ii) a model evaluation score (e.g., denoted as $\text{modelRisk}_{FairnessScore}$) configured to evaluate the performance of the target machine learning model, (iii) a decision evaluation score (e.g., denoted as $\text{CounterFactualRisk}_{FairnessScore}$) configured to evaluate outputs of the target machine learning model, and/or the like. By way of example, the holistic evaluation vector may be denoted as:

$$Auto\text{-}Adjudication_{VectorScore} = [featureRisk_{FairnessScore}, modelRisk_{FairnessScore}, CounterFactualRisk_{FairnessScore}].$$

In some embodiments, the term "holistic evaluation score" refers to a data entity that describes a plurality of evaluation scores for a machine learning model using one, holistic, parameter. The holistic evaluation score may include a compressed holistic evaluation vector.

In some embodiments, the term "data evaluation score" refers to an evaluation score that is associated with a training dataset used to train a target machine learning model. The data evaluation score (e.g., featureRisk$_{FairnessScore}$) may be based on one or more aspects of the training dataset and/or the impact of the training dataset on the target machine learning model. For example, the data evaluation score may be indicative of a degree to which the training dataset is balanced by a synthetic information and, in some cases, an impact of the synthetic information on predictive outputs of the target machine learning model.

In some embodiments, the data evaluation score includes an aggregation of a plurality of data risk scores respectively generated for one or more different aspects of the training dataset. The risk scores, for example, may include an input feature risk score (e.g., denoted as rC$_{score}$), a data impact score (e.g., denoted as DfI$_{Score}$), and, in some examples in which the training dataset includes a graph training dataset, a graph feature confidence score (e.g., denoted as DfI$_{GraphRiskScore}$). The data evaluation score may include an overall feature risk score (e.g., denoted as feature Risk$_{FairnessScore}$) that evaluates the input features of the training dataset. The data evaluation score may be defined as:

$$featureRiskNumerator_{FairnessScore} = rC_{Score} + DfI_{Score} + DfI_{GraphRiskScore}$$

$$featureRisk_{FairnessScore} = \frac{featureRiskNumerato_{FairnessScore}}{N}$$

where (i) N=3 in the event that the training dataset includes a graph training dataset and (ii) N=2 and the DfI$_{GraphScore}$=0 in event that the training dataset does not include a graph training dataset. The higher the data evaluation score (e.g., featureRisk$_{FairnessScore}$) the weaker the responsible factor for a target machine learning model. In some embodiments, the data evaluation score (e.g., featureRisk$_{FairnessScore}$) is derived during the training phase as the target machine learning model is generated.

In some embodiments, the term "input feature risk score" refers to a data value that describes a correlation between evaluation features and non-evaluation features of a training dataset. The input feature risk score (e.g., rC$_{score}$) may include an aggregated feature correlation score. By way of example, the input feature risk score may include the aggregate (e.g., sum, product, average, etc.) of a plurality of feature correlation scores, each descriptive of an association between a respective evaluation feature and each of the plurality of non-evaluation features.

The input feature risk score may be generated based on a bivariate analysis that measures the strength of association between two features and the direction of the relations. In some examples, the input feature risk score may be generated using one or more bivariate correlation techniques, such as Pearson correlation, Kendall rank correlation, Spearman correlation, Point-Biserial correlation, and/or the like. In some examples, one or more different bivariate correlation techniques may be applied based on the data types (e.g., continuous, categorical, ordinal, etc.) and/or context (parametric, non-parametric, etc.) of one or more input features of the training dataset. The bivariate correlation techniques may be applied to the training dataset to generate correlation values between each pair of evaluation and non-evaluation features of the dataset. For instance, each correlation value may be indicative of a strength of association between a respective evaluation feature (e.g., denoted as DFx) and a respective non-evaluation feature (e.g., Fy). In some examples, the correlation values may be stronger in the event that they are closer to +1 or −1 and weaker in the event that they are closer to 0. However, the inverse may also be applied.

In some embodiments, input feature risk score includes an average, aggregate, and/or the like of a plurality of scaled correlation scores (e.g., denoted as r_DFx_Fy) between the plurality of input features. For example, the input feature risk score may be defined as:

$$rC_{Score} = \sum_{x=1,y=1}^{xn1,yn2} \frac{\text{r\_DFx\_Fy} - \min(\text{r\_DFx\_Fy})}{\max(\text{r\_DFx\_Fy}) - \min(\text{r\_DFx\_Fy})} / N,$$

where the rC$_{score}$ may include the average of all normalized values (e.g., scaled values) of all correlations between an evaluation feature (e.g., DFx) and other non-evaluation features (e.g., Fy) in the range of 0 to 1.

In some embodiments, a scaled correlation score (e.g., r_DFx_Fy) includes a feature correlation score (e.g., DFx_Fy) between an evaluation feature (e.g., DFx) and a respective non-evaluation feature (e.g., Fy) multiplied by a feature confidence score (e.g., FeatureGoodnessFairnessRisk$_{Score}$) corresponding to the evaluation feature (e.g., DFx) and the non-evaluation feature (e.g., Fy). For example, the scaled correlation score may be generated by:

$$\text{r\_DFx\_Fy} = (\text{DFx\_Fy}) * FeatureGoodnessFairnessRisk_{Score}.$$

In some embodiments, the feature confidence score is weighted based on an evaluation profile score (e.g., DataGoodness$_{ProfileScore}$) of a respective feature pair (e.g., DFx and Fy). In some examples, xn1 may include the number of evaluation features and yn2 may include the number non-evaluation features. DF1, DF2, DF3 (e.g., DFx) may be respective evaluation features and F1, F2 (e.g., Fy) may be respective non-evaluation features. "r" may represent the calculated correlation between a specific evaluation feature and a non-evaluation feature (e.g., in the range of −1 to +1). The feature confidence score (e.g., FeatureGoodnessFairnessRisk$_{Score}$) may be between the evaluation feature (e.g., DFx) and the non-evaluation feature (e.g., Fy). Different combinations of features may have different feature confidence scores as described herein.

In some examples, a high feature correlation score (e.g., close to 1) may be indicative of a high association between an evaluation feature and a non-evaluation feature and/or a low feature correlation score may be indicative of a low association. The inverse may also be implemented. In some examples, highly correlating non-evaluation input features (e.g., Fy) may be added to data evaluation profile (e.g., Demographic$_{FeatureProfile}$) and treated as evaluation features.

In some embodiments, the term "data evaluation profile" refers to a data entity that describes one or more evaluation features of a training dataset. The data evaluation profile may include any type of data structure, such as a table, a linked list, and/or the like that describes one or more evaluation features and/or one or more attributes for the evaluation features. The data evaluation profile may be based on the prediction domain. For example, in an auto-adjudication prediction domain, the data evaluation profile may identify a subset of evaluation features for an auto-adjudication medical claim algorithm (AAMCA) based on input from one or more subject matter experts (e.g., practicing neurosurgeon). The data evaluation profile, for example, may include an evaluation feature set with sensitive characteristics, such as race, ethnicity, gender, nationality, income, sexual orientation, ability, and political or religious belief from prior knowledge.

In some embodiments, the data evaluation profile identifies one or more feature attributes for the one or more evaluation features. For example, the one or more feature attributes for a particular evaluation feature may include a plurality of defined feature values for the evaluation feature, a data type for the defined feature values (e.g., continuous, categorical, etc.), one or more input data object exceptions for the evaluation feature, and/or the like. The one or more input data object exceptions may be based on the predictive domain. As an example, in an auto-adjudication prediction domain, the exceptions may describe a medical claim (e.g., a maternity claim) for which a particular evaluation feature (e.g., gender feature) is relevant. In some examples, the data evaluation profile may identify how a combination of evaluation features may influence a predictive output for an input data object.

In some embodiments, the term "target ratio" refers to a data entity that describes an expected frequency for each defined feature value of an evaluation feature in a training dataset. A target ratio may correspond to an evaluation feature and may describe an expected frequency for each feature value of the evaluation feature. An expected frequency for a particular feature value may describe a number of input data objects within the training dataset that are expected to include the particular feature value. The expected frequency may identify a number of data objects, a percentage of data objects, a relative percentage of data objects (e.g., relative to other defined feature values of the evaluation feature), and/or the like. In this way, the target ratio for an evaluation feature may describe an expected relative representation of each feature value of the evaluation feature within the training dataset.

A target ratio may be based on the prediction domain. In some embodiments, the target ratio for an evaluation feature is identified based on third party data representative of a population associated with the prediction domain. As one example, for an auto-adjudication prediction domain associated with medical claims from a geographic region, the target ratio may be based on census data for the geographic region. In some examples, the historical input data objects of a training dataset may underrepresent one or more feature values of a population. In such as case, a synthetic dataset may be generated to balance the training dataset.

In some embodiments, the term "synthetic dataset" refers to a data entity that includes a plurality of data objects associated with a prediction domain. The type, format, and parameters of each data object may be based on the prediction domain. For example, the synthetic dataset may include a plurality of synthetic data objects, such as one or more synthetic entity data objects and/or synthetic input data objects. In an auto-adjudication prediction domain, a synthetic data objects may include a synthetic medical claim (e.g., synthetic input data object) and/or a synthetic patient (e.g., synthetic entity data object).

In some embodiments, a synthetic dataset includes a collection of a plurality of synthetic data objects and/or contextual data associated therewith that is used to balance the training dataset with respect to one or more target ratios for the one or more e valuation features 404 of the training dataset. In some embodiments, the training dataset may include a plurality of historical data objects that are balanced by (i) imputing one or more input feature values for one or more of the historical data objects and/or (ii) generating a plurality of synthetic data objects with the one or more input feature values. For example, one or more evaluation feature values may be imputed (e.g., predicted, inferred, etc.) for one or more input data objects. The evaluation feature values may be imputed using one or more imputation models configured to predict missing evaluation feature values for a data object (e.g., input data object, entity data object, etc.) based on contextual information (e.g., other input feature values, etc.) for the data object. An imputation model may include a prediction algorithm, such as ethnicolr, gender-guesser, and/or the like. In some examples, the imputation model may be configured to predict the evaluation feature values based on one or more other input feature values of the input data object.

In some embodiments, a synthetic dataset may be generated to further balance a training dataset after missing evaluation feature values are imputed for each of the historical input data objects. For example, in the event that the training dataset is missing one or more input data objects with a specific evaluation feature value (e.g., a demographic category, such as male, female, etc.) of an evaluation feature, a feature specific synthetic dataset may be generated for the evaluation feature unless one or more input data object exceptions apply. By way of example, a feature specific synthetic dataset may be generated in the event that the evaluation feature values for the plurality of input data objects of the training dataset do not align with a target ratio of a corresponding evaluation feature.

The synthetic data objects of a synthetic dataset may be refined and/or augmented until the combination of the synthetic data objects and the historical data objects align with the target ratios for each evaluation feature of the training dataset. In this way, the synthesized dataset may include a plurality of synthesized data objects that consider each of the evaluation features of the training dataset.

The synthetic dataset may be generated using one or more data synthesis techniques. As some examples, neural network based robust models, such as variational autoencoders (VAE) and/or generative adversarial network (GAN) models, may be leveraged with a combination of synthetic data algorithm techniques to intelligently generate synthetic data objects that satisfy each of the target ratios for a training dataset. The neural network based synthetic data generation techniques, for example, may learn to reproduce data and generalize beyond it to produce a representation that could have originated in the data using prediction and correction techniques.

In some embodiments, one or more different data synthesizing techniques are leveraged for generating different synthetic datasets based on the data representations, structures, and/or formats of the training dataset. The techniques of the present disclosure may combine a plurality of different data synthesizing techniques each tailored to different data formats to generate data format agnostic datasets. In this way, the techniques of the present disclosure may be applied universally across a plurality of different training datasets regardless of the medium in which the data is represented.

For example, one or more tabular synthetic data generation techniques may be leveraged in the event that an evaluation feature value is missing from a tabular dataset. The tabular synthetic data generation techniques may include leveraging one or more generative adversarial (GAN) models such as, conditional GAN—CTGAN implemented in Synthetic Data Vault (SDV), Wasserstein GAN (WGAN), and/or WGAN plus gradient penalty (WGAN-GP) to synthesize one or more missing evaluation feature values for the tabular dataset. In some embodiments, the tabular dataset includes a mix of discrete and continuous columns. In such a case, CTGAN may be leveraged to synthesize the mix of data. Other tabular synthetic data generation techniques may include GaussianCopula, CopulaGAN, triplet-based variational autoencoder (TVAE) and/or the like. In addition, in some examples, hierarchical modeling algorithm 1 (HMA1) and/or like may be leveraged for multi-table evaluation features and/or TimeGAN, autoregressive (AR), periodic autoregressive (PAR), and/or the like may be leveraged for timeseries data. Additionally tabular synthetic data can be derived from third party platforms, such as MDClone, Mostly.ai, and/or the like.

As another example, one or more text synthetic data generation techniques may be leveraged in the event that an evaluation feature value is missing from a text dataset. A text dataset, for example in an auto-adjudication predictive domain, may include medical transcription documents and/or the like. In some examples, text synthetic data generation techniques, such as generative pre-trained transformer model (e.g., GPT-3 foundation model, text-generation API, Gretel-like services, etc.), may be leveraged to derive evaluation features from the text dataset and synthesize missing evaluation features for the text documents.

As another example, one or more media synthetic data generation techniques may be leveraged in the event that an evaluation feature value is missing from a media dataset. A media dataset, for example in an auto-adjudication predictive domain, may include medical images such as CT-Scans, X-Rays, sonogram images, and/or the like. Media synthetic data generation techniques (e.g., ZPY for labeling faces in images for gender, race identification, etc., Blender libraries for labeling gender, race in the images, videos, etc.) may be leveraged to derive evaluation features from the media dataset and synthesize missing evaluation features for the media data.

As another example, one or more graph-based data generation techniques may be leveraged in the event that an evaluation feature value is missing from a graph training dataset, such as a knowledge graph. Graph training datasets may form a language for describing entity and input data objects. In an auto-adjudication prediction domain, healthcare data may include a complex heterogeneous network including millions of entity data objects (e.g., patients, etc.) with hundreds of thousands of affiliated entities (e.g., medical doctors, pharmacies, clinics, hospitals, laboratories, etc.) each involved with an input data object (e.g., a medical claim, etc.). Graph-based data techniques may be employed to facilitate a deeper understanding of the input data objects by modeling the relationships between the input data objects and entity data objects and/or affiliated entities associated therewith.

The graph-based data generation techniques may include one or more graph neural networks (GNN) that directly operate on the graph structure of a graph training dataset. For example, every node in the graph training dataset may be associated with a label. A GNN may include a message-passing process in which information is aggregated for every node from node neighbors at each layer. This may enrich nodes representations while preserving topological structures along with node feature characteristics. The graph-based data generation techniques may include a GNN classifier, such as a feature prediction model, configured to predict evaluation feature values for a graph node from a predictive representation of the graph node.

Using the one or more different data synthesizing techniques described herein, a synthetic dataset may be generated to balance a training dataset of any data type (e.g., text, tabular, media, graph, and/or one or more combinations thereof). The balanced training dataset may be generated using a cost function to achieve the balanced dataset with as few synthesized data object as possible. For example, if N is the number of historical input data object in the training dataset, then M may be synthesized input data objects generated to achieve the target ratios for one or more evaluation features. The data synthesizing techniques may be configured to make every possible optimization to minimize the "M" number. The balanced training dataset may then be evaluated by at least one evaluation score of the present disclosure based on an evaluation feature profile, a feature confidence score, a predicted feature confidence score, and/or any other measurement for evaluating the training dataset.

In some embodiments, the term "evaluation feature profile" refers to a data entity that describes one or more feature confidence scores for an input feature of a training dataset. The evaluation feature profile may include any type of data structure, such as a table, a linked list, and/or the like that describes feature confidence scores for the input feature. An evaluation feature profile (e.g., a $\text{DataGoodness}_{Profile}$), for example, may be generated for each input feature of the training dataset to describe one or more feature confidence scores for the respective input feature. The evaluation feature profile may include a data status and/or a feature confidence score between the input feature and each of the one or more evaluation features. A data status between an input feature and a respective evaluation feature may describe whether the input feature is imputed (e.g., added as an evaluation feature), a percentage of defined feature values for the input feature that are fully imputed, a percentage of defined feature values for the input feature that are partially synthesized, a percentage of the training data that is balanced with respect to the input feature, a percentage of data retained from the historical input data objects, and/or the like.

A feature confidence score between an input feature and a respective evaluation feature may describe a confidence for a feature pair based on the data status between the input feature and the respective evaluation feature. For example, a feature confidence score may be 0.0 in the event that no changes have been made to the training dataset with respect to the feature pair to balance the training dataset (e.g., percentage of data retained from the historical input data objects is 100%). As another example, a feature confidence score may be 0.25 in the event that minimal changes (e.g., percentage of feature values partially imputed is less than or equal to 50%) have been made to the training dataset with respect to the feature pair to balance the training dataset. As another example, a feature confidence score may be 0.75 in the event that major changes (e.g., percentage of feature values partially imputed is greater than 50%) have been made to the training dataset with respect to the feature pair to balance the training dataset. As another example, a feature confidence score may be 0.9 in the event that the feature values for the feature pair are fully imputed to balance the training dataset. As another example, a feature confidence score may be 1.0 in the event that the data is not balanced with respect to the feature pair.

In some embodiments, the evaluation feature profile includes a respective entry for each pair of evaluation and non-evaluation input features. For example, the combination of evaluation features and non-evaluation input features may be N1×N2, where N1 may be the number of evaluation features and N2 may be number of evaluation input features. In some examples, to save compute and storage resources, as an alternative N1 and N2, the pairs of evaluation and non-evaluation input features may be narrowed to one or more non-evaluation features that are closely correlating with evaluation features with higher feature impact scores and/or that are identified by one or more counterfactual proposals.

In some embodiments, the term "data impact score" refers to a data value that describes an influence of an evaluation feature on predictive outputs of a target machine learning model. The data impact score (e.g., $DfI_{Score}$) may be based on one or more feature impact measures for the evaluation features of a training dataset. A first feature impact measure (e.g., denoted as $DfI_{FIA\_Score}$), for example, may include a data value that describes a feature impact analysis for an evaluation feature. A second feature impact measure (e.g., denoted as $DfI_{PDP\_Score}$) may include a data value that describes a partial dependency plot between an evaluation feature and a predictive outcome. In some embodiments, the data impact score is an aggregation of the first and second impact measure:

$$DfI_{Score} = DfI_{FIA\_score} + DfI_{PDP\_Score}.$$

For example, the feature impact analysis and partial dependence plot may be combined to provide the data impact score that describes how evaluation features may be influencing a predictive output, such as an auto-adjudication decision in an auto-adjudication prediction domain. The higher the influence of evaluation features the more the target machine learning model could become vulnerable to responsible decisions. In some embodiments, the data impact score (e.g., $DfI_{Score}$) identifies the influence of evaluation features on the outcomes of a target machine learning model. A higher data impact score (e.g., $DfI_{Score}$) may indicate that there is a very strong influence by evaluation features on predictive outcomes and the risk to be weighted with the quality of the evaluation features.

In some embodiments, a first feature impact measure (e.g., $DfI_{FIA\_Score}$) is generated based on an impact analysis for each input feature (e.g., evaluation and non-evaluation features) using one or more interpretable machine learning models, such as explainable artificial intelligence models (XAI) including SHapley Additive explanation (SHAP), permutation based feature importance, and/or the like. The impact analysis may output a relative feature importance measure for each input feature. The first feature impact measure (e.g., $DfI_{FIA\_Score}$) may be defined by:

$$DfI_{FIA\_Score} = \frac{DfI_{FIA\_Numerator}}{xn1}$$

where the $$DfI_{FIA\_Numerator} = \sum_{x=1}^{xn1} DfIx * FeatureGoodnessFairnessRisk_{Score},\ xn1$$

is the number of evaluation features from the data evaluation profile, and DfIx is the feature importance measure each evaluation feature.

In some embodiments, the second feature impact measure (e.g., $DFI_{PDP\_Score}$) is generated between each evaluation feature and a target output of the target machine learning model based on a partial dependency plot. A partial dependency plot, for example, may describe the marginal effect the one or two features have on a predicated outcome of the target machine learning model. A partial dependency plot may show whether the relationship between a predictive output (and/or a predictive output class) and an evaluation feature is linear, monotonic, and/or more complex. The second feature impact measure (e.g., $DFI_{PDP\_Score}$) may be defined by:

$$DfI_{PDP\_Score} = \frac{DfI_{PDP\_Numerator}}{xn1}$$

where $DfI_{PDP\_Numerator}$=fDistribution_Type$_{Value}$*FeatureGoodnessFairnessRisk$_{Score}$ and the value of the fDistribution_Type$_{Value}$ is based on the relationship between the evaluation feature and the predictive output such that: (i) the fDistribution_Type$_{Value}$ may be 1 in the event that all the defined values of the evaluation feature are favoring only one class of predictive outputs (e.g., evaluation feature only favors the approval of a claim in an auto-adjudication prediction domain), (ii) fDistribution_Type$_{Value}$ may be 0.5 in the event that the defined feature values of the evaluation feature are not equally favoring both the classes of a predictive output (e.g., evaluation feature unequally favor the approval and denial of a claim in an auto-adjudication prediction domain), and/or (iii) fDistribution_Type$_{Value}$ may be 0 in the event that the defined feature values of the evaluation feature are equally favoring each class of a prediction output (e.g., evaluation feature equally favors the approval and denial of a claim in an auto-adjudication prediction domain).

In some embodiments, the term "graph feature confidence score" refers to a data value that describes a predicted accuracy of one or more predicted feature values for a graph training dataset. In some examples, the graph data score (e.g., $DfI_{GraphRiskScore}$) may include a value between 0 and 1. In some examples, the graph data score may be the inverse of a predicted feature confidence score (e.g., denoted as $F_D$Confidence Score) associated with a feature prediction model configured to generate the one or more predicted feature values for the graph training dataset. For example, the graph data score may be generated based on:

$$DfI_{GraphRiskScore} = 1 - F_D\text{Confidence Score}.$$

In some embodiments, the term "predicted feature confidence score" refers to a data value that describes a confidence level for one or more predicted feature values generated by feature prediction model. The predicted feature confidence score may include a number between 0 and 1. In some examples, the predicted feature confidence score may be closer to 1 in the event that the confidence of a feature prediction model is high with respect to the predicted feature values. The confidence may be high in the event that (i) the predicted feature values already exist within a graph node such that they are not synthesized by the feature prediction model (e.g., $F_D$Confidence Score=1) or (ii) the feature prediction model is able to infer the predicted feature values with high confidence (e.g., $F_D$Confidence Score>0.5). The confidence may be low in the event that (i) the feature prediction model is unable to infer the predicted feature values for a graph node (e.g., $F_D$Confidence Score=0) or (ii) the feature prediction model is able to infer the predicted feature values with low confidence (e.g., $F_D$Confidence Score<0.5).

In some embodiments, the term "feature prediction model" refers to data entity that describes parameters, hyper-parameters, and/or defined operations of a rules-based and/or machine learning model (e.g., model including at least one of one or more rule-based layers, one or more layers that depend on trained parameters, coefficients, and/or the like). A feature prediction model may include a machine learning model trained, configured, and/or the like to generate one or more predicted feature values for a graph node of a graph training dataset.

The feature prediction model may include one or more of any type of machine learning model including one or more supervised, unsupervised, semi-supervised, and/or reinforcement learning models. In some examples, the feature prediction model may include multiple models configured to perform one or more different stages of an optimization process. In some examples, the feature prediction model may include a GNN model trained, using an objective function, to generate one or more predicted feature values for a graph node of a graph training dataset.

In some embodiments, the predictive feature values correspond to one or more evaluation features for the graph node. In some embodiments, in the event that a graph node does not include feature values for one or more evaluation features, the feature prediction model is configured to output one or more predictive feature values for the one or more evaluation features. The one or more predictive feature values may be based one or more non-evaluation features of the graph node and/or a predictive representation for the graph node.

In some embodiments, the term "predictive representation" refers to a data entity that describes one or more features of a graph node. The predictive representation may include an intermediate output by a target graph model. The predictive representation may be leveraged by the target graph model to generate a predictive output for a graph node of the graph training dataset. The predictive representation (e.g., denoted as Hr) may include aggregated information from the graph node and/or one or more neighboring nodes in the graph training dataset. For example, $F^{(n)}{}_G$ may be aggregation information of the graph node and its n-hop neighborhood through n layers of iterations in the target graph model (e.g., denoted as $F_G$). The predictive representation of the graph node (e.g., denoted as v) of the final layer may be:

$$H_v = F^{(n)}{}_G(X_v, N_v^{(n)})$$

where $N_v^{(n)}$ may represent the n-hop neighborhoods of v. The y^ may be obtained by sigmoid $H_{v,w}$.

In some embodiments, the term "target graph model" refers to data entity that describes parameters, hyper-parameters, and/or defined operations of a rules-based and/or machine learning model (e.g., model including at least one of one or more rule-based layers, one or more layers that depend on trained parameters, coefficients, and/or the like). A target graph model may include a machine learning model trained, configured, and/or the like to generate predictive output for a graph node of a graph training dataset. For example, the target graph model may include a type of target machine learning model tailored for a training dataset that includes a graph training dataset.

The target graph model may include one or more of any type of machine learning model including one or more supervised, unsupervised, semi-supervised, and/or reinforcement learning models. In some examples, the target graph model may include multiple models configured to perform one or more different stages of a classification process. In some examples, the target graph model may include a GNN model trained, using an objective function, to generate a predictive output for a graph node of a graph training dataset. The predictive output may depend on the predictive domain. As one example, in an auto-adjudication prediction domain, the predictive output may include a claim decision (e.g., approval or denial) of a medical claim for a patient.

In some embodiments, target graph model (e.g., denoted as $F_G$) is configured to receive a graph training dataset (e.g., denoted as G=(V, E, X)) as its input. The graph training dataset may include a set of N graph nodes (e.g., V), a set of edges (e.g., E) between the graph nodes, and a set of input features (e.g., X) corresponding to the graph nodes. The graph nodes may include input features that depend on the prediction domain. In one example, the input features may be indicative of medical procedures, diagnosis codes, medication information, and/or the like in an auto-adjudication prediction domain. The target graph model may be configured such that, given a graph training dataset (e.g., G) that includes a set of patient nodes with one or more evaluation features (e.g., D), the goal is to learn a fair graph neural network as a graph classification:

$$F(G, Y, D) \rightarrow y^{\wedge}$$

where f is a learned fairness function and Y is the predictive output of the target graph model (e.g., $F_G$). The target graph model may be trained using a joint objective function based on a first and second objective function tailored to the target graph model and the feature prediction model, respectively.

In some embodiments, the term "joint objective function" refers to an algorithm, equation, and/or any other sequence of operations that is configured for training and/or evaluating the performance of a machine learning model. For example, the joint objective function may include an optimization function for jointly training the target graph model and the feature prediction model. The target graph model, for example, may be configured to update one or more parameters of the model by minimizing the joint objective function. The joint objective function may be based on a first objective function for the target graph model and a second objective function for the feature prediction model.

In some embodiments, during a training phase, for each graph node of the graph training dataset, the feature prediction model (e.g., $F_D$) may predict evaluation feature values while the target graph model (e.g., $F_G$) learns a predictive representation (e.g., $H_v$) that prevents the target graph model from recognizing which evaluation group (e.g., a demographic group in an auto-adjudication prediction domain) a graph node patient belongs to:

$$\mathrm{Min}_q\ \mathrm{max}_q\ L_A = p(h \mid d^\wedge = 1) + p(h \mid d^\wedge = 0)$$

where p(h|d^=1) may identify a sampling node with evaluation feature values as 1 from the graph training dataset.

The joint objective function for the target graph model may be:

$$\mathrm{Min}_q\ L_D + L_A + L_G$$

where $L_D$ may be an output of a second objective function and $L_G$ may be an output from a first objective function.

In some embodiments, the term "first objective function" refers to an algorithm, equation, and/or any other sequence of operations for training and/or evaluating the performance of the target graph model. For example, the first objective function may include an optimization function tailored to the target graph model. The first objective function may be formulated as:

$$\mathrm{Min}_q\ L_G = -1/V\ S[y\ \log\ y^\wedge + (1-y)\ \log\ (1-y^\wedge)]$$

where q denotes parameters of the target graph model (e.g., $F_G$) and y denotes a ground truth label for a graph node. Due to graph structure as well as its aggregation mechanism, the target graph model (e.g., $F_G$) may initially generate biased predictive outputs. Graph nodes with similar evaluation feature values, for example, may be more likely to connect to each other in a graph training dataset. This helps the feature prediction model (e.g., $F_D$) to estimate the evaluation feature values for graph nodes with unknown values. The feature prediction model may be optimized using a second objective function that may be combined with the first objective function to debias the target graph model.

In some embodiments, the term "second objective function" refers to an algorithm, equation, and/or any other sequence of operations for training and/or evaluating the performance of a feature prediction model. For example, the second objective function may include an optimization function tailored to the feature prediction model. The second objective function may be formulated as:

$$\mathrm{Min}_q\ L_D = -1/V\ S[d\ \log\ d^\wedge + (1-d)\ \log\ (1-d^\wedge)]$$

where q denotes parameters of the feature prediction model (e.g., $F_D$) and d^ may be the predicted feature values.

In some embodiments, the term "model evaluation score" refers to an evaluation score that is associated with a performance of a target machine learning model with respect to the one or more evaluation groups. The model evaluation score (e.g., $\mathrm{modelRisk}_{FairnessScore}$) may be based on one or more aspects of the target machine learning model. In some examples, the model evaluation score may include an aggregation of a plurality of performance metrics for the target machine learning model. The performance metrics may include any type and/or combination of machine learning performance metrics. In some examples, the performance metrics may include a selection rate, a false positive rate, and/or a false negative rate for the target machine learning model with respect to the one or more evaluation groups. The selection rate (e.g., $\mathrm{selectionRateRisk\_f}_{FairnessScore}$) may be indicative of a percentage of predictive outputs of a positive output class that are generated for an evaluation group within the plurality of input data object of the training dataset. The false positive rate (e.g., $\mathrm{falsePositiveRisk\_f}_{FairnessScore}$) may be indicative of a percentage of predictive outputs that incorrectly predicted a positive output class for input data objects of the evaluation group. The false negative rate (e.g., $\mathrm{falseNegativeRisk\_f}_{FairnessScore}$) may be indicative of a percentage of predictive outputs that incorrectly predicted a negative output class for input data objects of the evaluation group.

In some embodiments, the model evaluation score (e.g., $\mathrm{modelRisk}_{FairnessScore}$) is defined by:

$$modelRiskNumerator_{FairnessScore} = \left(\sum_{f=1}^{N} \mathrm{selectionRateRisk\_f}_{FairnessScore} + \sum_{f=1}^{N} \mathrm{falsePositiveRisk\_f}_{FairnessScore} + \sum_{f=1}^{N} \mathrm{falseNegativeRisk\_f}_{FairnessScore}\right)$$

$$modelRisk_{FairnessScore} = \frac{\left(\frac{modelRiskNumerator_{FairnessScore}}{3}\right)}{N}$$

where f is an evaluation feature in the evaluation feature profile and N is the number of evaluation features.

In some embodiments, the selection rate (e.g., $\mathrm{selectionRateRisk\_f}_{FairnessScore}$) equals assigned as follows: (i) the selection rate equals 1 when the selection rate values are higher only for few evaluation feature values defined by an evaluation feature, (ii) the selection rate equals 0.5 when the selection rate values are not equally distributed across evaluation feature values, and (iii) the selection rate equals 0 when the selection rate values are equally favoring across the evaluation feature values.

In some embodiments, the false positive rate (e.g., $\mathrm{falsePositiveRisk\_f}_{FairnessScore}$) equals assigned as follows: (i) the false positive rate equals 1 when the false positive values are generally higher in the target machine learning model or false positive values are higher for few evaluation feature values defined by the demographic feature, (ii) the false positive rate equals 0.5 when the false positive values are generally lower in the target machine learning model and false positive values are not equally distributed among the evaluation feature values, and (iii) the false positive rate equals 0 when the false positive values are equally favoring across evaluation feature values, and they are generally lower for the target machine learning model.

In some embodiments, the false negative rate (e.g., $\mathrm{falseNegativeRisk\_f}_{FairnessScore}$) equals assigned as follows: (i) false negative rate equals 1 when the false negative values are generally higher in the target machine learning model or false negative values are higher for few evaluation feature values defined by the evaluation feature (ii) the false negative rate equals 0.5 when the false negative values are generally lower in the target machine learning model and false negative values are not equally distributed among the evaluation feature values, and (iii) the false negative rate equals 0 when the false negative values are equally favoring across evaluation feature values, and they are generally lower for the target machine learning model.

In some embodiments, the term "decision evaluation score" refers to an evaluation score that is associated with one or more particular decisions of a target machine learning model. The decision evaluation score (e.g., CounterFactualRisk$_{FairnessScore}$) may be based on one or more counterfactual proposals for predictive outputs of the target machine learning model. For example, the decision evaluation score may include a fairness metric for individual predictive outputs (e.g., at auto-adjudication claim level) that are generated using counterfactual proposals. A counterfactual proposal may be used to explain individual predictive outputs during inference phase once the target machine learning model is deployed. A counterfactual proposal may be generated by leveraging one or more counterfactual algorithms, such as DICE, CCHVAE, CEM, CLUE, CRUDS, FACE, Growing Spheres, Revise, Wacter, and/or the like. The counterfactual algorithms may be used with the plurality of input features to generate one or more counterfactual proposals for predictive output.

A counterfactual proposal is indicative of a predictive change to one or more input features of an input data object that may impact the predictive output for the input data object. By way of example, for an input data object associated with a negative predictive output (e.g., a predictive output of a negative predictive class), a counterfactual proposal may identify one or more input feature values that may be modified to change the negative predictive output to a positive predictive output. The counterfactual proposal may depend on the input features and/or a prediction domain. As one example, for an auto-adjudication prediction domain, one or more counterfactual proposals of a medical claim may include: modifying a policy attribute for the medical claim (e.g., a current policy has not been renewed such that the claim cannot be processed), adding medical claims artifacts (e.g., claim artifacts are missing for adjudication process and claim limit is exceeded), modifying an evaluation feature value (e.g., if the gender is changed from male to female), and/or the like.

The decision evaluation score may be based on a percentage of counterfactual proposals that identify one or more evaluation features for the prediction domain. For example, when an evaluation feature is identified by a counterfactual proposal for an input data object, a recourse method may be applied to generate the decision evaluation score. The recourse method may include, using a machine learning model, such as a Bayesian network learning and inference model (e.g., bnlearn package, etc.), predicting a possibility of the counterfactual proposal.

In the event that the counterfactual proposal is possible, and the proposal is allowed by one or more input data object exceptions for the evaluation feature, the decision evaluation score may be high. For instance, the decision evaluation score may include the product of 1 and the feature confidence score:

$$CounterFactualRisk_{FairnessScore} = 1 * FeatureGoodnessFairness_{RiskScore)}$$

In the event that the counterfactual proposal is not possible, but the proposal is allowed by one or more input data object exceptions for the evaluation feature, the decision evaluation score may be intermediate. For instance, the decision evaluation score may include the product of 0.5 and the feature confidence score:

$$CounterFactualRisk_{FairnessScore} = 0.5 * FeatureGoodnessFairness_{RiskScore.}$$

In the event that the counterfactual proposal is not possible, or the proposal is prohibited by one or more input data object exceptions for the evaluation feature, the decision evaluation score may be low. For instance, the decision evaluation score may be 0.

In some embodiments, the term "evaluation output" refers to an indication, such as an alert, notification, and/or the like, of an evaluation of the target machine learning model. An evaluation output may be indicative of a holistic evaluation score, a holistic evaluation vector, and/or one or more aspects thereof. In some examples, the evaluation output may be indicative of a comparison between a plurality of holistic evaluation scores/vectors over time. In some examples, the evaluation output may be indicative of a performance degradation of the target machine learning model.

In some embodiments, the term "performance degradation" refers to a post-deployment event for the target machine learning model. The performance degradation may be indicative of a threshold change in one or more evaluation scores for the target machine learning model, such as the data evaluation scores, model evaluation scores, and/or decision evaluation scores. In some examples, the threshold change may include a threshold decrease in a holistic evaluation score. In some examples, the threshold change may include a threshold decrease in a decision evaluation score, for example, due to counterfactual proposals favoring an evaluation feature.

In some embodiments, the term "influencing feature" refers to an input feature that is correlated to a performance degradation for the target machine learning model. For instance, the influencing feature may be identified using one or more counterfactual proposals as described herein. In some examples, the influencing feature may include an evaluation feature.

In some embodiments, the term "supplemental training dataset" refers to a data entity that includes a plurality of supplemental data objects associated with a prediction domain. The type, format, and parameters of each data object may be based on the prediction domain. The supplemental training dataset may include a plurality of supplemental input data object. The supplemental input data object may include manually classified input data object corresponding to an influencing feature associated with a performance degradation of the target machine learning model.

In some embodiments, the term "threshold augmentation stimulus" refers to a threshold number of input data objects in the supplemental training dataset. The threshold augmentation stimulus may identify a number of supplemental input data objects sufficient for retraining the target machine learning model.

IV. Overview, Technical Improvements, and Technical Advantages

Embodiments of the present disclosure present machine learning evaluation, training, data augmentation, and monitoring techniques that improve upon the transparency, comprehensiveness, and universality of traditional machine learning techniques. The techniques of the present disclosure enable the evaluation of a complete machine learning lifecycle from training, inference, and monitoring stages and reflect holistic evaluation measures that represent the overall performance of the machine learning model. The techniques leverage the holistic evaluation measures to monitor the performance of the machine learning model automatically and continuously and, when optimal, trigger retraining operations. The techniques include a series of domain agnostic steps, methods, processes, which may be applied to any predictive domain to generate holistic evaluation measures that holistically consider each stage of a machine learning model life cycle as well as the life cycle as a whole. In this way, the present disclosure provides evaluation techniques that improve upon the interpretability and completeness of machine learning model evaluation metrics.

Some techniques of the present disclosure include creating an evaluation feature profile from training data of various data types, such as tabular, text, media, graph, and/or the like. The evaluation feature profile may identify one or more sensitive features (e.g., demographic attributes, etc.) that may be monitored during each stage of a machine learning model's lifecycle (e.g., to evaluate a model's fairness, etc.). The techniques may include identifying target ratios (e.g., population densities for a particular demographics, etc.) for the evaluation features and may leverage data augmentation techniques to balance a training dataset for a machine learning model during a training phase of the model's lifecycle. Once balanced, a plurality of different data, model, and decision evaluation algorithms may be applied to find the relationships between the evaluation features, non-evaluation features, and the predictive outputs of the machine learning model. Knowledge of these relationships may be leveraged to generate a plurality of evaluation scores (e.g., data evaluation scores, model evaluation scores, decision evaluation scores, etc.) for each stage of the model's lifecycle. Using the techniques described herein, these scores may be aggregated to generate holistic representations (e.g., holistic evaluation vectors, holistic evaluation scores, etc.) of a machine learning model's performance (e.g., fairness, etc.). Unlike traditional machine learning evaluation techniques, the holistic representations of the present disclosure provide a holistic and interpretable representation of a machine learning model's performance.

Some techniques of the present disclosure enable the universal evaluation and training of a machine learning model. The evaluation and training techniques may be applicable to a training dataset and input data objects of various different data formats including knowledge graphs. To account for the nuances of graph machine learning models and graph training datasets, the present disclosure provides joint training and evaluation techniques that jointly train two machine learning models, a target graph and feature prediction model, to create and utilize an evaluation feature agnostic intermediate representation of graph nodes of the graph training dataset. The feature prediction model may be leveraged to generate an evaluation metric that is tailored to graph datasets and that may be aggregated with the holistic evaluation representations of the present disclosure to tailor the evaluation techniques to graph-based models.

Some techniques of the present disclosure enable the continuous and automatic monitoring of a machine learning model. The monitoring techniques include continuously monitoring at least one of the inputs and/or performance metrics of a deployed machine learning model, over time, to intelligently trigger retraining operations for the model in response to one or more stimuli. The stimuli may be configured to retrain a model in the event that the model's performance degrades and/or the training data used to train the model increases in reliability and/or robustness. For example, a model may be initially trained based on synthetic data that is generated to balance a training dataset. Using the techniques of the present disclosure, inputs to a machine learning model may be tracked to identify real world replacements for the synthetic data objects. In the event that the model's performance degrades, the real-world replacements may be used to augment the training dataset and the augmented training dataset may be used to retrain the model. In this way, a machine learning model may be continuously monitored to improve the model over time.

Example technologically advantageous embodiments of the present disclosure include a holistic approach to evaluating a machine learning model that (i) score the fairness level of the model based on evaluation features across all phases (e.g., training, testing, inference, post-deployment, etc.) of a model's lifecycle, (ii) identify and evaluate imputed input features that indirectly reflect evaluation features, (iii) perform feature impact analysis with evaluation features for fairness, (iv) derive the impact of multiple features by applying counterfactual methods for model input features, evaluation features, and imputed evaluation features, (v) generate graph based evaluation metrics for GNNs, (vi) introduce responsible artificial intelligence scores for the healthiness of AI/ML models with respect to evaluation features for the models, (vii) dynamically identify evaluation feature sets based on non-evaluation features, and (viii) generate holistic evaluation feature specific performance scores for a training dataset, model parameters, and model decisions.

V. Example System Operations

As indicated, various embodiments of the present disclosure make important technical contributions to machine learning evaluation, training, monitoring, and data augmentation techniques. In particular, systems and methods are disclosed herein that implement techniques configured to generate evaluation scores and leverage those evaluation score to monitor and train machine learning models. In this way, one holistic evaluation score may be generated that improves upon existing evaluation techniques, among other improvements described herein.

Figure 3:
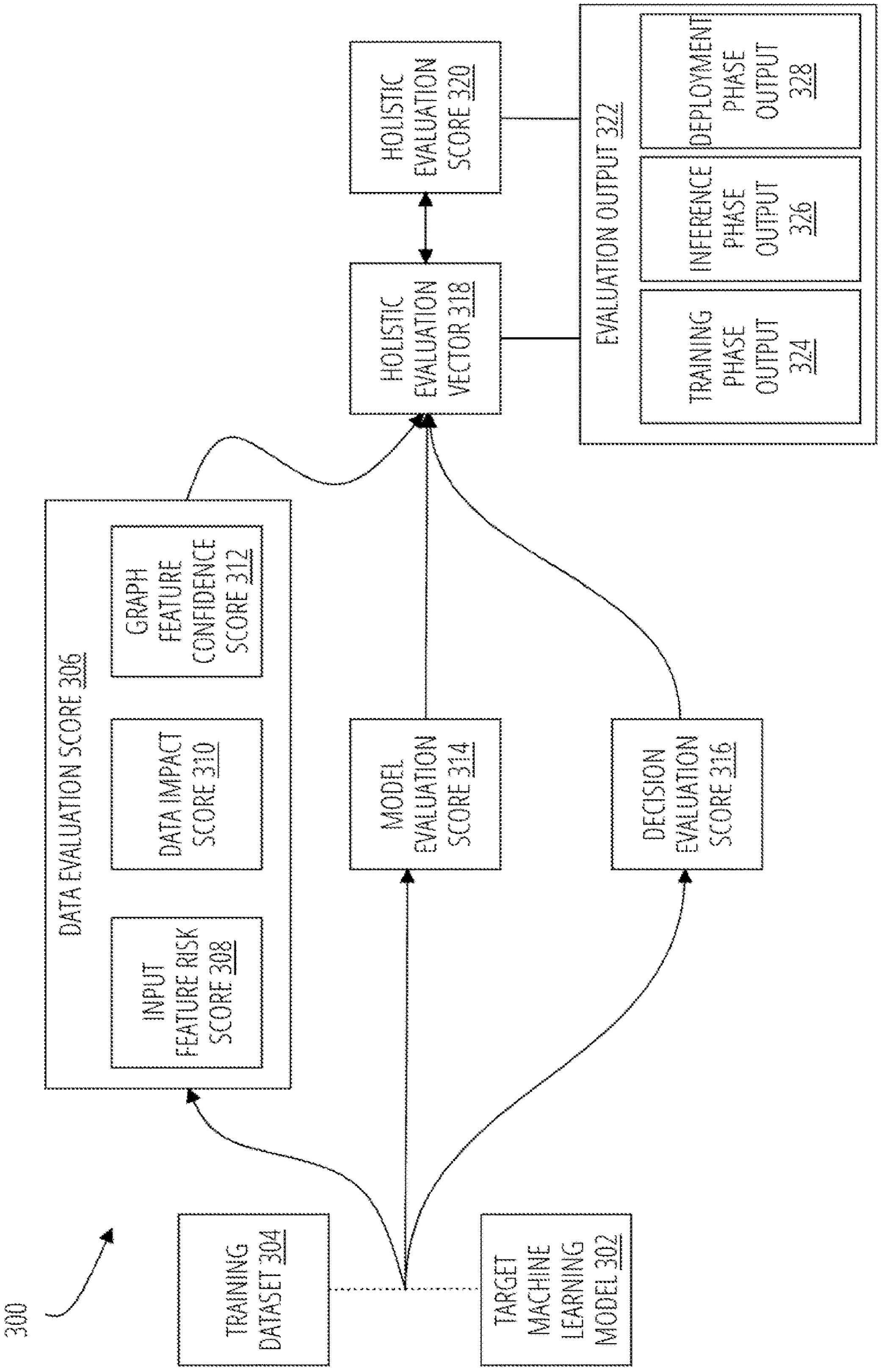
FIG. 3 is a dataflow diagram showing example data structures for holistically evaluating a machine learning model in accordance with some embodiments discussed herein.

FIG. 3 is a dataflow diagram 300 showing example data structures for holistically evaluating a machine learning model in accordance with some embodiments discussed herein. The dataflow diagram 300 depicts a set of data structures and modules for holistically evaluating one or more aspects of the target machine learning model 302 and/or an associated training dataset 304.

In some embodiments, the target machine learning model 302 describes a data entity with a plurality of parameters, hyper-parameters, and/or defined operations (e.g., model including at least one of one or more rule-based layers, one or more layers that depend on trained parameters, coefficients, and/or the like). The target machine learning model 302 may include a machine learning model that is the target of one or more evaluation, monitoring, and/or training techniques of the present disclosure.

As described herein, the evaluation, monitoring, and/or training techniques of the present disclosure may be implemented for a plurality of different prediction domains. The configuration, type, and/or other characteristics of the target machine learning model 302 may be dependent on the particular domain. The target machine learning model 302, for example, may be configured, trained, and/or the like, to perform and/or facilitate one or more different operations based on the domain. As one example, the evaluation, monitoring, and/or training techniques of the present disclosure may be implemented for a claim adjudication prediction domain in which an adjudication decision is rendered for a medical claim. In such a case, the target machine learning model 302 may include a predictive claim adjudication model configured, trained, and/or the like to predict a claim decision (e.g., approval, denial, etc.) for a medical claim. By way of example, the techniques of the present disclosure may be applied to an auto-adjudication process in which a sequence of autonomous steps are performed to make an initial determination of whether to approve (e.g., for payment, administration, etc.) or deny insurance and/or public benefit medical claims before manually reviewing each claim. The target machine learning model 302 may include a machine learning model adapted to perform one or more steps of the auto-adjudication process.

The target machine learning model 302 may include one or more of any type of machine learning model including one or more supervised, unsupervised, semi-supervised, and/or reinforcement learning models. In some examples, the target machine learning model 302 may include multiple models configured to perform one or more different stages of a predictive process. In some examples, the target machine learning model 302 may include a machine learning model trained, using one or more supervised training techniques, to generate a predictive output (e.g., a claim decision in an auto-adjudication prediction domain) for an input data object (e.g., a claim in an auto-adjudication prediction domain). For instance, the target machine learning model 302 may include one or more supervised classifier models implemented using one or more model architectures, such as neural networks, regression models, and/or the like. As some examples, the target machine learning model 302 may include one or more neural networks, such as BERT models, GPT-3 models, CLIP models, Codex models, Dall-E models, and/or the like.

In some embodiments, the target machine learning model 302 is previously trained based on the training dataset 304. For instance, the target machine learning model 302 may be previously trained, using the training dataset 304, to output a predictive output for an input data object.

The training dataset 304 includes a plurality of data objects associated with a prediction domain. The type, format, and parameters of each data object may be based on the prediction domain. For example, the training dataset 304 may include a plurality of historical and/or synthetic input data objects and/or entity data objects. As an example, in an auto-adjudication prediction domain, a historical and/or synthetic input data object may include a historical and/or synthetic medical claim. In the same domain, a historical and/or synthetic entity data object may include an existing (e.g., previously identified) and/or synthetic patient with a medical claim.

In some embodiments, the training dataset 304 includes a collection of a plurality of data objects, and/or contextual data associated therewith, that is used to train the target machine learning model 302. The training dataset 304 may include a balanced training dataset that includes a historical dataset that is augmented by one or more synthetic datasets. The historical dataset may include a plurality of historical data objects that correspond to historical and/or preexisting events (e.g., previously adjudicated medical claims, etc.), entities (e.g., previously identified patients, etc.), and/or the like for a prediction domain. The synthetic datasets may each include a plurality of synthetic data objects that are generated to balance the historical dataset by adding synthetic data objects with underrepresented input feature values. The synthetic data objects may correspond to synthetic events (e.g., a medical claim generated with one or more underrepresented input feature values), synthetic entities (e.g., patients generated with one or more underrepresented input feature values, etc.), and/or the like for a prediction domain.

In some embodiments, the training dataset 304 includes one or more of a plurality of different data representations, structures, and/or formats. For example, the training dataset 304 may include tabular data, text data, media data, graph data, and/or the like. Each input data object may include input features that are represented in one or more of these data formats. Tabular data, for example, may include data that is organized in a table with rows, columns, and/or the like. Text data may include data that is expressed by natural language and/or computer interpretable languages. Media data may include data that is described by media data structures, such as pictures, video, and/or the like. Graph data may include data that is described by a knowledge graph with one or more nodes connected by a set of edges.

In some embodiments, the training dataset 304 includes a plurality of input data objects that are associated with a plurality of input features. In some embodiments, an input data object may be a data entity that describes data provided to an algorithm—such as the target machine learning model 302—to generate a predictive output. The type, format, and parameters of the input data object may be based on the prediction domain. The input data object may include a plurality of input feature values that may be considered by an algorithm to generate the predictive output. In some embodiments, the algorithm is a machine learning model that may be trained to generate the predictive output based on the input feature values of the input data object. As one example, in an auto-adjudication prediction domain, the input data object may correspond to a medical claim for a patient. In such a case, the input feature values may include (i) one or more patient feature values that describe a patient's medical history, previous claims, demographic features, and/or the like, (ii) one or more claim feature values that describe a claim's procedure type, diagnosis code, medical equipment, insurer requirements, physician deadlines, and/or the like, and/or any other value descriptive of an auto-adjudication process.

In some embodiments, the training dataset 304 includes a plurality of entity data objects that are associated with a plurality of input features. In some embodiments, an entity data object is a data entity that describes an entity corresponding to an input data object. The type, format, and parameters of the entity data object may be based on the prediction domain. The entity data object may include a plurality of input feature values that may be considered by an algorithm—such as target machine learning model 302—to generate a predictive output. In some examples, the algorithm may include a machine learning model that is trained to generate a predictive output for an input data object based on one or more input feature values of a corresponding entity data object. As one example, in an auto-adjudication prediction domain, the entity data object may correspond to a patient for which a medical claim has been filed. In such a case, the input features may include one or more patient feature values that describe a patient's medical history, previous claims, demographic features, and/or the like.

In some examples, one or more input data objects may correspond to an entity data object. For instance, an input data object may include an input feature value that identifies the corresponding entity data object. The entity data object may be a common entity shared by one or more input data objects with input feature values identifying the entity data object. As one example, in an auto-adjudication prediction domain, an input data object may include a medical claim for a patient that is represented by an entity data object. The patient (e.g., the entity data object) may have a plurality of medical claims each corresponding to a separate input data object that may be separately processed by an algorithm, such as the target machine learning model 302. Each input data object corresponding to an entity data object may incorporate the input feature values of the entity data object for analysis by an algorithm. For instance, the input data object and the entity data object may each include a plurality of input feature values that may be jointly considered by the algorithm to generate a predictive output for the input data object.

Each input data object and/or entity data object includes an input feature value for one or more of a plurality of input features associated with the training dataset 304. In some embodiments, an input feature is a data entity that describes a type of attribute of an input data object and/or an entity data object. An input feature may describe a class of feature values for an input data object and/or entity data object. For instance, an input feature may include one or more defined feature values. A respective input data object and/or entity data object may include one of the one or more defined feature values for one or more of a plurality of input features. A defined feature value may depend on a data type of the input feature and may include a classification, category, binary value, and/or the like.

The type, format, and/or parameters of the input features may be based on the prediction domain. As one example, in an auto-adjudication prediction domain, the input features may include one or more medical history features, previous claim features, demographic features, procedure features, diagnosis code features, medical equipment features, insurer requirement features, physician deadline features, and/or the like. Each of the input features may define a class of values that describe a particular characteristic of a medical claim and/or associated patient. By way of example, a medical history feature may include one or more defined feature values that identify one or more medical conditions, previous medical procedures, and/or the like for a patient. As another example, the diagnosis code features may include one or more defined feature values that identify one or more diagnosis classifications for a medical claim. As yet another example, the demographic features may include one or more defined feature values that identify a particular demographic class of a patient. These input features are provided for means of illustration. The listed features do not represent a closed list and those with ordinary skill in the art will understand that any of a plurality of different input features may be used in an auto-adjudication prediction domain.

In some embodiments, the input features may include one or more evaluation features and one or more non-evaluation features.

In some embodiments, an evaluation feature is an input feature that describes a potentially sensitive attribute of an input data object and/or entity data object. An evaluation feature may describe an input feature that is evaluated by the evaluation techniques of the present disclosure. As an example, the evaluation techniques of the present disclosure may evaluate the impact of evaluation features at each phase (e.g., training, inference, monitoring, etc.) of a machine learning model—such as the target machine learning model 302—to ensure the evaluation features do not bias predictive outputs of the machine learning model with respect to particular evaluation feature values of the evaluation features.

The type, format, and parameters of the evaluation features may be based on the prediction domain. As one example, in an auto-adjudication prediction domain, the evaluation features may include demographic features that, in some circumstances, should not be considered by a machine learning model when generating a predictive output. As examples, evaluation features may include a gender feature (e.g., defining one or more feature values indicative of a gender classification, such as man, woman, etc.), a race feature (e.g., defining one or more feature values indicative of a race classification, such as Caucasian, African American, Native American, etc.), an income feature (e.g., defining one or more income levels, etc.), an age feature (e.g., defining one or more age ranges, etc.), and/or any other protected or sensitive attribute.

In some embodiments, a non-evaluation feature is an input feature that is not an evaluation feature for an input data object and/or entity data object. A non-evaluation feature may include an include feature that is not designated as an evaluation feature for an evaluation process. The target machine learning model 302 may be trained to consider non-evaluation features to generate a predictive output for an input data object.

In some embodiments, the predictive output describes an output from an algorithm, such as the target machine learning model 302. The predictive output may include any type of data entity generated using a predictive algorithm, such as the target machine learning model 302. In some embodiments, the predictive output includes a classification for an input data object. For example, in an auto-adjudication prediction domain, the predictive output may include an auto-adjudication decision for a medical claim. The auto-adjudication decision may describe whether the medical claim should be approved (e.g., paid for, etc.) and/or denied. The predictive output may be associated with one or more predictive output classes that define one or more different types of outputs. The predictive output classes may include at least one positive output class and at least one negative output class. By way of example, in an auto-adjudication prediction domain, a positive output class may include a claim approval, whereas a negative output class may include a claim denial. In such a case, predictive outputs of a positive output class may include claim approvals, whereas predictive outputs of a negative output class may include claim denials. In some examples, additional consideration may be drawn to predictive outputs of a negative output class to prevent unfair outcomes, such as claim denials based on potentially irrelevant information.

In some embodiments, a holistic evaluation vector 318 is generated for the target machine learning model 302 based on the target machine learning model 302 and the training dataset 304. For instance, the holistic evaluation vector 318 may be based on a plurality of evaluation scores for the target machine learning model 302 and/or training dataset 304. The plurality of evaluation scores may include a data evaluation score 306, a model evaluation score 314, and/or a decision evaluation score 316. The data evaluation score 306 may correspond to the training dataset 304 for the target machine learning model 302. The model evaluation score 314 may correspond to one or more performance metrics for the target machine learning model 302. The decision evaluation score 316 may correspond to a predictive output class of one or more predictive outputs generated by the target machine learning model 302. In this way, a holistic evaluation vector 318 may be generated that incorporates information from a plurality of evaluation metrics tailored to each stage of development of the target machine learning model 302.

In some embodiments, the holistic evaluation vector 318 describes a plurality of evaluation scores for a target machine learning model 302. The holistic evaluation vector 318 may include vector, array, deque, linked list, map, multiset, and/or any other data structure that may describe multiple, different, evaluation scores for a target machine learning model 302. Each component (e.g., evaluation score) of the holistic evaluation vector 318 may describe the metric for a different component of the target machine learning model 302 and/or a process in which the target machine learning model 302 is generated. As examples, a first component (e.g., a data evaluation score 306, etc.) may evaluate a training phase of the target machine learning model 302, a second component (e.g., a model evaluation score 314, etc.) may evaluate an inference phase for an initially trained model, a third component (e.g., a decision evaluation score 316, etc.) may evaluate a post-deployment, monitoring phase for a trained model, and/or the like. In this way, the holistic evaluation vector 318 may include a multi-component vector that, taken as whole, holistically evaluates various potentially interrelated aspects of a target machine learning model 302 at one or more phases of development and/or use.

In some embodiments, an evaluation score is a discrete component of a holistic evaluation data entity for the target machine learning model 302. An evaluation score may include any data type, format, and/or value that evaluates a particular aspect of the target machine learning model 302. Each evaluation score, by itself, may represent a quality of a different aspect of the target machine learning model 302 that, when taken together, may illustrate a holistic quality of the model. By way of example, a first evaluation score, such as the data evaluation score 306, may be dependent on the training dataset 304 used to train the target machine learning model 302 and may represent a quality of the training dataset 304. A second evaluation score, such as the model evaluation score 314, may be dependent on a performance of the target machine learning model 302 and may represent a quality of the configuration of the target machine learning model 302. A third evaluation score, such as the decision evaluation score 316, may be dependent on one or more particular predictive outputs of the target machine learning model and may represent a quality of predictive outputs generated by the target machine learning model 302 with respect to at least one predictive output class. The type, format, and/or value of an evaluation score may be based on the prediction domain. As an example, in an auto-adjudication prediction domain, an evaluation score may describe a biasness and/or fairness of the training dataset 304, the target machine learning model 302, predictive outputs of the target machine learning model 302, and/or the like.

In some embodiments, the evaluation scores include the data evaluation score 306, the model evaluation score 314, and the decision evaluation score 316.

The data evaluation score 306 may be indicative of a balance of the training dataset 304 with respect to a plurality of feature values represented by a plurality of data objects (e.g., input data objects, entity data objects, etc.) of the training dataset 304. In some embodiments, the data evaluation score 306 is an evaluation score that is associated with the training dataset 304 used to train the target machine learning model 302. The data evaluation score 306 (e.g., $featureRisk_{FairnessScore}$) may be based on one or more aspects of the training dataset 304 and/or the impact of the training dataset 304 on the target machine learning model 302. For example. the data evaluation score 306 may be indicative of a degree to which the training dataset 304 is balanced by a synthetic information and, in some cases, an impact of the synthetic information on predictive outputs of the target machine learning model 302.

In some embodiments, the data evaluation score 306 includes an aggregation of a plurality of data risk scores respectively generated for one or more different aspects of the training dataset 304. The risk scores, for example, may include an input feature risk score 308 (e.g., denoted as $rC_{Score}$), a data impact score 310 (e.g., denoted as $DFI_{Score}$), and, in some examples in which the training dataset 304 includes a graph training dataset, a graph feature confidence score 312 (e.g., denoted as $DFI_{GraphRiskScore}$). The data evaluation score 306 may include an overall feature risk score (e.g., denoted as $featureRisk_{FairnessScore}$) that evaluates the input features of the training dataset. By way of example, data evaluation score 306 may be defined as: $featureRiskNumerator_{FairnessScore}=rC_{Score}+DFI_{Score}+DFI_{GraphRiskScore}$ and $featureRisk_{FairnessScore}=featureRiskNumerator_{FairnessScore}/N$ where (i) N=3 in the event that the training dataset 304 includes a graph training dataset and (ii) N=2 and the $DFI_{GraphRiskScore}=0$ in event that the training dataset 304 does not include a graph training dataset. The higher the data evaluation score 306 the weaker the responsible factor for a target machine learning model 302. In some embodiments, the data evaluation score is derived during the training phase as the target machine learning model 302 is generated.

In some embodiments, the model evaluation score 314 is an evaluation score that is associated with a performance of the target machine learning model 302 with respect to one or more evaluation groups of input data objects. The model evaluation score 314 (e.g., $modelRisk_{FairnessScore}$) may be based on one or more aspects of the target machine learning model 302. In some examples, the model evaluation score 314 may include an aggregation of a plurality of performance metrics for the target machine learning model 302. The performance metrics may include any type and/or combination of machine learning performance metrics. In some examples, the performance metrics may include a selection rate, a false positive rate, and/or a false negative rate for the target machine learning model 302 with respect to the one or more evaluation groups. The selection rate (e.g., $selectionRateRisk\_f_{FairnessScore}$) may be indicative of a percentage of predictive outputs of a positive output class that are generated for an evaluation group within the plurality of input data object of the training dataset 304. The false positive rate (e.g., $falsePositiveRisk\_f_{FairnessScore}$) may be indicative of a percentage of predictive outputs that incorrectly predicted a positive output class for input data objects of the evaluation group. The false negative rate (e.g., false $NegativeRisk\_f_{FairnessScore}$) may be indicative of a percentage of predictive outputs that incorrectly predicted a negative output class for input data objects of the evaluation group.

In some embodiments, the decision evaluation score 316 is an evaluation score that is associated with one or more particular decisions of the target machine learning model 302. The decision evaluation score 316 (e.g., $CounterFactualRisk_{FairnessScore}$) may be based on one or more counterfactual proposals for predictive outputs of the target machine learning model 302. For example, the decision evaluation score 316 may include a fairness metric for individual predictive outputs (e.g., at auto-adjudication claim level) that are generated using counterfactual proposals.

In some embodiments, a holistic evaluation score 320 is generated for the target machine learning model 302 based on an aggregation of the holistic evaluation vector 318. For instance, the holistic evaluation vector 318 may include a fairness vector with at least three evaluation scores. The evaluation scores may include any type of evaluation score for any aspect and/or phase of the target machine learning model. In some examples, the evaluation scores may include: (i) the data evaluation score 306 (e.g., $featureRisk_{FairnessScore}$) configured to evaluate a training dataset 304 for the target machine learning model 302, (ii) the model evaluation score 314 (e.g., denoted as model $Risk_{FairnessScore}$) configured to evaluate the performance of the target machine learning model 302, (iii) the decision evaluation score 316 (e.g., denoted as counter $factualRisk_{FairnessScore}$) configured to evaluate outputs of the target machine learning model 302, and/or the like. By way of example, the holistic evaluation vector 318 may be defined as: $Auto\text{-}Adjudication_{VectorScore}$=[$featureRisk_{FairnessScore}$, $modelRisk_{FairnessScore}$, $counterfactualRisk_{FairnessScore}$].

The holistic evaluation score 320 describes the plurality of evaluation scores of the holistic evaluation vector 318 using one, holistic, parameter. The holistic evaluation score 320 may include a compressed holistic evaluation vector. By way of example, the holistic evaluation score 320 may be defined as: $Auto\text{-}Adjudication_{Score}=1-(feature\,Risk_{FairnessScore}+modelRisk_{FairnessScore}+counterfactual\text{-}Risk_{FairnessScore}/3)$.

In some embodiments, an evaluation output 322 may be generated and/or provided for the target machine learning models 302 based on the holistic evaluation score 320 and/or the holistic evaluation vector 318. In some embodiments, the evaluation output 322 includes an indication, such as an alert, notification, and/or the like, of an evaluation of the target machine learning model 302. The evaluation output 322 may be indicative of the holistic evaluation score 320, the holistic evaluation vector 318, and/or one or more aspects thereof.

As some examples, the evaluation output 322 may include a training phase output 324, an inference phase output 326, and/or a deployment phase output 328.

A training phase output 324, for example, may be indicative of one or more evaluation metrics for the target machine learning model 302 during a training phase of the model. For example, the training phase output 324 may include a training phase report that describes the data evaluation score 306 for the training dataset 304. In some examples, the training phase report may describe a plurality of input feature risk scores 308 for the training dataset 304. By way of example, the training phase report may include an input feature risk score 308 for each input feature of the training dataset 304.

An inference phase output 326 may be indicative of one or more evaluation metrics for the target machine learning model 302 during an inference phase of the model. For example, the inference phase output 326 may include an inference phase report that describes the model evaluation score 314 and/or the decision evaluation score 316 for the target machine learning model 302. In some examples, the inference phase report may describe a plurality of a model evaluation and/or the decision evaluation scores. By way of example, the inference phase report may include a model evaluation and/or a decision evaluation score for each of one or more processing requests identifying one or more input data objects to be processed by the target machine learning model 302. In some examples, the inference phase output 326 may be leveraged for testing and/or validation of the model development. For example, the model evaluation score 314 may be leveraged to test and/or validate a performance of a machine learning model.

A deployment phase output 328 may be indicative of one or more evaluation metrics for the target machine learning model 302 after the model is deployed. For example, the inference phase output 326 may include one or more monitoring alerts that describe performance changes and/or anomalies of the target machine learning model 302 after the model deployed. In some examples, the deployment phase output 328 may be indicative of a comparison between a plurality of holistic evaluation scores 320 and/or one or more components of holistic evaluation vectors 318 over time. In some examples, the holistic evaluation scores 320 may be indicative of a performance degradation based on the comparison between the plurality of holistic evaluation scores 320 and/or components of the holistic evaluation vectors 318.

Operational examples of data structures for generating the evaluation scores will now further be described with reference to FIGS. 4A-B.

FIG. 4A is an operational example 400 of a data evaluation profile in accordance with some embodiments discussed herein. The operational example 400 shows an example data evaluation profile 402 for a training dataset used to train a target machine learning model in accordance with some embodiments discussed herein. The data evaluation profile 402 may describe a plurality of evaluation features 404 for which the target machine learning model and/or the training dataset may be evaluated. The data evaluation profile 402 may be generated based on the plurality of input features of the training dataset. In addition, or alternatively, the data evaluation profile 402 may be received from one or more third party entities, users, subject matter experts, and/or the like.

A data evaluation score may be generated for a training dataset based on the data evaluation profile 402 for the training dataset. The data evaluation profile 402 may be received for the training dataset and, in some examples, may be indicative of one or more evaluation features 404 from a plurality of input features of the training dataset. In some examples, the data evaluation profile 402 may include contextual information for each of the evaluation features 404. For instance, the data evaluation profile 402 may be indicative of one or more data types 406, one or more evaluation feature values 408, one or more input data object exceptions 410, and/or the like for each of the evaluation features 404.

By way of example, the data evaluation profile 402 may be indicative of a first evaluation feature 412*a*, a second evaluation feature 412*b*, a third evaluation feature 412*c*. and/or a fourth evaluation feature 412*d*. The first evaluation feature 412*a* may be associated with a first data type 414*a*, one or more first evaluation feature values 416*a*, and/or one or more first input data object exceptions 418*a*. The second evaluation feature 412*b* may be associated with a second data type 414*b*, one or more second evaluation feature values 416*b*, and/or one or more second input data object exceptions 418*b*. The third evaluation feature 412*c* may be associated with a third data type 414*c*, one or more third evaluation feature values 416*c*, and/or one or more third input data object exceptions 418*c*. The fourth evaluation feature 412*d* may be associated with a fourth data type 414*d*, one or more fourth evaluation feature values 416*d*, and/or one or more fourth input data object exceptions 418*d*.

In some embodiments, the data evaluation profile 402 includes a data structure, such as a table, a linked list, and/or the like that describes one or more evaluation features 404 and/or one or more attributes for the evaluation features 404. The data evaluation profile 402 may be based on the prediction domain. For example, in an auto-adjudication prediction domain, the data evaluation profile 402 may identify a subset of evaluation features 404 for an auto-adjudication medical claim algorithm (AAMCA) based on industry materials, input from one or more subject matter experts (e.g., practicing neurosurgeon), and/or the like. The data evaluation profile 402, for example, may include an evaluation feature set with sensitive characteristics, such as race, ethnicity, gender, nationality, income, sexual orientation, ability, political or religious beliefs, and/or the like that have previously been identified as sensitive variables for the predictive domain.

In some embodiments, the data evaluation profile 402 identifies one or more feature attributes for the one or more evaluation features 404. For example, the one or more feature attributes for a particular evaluation feature may include a plurality of defined evaluation feature values 408 for the evaluation feature, a data type 406 for the defined feature values (e.g., continuous, categorical, etc.), one or more input data object exceptions 410 for the evaluation feature, and/or the like. The one or more input data object exceptions 410 may be based on the predictive domain. As an example, in an auto-adjudication prediction domain, the exceptions may describe a medical claim (e.g., a maternity claim) for which a particular evaluation feature (e.g., gender feature) is relevant. In some examples, the data evaluation profile 402 may identify how a combination of evaluation features may influence a predictive output for an input data object.

In some embodiments, the data evaluation profile 402 is leveraged to balance a training dataset by imputing one or more input feature values for input data objects of the training dataset and/or by generating one or more synthetic datasets to augment the training dataset. The training dataset may be balanced to achieve target ratios between the different evaluation feature values of each evaluation feature identified by the data evaluation profile 402.

In some embodiments, a target ratio is determined for each evaluation feature of the one or more evaluation features 404. The target ratio may describe an expected frequency for each defined feature value of an evaluation feature in a training dataset. For example, a target ratio may correspond to an evaluation feature and may describe an expected frequency for each feature value of the evaluation feature. An expected frequency for a particular feature value may describe a number of input data objects within the training dataset that are expected to include the particular feature value. For example, the one or more defined feature values for a first evaluation feature 412*a* (e.g., gender, etc.) may include a first feature value (e.g., male, etc.) and a second feature value (e.g., female, etc.). A target ratio for the first evaluation feature 412A may identify a first expected frequency (e.g., 50%, etc.) for the first feature value and a second expected frequency (e.g., 50%, etc.) for the second feature value.

The expected frequency may identify a number of data objects, a percentage of data objects, a relative percentage of data objects (e.g., relative to other defined feature values of the evaluation feature), and/or the like. In this way, the target ratio for an evaluation feature may describe an expected relative representation of each feature value of an evaluation feature within the training dataset.

A target ratio may be based on the prediction domain. In some embodiments, the target ratio for an evaluation feature is identified based on third party data representative of a population associated with the prediction domain. As one example, for an auto-adjudication prediction domain associated with medical claims from a geographic region, the target ratio may be based on census data for the geographic region. In some examples, the historical input data objects of a training dataset may underrepresent one or more evaluation feature values of an evaluation feature for a population.

In such as case, one or more underrepresented evaluation feature values may be imputed to one or more input data objects of the training dataset and/or the training dataset may be augmented with a synthetic dataset for the evaluation feature. For example, synthetic data (e.g., imputed feature values, synthetic datasets, etc.) may be generated for an evaluation feature based on the target ratio and the data evaluation profile 402. The synthetic data may include a synthetic dataset with a plurality of synthetic data objects each including at least one evaluation feature value from one or more defined feature values of an evaluation feature. The plurality of synthetic data objects, for example, may include one or more first synthetic data objects that each include a first evaluation feature value of the evaluation feature and (b) one or more second synthetic data objects that each include a second evaluation feature value of the evaluation feature. The one or more first synthetic data objects may be based on the first expected frequency and the one or more second synthetic data objects may be based on the second expected frequency.

In some embodiments, the synthetic dataset includes a plurality of data objects associated with a prediction domain. The type, format, and parameters of each data object may be based on the prediction domain. For example, the synthetic dataset may include a plurality of synthetic data objects, such as one or more synthetic entity data objects and/or synthetic input data objects. In an auto-adjudication prediction domain, a synthetic data object may include a synthetic medical claim (e.g., synthetic input data object) and/or a synthetic patient (e.g., synthetic entity data object).

In some embodiments, a synthetic dataset includes a collection of a plurality of synthetic data objects and/or contextual data associated therewith that is used to balance the training dataset with respect to one or more target ratios for the one or more evaluation features 404 of the training dataset. In some embodiments, the training dataset may include a plurality of historical data objects that are balanced by (i) imputing one or more input feature values for one or more of the historical data objects and/or (ii) generating a plurality of synthetic data objects with the one or more input feature values. For example, one or more evaluation feature values may be imputed (e.g., predicted, inferred, etc.) for one or more input data objects. The evaluation feature values may be imputed using one or more imputation models configured to predict missing evaluation feature values for a data object (e.g., input data object, entity data object, etc.) based on contextual information (e.g., other input feature values, etc.) for the data object. An imputation model may include a prediction algorithm, such as ethnicolr. gender-guesser, and/or the like. In some examples, the imputation model may be configured to predict the evaluation feature values based on one or more other input feature values of the input data object.

In some embodiments, a synthetic dataset may be generated to further balance a training dataset after missing evaluation feature values are imputed for each of the historical input data objects. For example, in the event that a training dataset is missing one or more input data objects with a specific evaluation feature value (e.g., a demographic category, such as male, female, etc.) of an evaluation feature, a feature specific synthetic dataset may be generated for the evaluation feature unless one or more input data object exceptions apply. By way of example, a feature specific synthetic dataset may be generated in the event that the evaluation feature values for the plurality of input data objects of the training dataset do not align with a target ratio of a corresponding evaluation feature.

The synthetic data objects of a synthetic dataset may be refined and/or augmented until the combination of the synthetic data objects and the historical data objects align with the target ratios for each evaluation feature of the training dataset. In this way, the synthesized data set may include a plurality of synthesized data objects that consider each of the evaluation features of the training dataset.

The synthetic dataset may be generated using one or more data synthesis techniques. As some examples, neural network based robust models, such as variational autoencoders (VAE) and/or generative adversarial network (GAN) models, may be leveraged with a combination of synthetic data algorithm techniques to intelligently generate synthetic data objects that satisfy each of the target ratios for a training dataset. The neural network based synthetic data generation techniques, for example, may learn to reproduce data and generalize beyond it to produce a representation that could have originated in the data using prediction and correction techniques.

In some embodiments, one or more different data synthesizing techniques are leveraged for generating different synthetic datasets based on the data representations, structures, and/or formats of the training dataset. The techniques of the present disclosure may combine a plurality of different data synthesizing techniques each tailored to different data formats to generate data format agnostic datasets. In this way, the techniques of the present disclosure may be applied universally across a plurality of different training datasets regardless of the medium in which the data is represented.

For example, one or more tabular synthetic data generation techniques may be leveraged in the event that an evaluation feature value is missing from a tabular dataset. The tabular synthetic data generation techniques may include leveraging one or more generative adversarial models (e.g., GAN models) such as, conditional GAN—CTGAN implemented in SDV, WGAN, and/or WGAN-GP to synthesize one or more missing evaluation feature values for the tabular dataset. In some embodiments, the tabular dataset includes a mix of discrete and continuous columns. In such a case, CTGAN may be leveraged to synthesize the mix of data. Other tabular synthetic data generation techniques may include GaussianCopula, CopulaGAN, TVAE, and/or the like. In addition, in some examples, HMA1 and/or like may be leveraged for multi-table evaluation features and/or TimeGAN, AR, PAR, and/or the like may be leveraged for timeseries data. Additionally, tabular synthetic data can be derived from third party platforms, such as MDClone, Mostly.ai, and/or the like.

As another example, one or more text synthetic data generation techniques may be leveraged in the event that an evaluation feature value is missing from a text dataset. A text dataset, for example in an auto-adjudication predictive domain, may include medical transcription documents, and/or the like. In some examples, text synthetic data generation techniques, such as GPT-3 foundation model, text-generation API, Gretel-like services, and/or the like, may be leveraged to derive evaluation features from the text dataset and synthesize missing evaluation features for the text documents.

As another example, one or more media synthetic data generation techniques may be leveraged in the event that an evaluation feature value is missing from a media dataset. A media dataset, for example in an auto-adjudication predictive domain, may include medical images such as CT-Scans, X-Rays, sonogram images, and/or the like. Media synthetic data generation techniques, such as ZPY for labeling faces in images for gender, race identification, etc., Blender libraries for labeling gender, race in the images, videos, etc., may be leveraged to derive evaluation features from the media dataset and synthesize missing evaluation features for the media data.

As another example, one or more graph-based data generation techniques may be leveraged in the event that an evaluation feature value is missing from a graph training dataset, such as a knowledge graph. Graph training datasets may form a language for describing entity and input data objects. In an auto-adjudication prediction domain, healthcare data may include a complex heterogeneous network including millions of entity data objects (e.g., patients, etc.) with hundreds of thousands of affiliated entities (e.g., medical doctors, pharmacies, clinics, hospitals, laboratories, etc.) each involved with an input data object (e.g., a medical claim, etc.). Graph-based data techniques may be employed to facilitate a deeper understanding of the input data objects by modeling the relationships between the input data objects and entity data objects and/or affiliated entities associated therewith.

The graph-based data generation techniques may include one or more GNNs that directly operate on the graph structure of a graph training dataset. For example, every node in the graph training dataset may be associated with a label. A GNN may include a message-passing process in which information is aggregated for every node from node neighbors at each layer. This may enrich nodes representation while preserving topological structures along with node feature characteristics. The graph-based data generation techniques may include a GNN classifier, such as a feature prediction model, configured to predict evaluation feature values for a graph node from a predictive representation of the graph node.

Using the one or more different data synthesizing techniques described herein, a synthetic dataset may be generated to balance a training dataset of any data type (e.g., text, tabular, media, graph, and/or one or more combinations thereof). The balanced training dataset may be generated using a cost function to achieve the balanced dataset with as few synthesized data objects as possible. For example, if N is the number of historical input data object in the training dataset, then M may be synthesized input data objects generated to achieve the target ratios for the one or more evaluation features 404. The data synthesizing techniques may be configured to make every possible optimization to minimize the M number. The balanced training dataset may then be evaluated by at least one evaluation score of the present disclosure based on an input feature profile, a feature confidence score, a predicted feature confidence score, and/or any other measurement for evaluating the training dataset.

In some embodiments, the data evaluation score may be generated based on the data evaluation profile 402, the target ratios, and/or the synthetic datasets of the training dataset. For example, the data evaluation profile 402, the target ratios, and/or the synthetic datasets may be leveraged to generate one or more component scores of the data evaluation score. In some examples, the data evaluation profile 402, the target ratios, and/or the synthetic datasets may be leveraged to generate an input feature profile 420 including at least one component of the data evaluation score.

FIG. 4B is an operational example 450 of an input feature profile 420 in accordance with some embodiments discussed herein. The operational example 450 shows an example input feature profile 420 for a training dataset used to train a target machine learning model in accordance with some embodiments discussed herein. The input feature profile 420 may be based on the data evaluation profile 402 and/or one or more elements thereof. The operational example 450 may describe a plurality of feature confidence scores 426 for the plurality of non-evaluation input features 422 of a training dataset. Each feature confidence score may correspond to a particular non-evaluation feature and an evaluation feature identified by the data evaluation profile 402. For example, the input feature profile 420 may include a plurality of feature confidence score 426 include a respective feature confidence score between a first input feature 428 and each of the one or more evaluation features 404 of the data evaluation profile 402.

In some embodiments, a data evaluation score may be generated for a training dataset based on one or more feature confidence scores 426 derived from the input feature profile 420. For example, the plurality of input features of a training dataset may include one or more evaluation features 404 and one or more non-evaluation input features 422. The input feature profile 420 may be generated for a non-evaluation feature, such as the first input feature 428. The input feature profile 420 may be generated for the first input feature 428 based on the training dataset and the synthetic dataset. For instance, the input feature profile 420 may include a plurality of feature confidence scores 426 between the non-evaluation feature and the evaluation features 404. The feature confidence scores 426 may be based on a proportionality between the training dataset and the synthetic dataset with respect to a pair of non-evaluation and evaluation features.

The input feature profile 420 may include any type of data structure, such as a table, a linked list, and/or the like that describes the feature confidence scores 426 for the input features 422. The input feature profile 420 (e.g., a $\text{DataGoodness}_{Profile}$), for example, may be generated for each input feature (and/or each non-evaluation feature) of a training dataset to describe one or more feature confidence scores 426 for the respective input feature, such as the first input feature 428. The input feature profile 420 may include a data status and/or a feature confidence score between the input feature and each of the one or more evaluation features 404. A data status between an input feature and a respective evaluation feature may describe whether the input feature is imputed (e.g., added as an evaluation feature), a percentage of defined feature values for the input feature that are fully imputed, a percentage of defined feature values for the input feature that are partially synthesized, a percentage of the training data that is balanced with respect to the input feature, a percentage of data retained from the historical input data objects, and/or the like.

A feature confidence score between an input feature and a respective evaluation feature may describe a confidence for a feature pair based on the data status between the input feature and the respective evaluation feature. For example, a feature confidence score may be 0.0 in the event that no changes have been made to the training dataset with respect to the feature pair to balance the training dataset (e.g., percentage of data retained from the historical input data objects is 100%). As another example, a feature confidence score may be 0.25 in the event that minimal changes (e.g., percentage of feature values partially imputed is less than or equal to 50%) have been made to the training dataset with respect to the feature pair to balance the training dataset. As another example, a feature confidence score may be 0.75 in the event that major changes (e.g., percentage of feature values partially imputed is greater than 50%) have been made to the training dataset with respect to the feature pair to balance the training dataset. As another example, a feature confidence score may be 0.9 in the event that the feature values for the feature pair are fully imputed to balance the training dataset. As another example, a feature confidence score may be 1.0 in the event that the data is not balanced with respect to the feature pair.

As an example, the input feature profile 420 may correspond to a first input feature 428. The first input feature 428 may include a non-evaluation feature. The input feature profile 420 may include a first data status 430*a* corresponding to a first feature pair including the first input feature 428 and a first evaluation feature 412*a*. The first data status 430*a* may describe a proportionality between the training dataset and the synthetic dataset with respect to the first feature pair. By way of example, the first data status 430*a* may indicate whether the feature pair is fully imputed (e.g., generated by imputing input feature values, imputing evaluation feature values, synthesizing input data objects with the feature pair, etc.), a percentage of input feature values that are fully imputed, a percentage of feature values that are partially synthesized, a percentage of data that is balanced, a percentage of data that is retained from the source (e.g., historical dataset, etc.), and/or any data indicative of a proportionality between the training dataset and the synthetic dataset with respect to the first feature pair.

The input feature profile 420 may include a first feature confidence score 432*a* corresponding to the first feature pair and that is based on the first data status 430*a*. A feature confidence score may include a number between 0 and 1. In some examples, the feature confidence score may be (i) 0.0 if no changes are made to the base dataset (e.g., data retained from historical dataset is 100%), (ii) 0.25 if balancing is done (e.g., percentage of feature value partially imputed and balanced ≥50% and percentage of data balanced ≥95%), (iii) 0.75 if the balancing is partially done (e.g., percentage of feature value partially imputed and balanced <50% and percentage of data balanced <95%), (v) 0.90 if data is fully imputed, and/or (vi) 1.0 if data is not balanced.

As one example, the first feature confidence score 432*a* may be 0.25 in the event that the feature pair is: not fully imputed (e.g., Feature Imputed: No), zero percent of the input feature values are fully imputed (e.g., Percentage of Feature Value fully Imputed: 0%), fifty percent of the feature values are partially synthesized (e.g., Percentage of Feature Value partially synthesized: 50%), one hundred percent of the data is balanced (e.g., Percentage of data balanced: 100%), and fifty percent of the data is retained from the source (e.g., Data retained from source: 50% and 50% is synthesized). The first feature confidence score 432*a* may be 0.25 to indicate that the training dataset is partially imputed, but highly balanced with respect to the feature pair.

The input feature profile 420 may include a feature confidence score 426 for each feature pair between the first input feature 428 and other evaluation features identified in the data evaluation profile 402. For example, the input feature profile 420 may include a second data status 430*b* corresponding to a second feature pair including the first input feature 428 and a second evaluation feature 412*b*. The input feature profile 420 may include a second feature confidence score 432*b* corresponding to the second feature pair and that is based on the second data status 430*b*.

By way of example, the second feature confidence score 432*b* may be 0.90 in the event that the feature pair is: not fully imputed (e.g., Feature Imputed: No), zero percent of the input feature values are fully imputed (e.g., Percentage of Feature Value fully Imputed: 0%), fifty percent of the feature values are partially synthesized (e.g., Percentage of Feature Value partially synthesized: 50%), fifty percent of the data is balanced (e.g., Percentage of data balanced: 50%), and zero percent of the data is retained from the source (e.g., Data retained from source: 0% and 100% is synthesized). The second feature confidence score 432*b* may be 0.90 to indicate that the training dataset is completely synthesized with respect to the feature pair.

In addition, the input feature profile 420 may include a third data status 430*c* and third feature confidence score 432*c* that corresponds to a third feature pair between the first input feature 428 and a third evaluation feature 412*c*, a fourth data status 430*d* and fourth feature confidence score 432*d* that correspond to a fourth feature pair between the first input feature 428 and a fourth evaluation feature 412*d*, and/or the like.

In some embodiments, the input feature profile 420 includes a respective entry for each pair of evaluation features 404 and non-evaluation input features 422. For example, the combination of evaluation features 404 and non-evaluation input features 422 may be N1×N2, where N1 may be the number of evaluation features 404 and N2 may be number of evaluation input features. In some examples, to save and compute storage resources, as an alternative N/and N2, the pairs of evaluation and non-evaluation input features may be narrowed to one or more non-evaluation features that are closely correlating with evaluation features with higher feature impact scores and/or that are identified by one or more counterfactual proposals.

In some embodiments, the data evaluation score is based on one or more risk scores, each generated using input feature profiles 420 for the input features 422 of the training dataset. For instance, the data evaluation score may be generated based on an input feature risk score. The input feature risk score may be generated based on a plurality of feature correlation scores between the evaluation features 404 and the non-evaluation input features 422 that are scaled using the feature confidence scores 426 of the input feature profile 420. The input feature risk score, for example, may be generated based on an aggregation of a plurality of scaled feature correlation scores for the one or more non-evaluation input features 422 of the training dataset and may indicate of a probability that the one or more non-evaluation input features 422 are impacted by the feature confidence scores 426 of the input feature profile 420.

In some embodiments, an input feature risk score describes a correlation between evaluation features and non-evaluation features of a training dataset. The input feature risk score (e.g., $rC_{score}$) may include an aggregated feature correlation score. By way of example, the input feature risk score may include the aggregate (e.g., sum, product, average, etc.) of a plurality of feature correlation scores, each descriptive of an association between a respective evaluation feature and each of the plurality of non-evaluation input features 422.

In some embodiments, the input feature risk score is generated based on a bivariate analysis that measures the strength of association between two features and the direction of the relations. In some examples, the input feature risk score may be generated using one or more bivariate correlation techniques, such as Pearson correlation, Kendall rank correlation, Spearman correlation, Point-Biserial correlation, and/or the like. In some examples, one or more different bivariate correlation techniques may be applied based on the data types (e.g., continuous, categorical, ordinal, etc.) and/or context (parametric, non-parametric, etc.) of the input features (e.g., evaluation and/or non-evaluation features) of the training dataset. The bivariate correlation techniques may be applied to the training dataset to generate correlation values between each pair of evaluation and non-evaluation features of the dataset. For instance, each correlation value may be indicative of a strength of association between a respective evaluation feature (e.g., DFx), such as the first evaluation feature 412*a*, and a respective non-evaluation feature (e.g., Fy), such as the first input feature 428. In some examples, the correlation values may be stronger in the event that they are closer to +1 or −1 and weaker in the event that they are closer to 0. However, the inverse may also be applied.

In some embodiments, input feature risk score includes an average, aggregate, and/or the like of a plurality of scaled correlation scores (e.g., r_DFx_Fy) between the plurality of input features. For example, the input feature risk score may be defined as:

$$rC_{Score} = \sum_{x=1,y=1}^{xn1,yn2} \frac{\text{r\_DFx\_Fy} - \min(\text{r\_DFx\_Fy})}{\max(\text{r\_DFx\_Fy}) - \min(\text{r\_DFx\_Fy})} / N,$$

wherein the $rC_{Score}$ may include the average of all normalized values (e.g., scaled values) of all correlations between an evaluation feature (e.g., DFx) and other non-evaluation features (e.g., Fy) in the range of 0 to 1.

In some embodiments, a scaled correlation score (e.g., r_DFx_Fy) includes a feature correlation score (e.g., DFx_Fy) between an evaluation feature (e.g., DFx) and a respective non-evaluation feature (e.g., Fy) multiplied by a feature confidence score (e.g., $FeatureGoodnessFairnessRisk_{Score}$) corresponding to the evaluation feature (e.g., DFx) and the non-evaluation feature (e.g., Fy). For example, the scaled correlation score may be generated by:

$$\text{r\_DFx\_Fy} = (\text{DFx\_Fy}) * FeatureGoodnessFairnessRisk_{Score}.$$

In some embodiments, the feature confidence score is weighted based on an evaluation profile score (e.g., $DataGoodness_{ProfileScore}$) of a respective feature pair (e.g., DFx and Fy). In some examples, xn1 may include the number of evaluation features and yn2 may include the number non-evaluation features. DF1, DF2, DF3 (e.g., DFx) may be respective evaluation features and F1, F2 (e.g., Fy) may be respective non-evaluation features. "r" may represent the calculated correlation between a specific evaluation feature and a non-evaluation feature (e.g., in the range of −1 to +1). The feature confidence score (e.g., $FeatureGoodnessFairnessRisk_{Score}$) may be between the evaluation feature (e.g., DFx) and the non-evaluation feature (e.g., Fy). Different combinations of features may have different feature confidence scores as described herein.

In some examples, a high feature correlation score (e.g., close to 1) may be indicative of a high association between an evaluation feature and a non-evaluation feature and/or a low feature correlation score may be indicative of a low association. The inverse may also be implemented.

In some examples, highly correlating non-evaluation input features (e.g., Fy) may be added to data evaluation profile 402 (e.g., $\text{Demographic}_{FeatureProfile}$) and treated as evaluation features 404. For example, in response to a scaled feature correlation score achieving a threshold score, the data evaluation profile 402 may be augmented with the corresponding non-evaluation feature to identify the non-evaluation feature as an evaluation feature. The threshold score, for example, may be percentage, ratio, and/or range of values, such as 90%, 0.9, and/or the like. As an example, the scaled feature correlation score between the first evaluation feature 412*a* and the first input feature 428 may satisfy the threshold score. In such a case, the first evaluation feature 412*a* may be added to the data evaluation profile 402. This process may be repeated for each of the non-evaluation input features 422 of the training dataset to identify (and/or mark, flag, etc.) non-evaluation input features 422 that are closely tied to evaluation features 404 of the data evaluation profile 402.

In some embodiments, the data evaluation score is generated based on a data impact score. The data impact score may indicate a relative impact of an evaluation feature to a predictive output of the target machine learning model. The data impact score may be determined based on a plurality of first and second feature impact measures. The plurality of first feature impact measures, for example, may be generated for the one or more evaluation features 404 using one or more interpretable machine learning techniques. The plurality of second feature impact measures may be generated for the one or more evaluation features 404 using one or more partial dependency plots.

In some embodiments, the data impact score is a data value that describes an influence of an evaluation feature on predictive outputs of a target machine learning model. The data impact score (e.g., $\text{DFI}_{Score}$) may be based on one or more feature impact measures for the evaluation features of a training dataset. A first feature impact measure (e.g., $\text{DFI}_{FIA\_Score}$), for example, may include a data value that describes a feature impact analysis for an evaluation feature. A second feature impact measure (e.g., $\text{DFI}_{PDP\_Score}$) may include a data value that describes a partial dependency plot between an evaluation feature and a predictive outcome. In some embodiments, the data impact score is an aggregation of the first and second impact measure: $\text{DFI}_{Score}=\text{DFI}_{FIA\_Score}+\text{DFI}_{PDP\_Score}$.

For example, the feature impact analysis and partial dependence plot may be combined to provide a data impact score that describes how evaluation features may be influencing a predictive output, such as an auto-adjudication decision in an auto-adjudication prediction domain. The higher the influence of evaluation features—the more a target machine learning model could become vulnerable and an unfavorable input feature risk score. In some embodiments, the data impact score (e.g., $\text{DFI}_{Score}$) identifies the influence of evaluation features 404 on the outcomes of a target machine learning model. A higher data impact score (e.g., $\text{DFI}_{Score}$) may indicate that there is a very strong influence by evaluation features 404 on predictive outputs of the target machine learning model and the risk to be weighted with the quality of the evaluation features 404.

In some embodiments, the first feature impact measure (e.g., $\text{DFI}_{FIA\_Score}$) is generated based on an impact analysis for each input feature (e.g., evaluation and non-evaluation features) using one or more interpretable machine learning models, such as XAI models including SHAP, permutation-based feature importance, and/or the like. The impact analysis may output a relative feature importance measure for each input feature. The first feature impact measure (e.g., $\text{DFI}_{FIA\_Score}$) may be defined by:

$$DfI_{FIA\_Score} = \frac{DfI_{FIA\_Numerator}}{xn1}$$

where the $$DfI_{FIA\_Numerator} = \sum_{x=1}^{xn1} DfIx * FeatureGoodnessFairnessRisk_{Score}, \; xn1$$

is the number of evaluation features from the data evaluation profile, and DfIx is the feature importance measure in each evaluation feature.

In some embodiments, the second feature impact measure (e.g., $\text{DFI}_{PDP\_Score}$) is generated between each evaluation feature and a target output of the target machine learning model based on a partial dependency plot. A partial dependency plot, for example, may describe the marginal effect the one or two features have on a predicated outcome of the target machine learning model. A partial dependency plot may show whether the relationship between a predictive output (and/or a predictive output class) and an evaluation feature is linear, monotonic, and/or more complex. The second feature impact measure (e.g., $\text{DFI}_{PDP\_Score}$) may be defined by:

$$DfI_{PDP\_Score} = \frac{DfI_{PDP\_Numerator}}{xn1}$$

where $\text{DfI}_{PDP\_Numerator}=\text{fDistribution\_Type}_{Value}*\text{FeatureGoodnessFairnessRisk}_{Score}$ and the value of the $\text{fDistribution\_Type}_{Value}$ is based on the relationship between the evaluation feature and the predictive output such that: (i) the $\text{fDistribution\_Type}_{Value}$ may be 1 in the event that all the defined values of the evaluation feature are favoring only one class of predictive outputs (e.g., evaluation feature only favors the approval of a claim in an auto-adjudication prediction domain), (ii) $\text{fDistribution\_Type}_{Value}$ may be 0.5 in the event that the defined feature values of the evaluation feature are not equally favoring both the classes of a predictive output (e.g., evaluation feature unequally favor the approval and denial of a claim in an auto-adjudication prediction domain), and/or (iii) $\text{fDistribution\_Type}_{Value}$ may be 0 in the event that the defined feature values of the evaluation feature are equally favoring each class of a prediction output (e.g., evaluation feature equally favors the approval and denial of a claim in an auto-adjudication prediction domain).

The data evaluation score for a target machine learning model may be based on the data impact score as described herein. In some embodiments, one or more additional data scores may be considered. As an example, in the event that the training dataset includes a graph training dataset, the data evaluation score may be further based on a graph feature confidence score. An operational example for generating a graph feature confidence score will now further be described with reference to FIG. 5.

Figure 5:
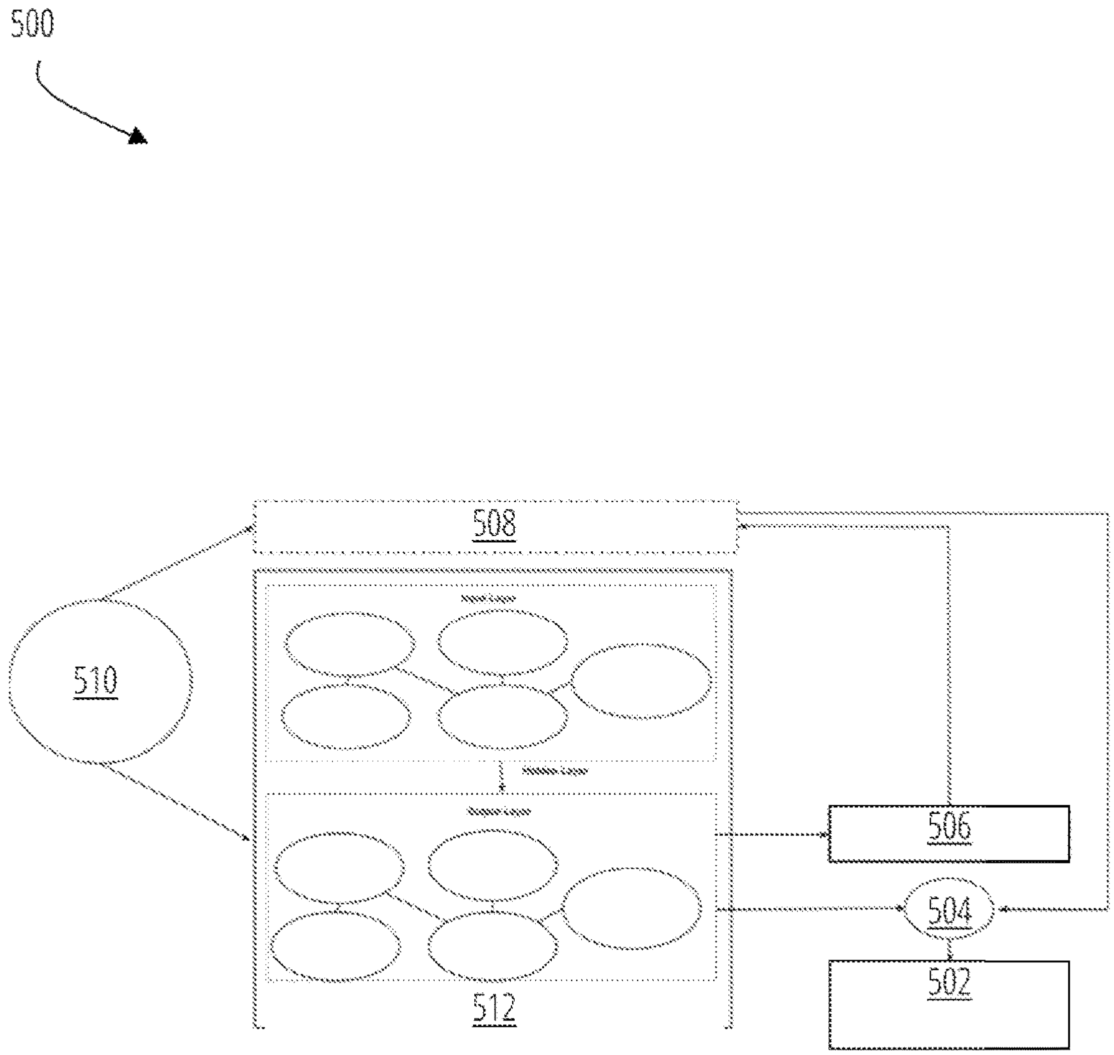
FIG. 5 is a dataflow diagram of a training and evaluation technique for training and evaluating a machine learning model configured for a graph training dataset in accordance with some embodiments discussed herein.

FIG. 5 is a dataflow diagram 500 of a training and evaluation technique for training and evaluating a machine learning model configured for a graph training dataset in accordance with some embodiments discussed herein. The dataflow diagram 500 depicts a set of data structures, data values, and/or the like for training and evaluating one or more aspects of a target machine learning model. The target machine learning model may include a target graph model 512. The target graph model 512 may be configured to process a graph training dataset, such as a knowledge graph, to generate a predictive output 504. The predictive output 504 may correspond to a graph node 510 of the graph training dataset. For instance, the predictive output 504 may include a classification, label, and/or the like for the graph node 510.

The target graph model 512 describes parameters, hyper-parameters, and/or defined operations of a rules-based and/or machine learning model (e.g., model including at least one of one or more rule-based layers, one or more layers that depend on trained parameters, coefficients, and/or the like). The target graph model 512 may include a machine learning model trained, configured, and/or the like to generate predictive output 504 for a graph node 510 of a graph training dataset. For example, the target graph model may include a type of target machine learning model tailored for a training dataset that includes a graph training dataset.

The target graph model 512 may include one or more of any type of machine learning model including one or more supervised, unsupervised, semi-supervised, and/or reinforcement learning models. In some examples, the target graph model 512 may include multiple models configured to perform one or more different stages of a classification process. In some examples, the target graph model 512 may include a GNN model trained, using an objective function, to generate a predictive output 504 for a graph node 510 of a graph training dataset. The predictive output 504 may depend on the predictive domain. As one example, in an auto-adjudication prediction domain, the predictive output 504 may include a claim decision (e.g., approval or denial) of a medical claim for a patient.

In some embodiments, target graph model 512 (e.g., $F_G$) is configured to receive a graph training dataset (e.g., G=(V, E, X)) as its input. The graph training dataset may include a set of N graph nodes (e.g., V), a set of edges (e.g., E) between the graph nodes, and a set of input features (e.g., X) corresponding to the graph nodes. The graph nodes may include input features that depend on the prediction domain. In one example, the input features may be indicative of medical procedures, diagnosis codes, medication information, and/or the like in an auto-adjudication prediction domain. The target graph model 512 may be configured such that, given a graph training dataset (e.g., G) that includes a set of patient nodes with one or more evaluation features (e.g., D), the goal may be to learn a fair graph neural network as a graph classification: F(G, Y, D)->y^, where f is a learned fairness function and Y is the predictive output 504 of the target graph model 512 (e.g., $F_G$). The target graph model 512 may be trained using a joint objective function based on a first and second objective function tailored to the target graph model 512 and a feature prediction model 508, respectively.

In some embodiments, the feature prediction model 508 is a data entity that describes parameters, hyper-parameters, and/or defined operations of a rules-based and/or machine learning model (e.g., model including at least one of one or more rule-based layers, one or more layers that depend on trained parameters, coefficients, and/or the like). A feature prediction model 508 may include a machine learning model trained, configured, and/or the like to generate one or more predicted feature values for a graph node 510 of a graph training dataset.

The feature prediction model 508 may include one or more of any type of machine learning model including one or more supervised, unsupervised, semi-supervised, and/or reinforcement learning models. In some examples, the feature prediction model 508 may include multiple models configured to perform one or more different stages of an optimization process. In some examples, the feature prediction model 508 may include a GNN model trained, using an objective function, to generate one or more predicted feature values for a graph node 510 of a graph training dataset.

In some embodiments, the predictive feature values correspond to one or more evaluation features for the graph node 510. In some embodiments, in the event that a graph node does not include feature values for one or more evaluation features, the feature prediction model 508 is configured to output one or more predictive feature values for the one or more evaluation features. For example, the feature prediction model 508 may be configured to generate one or more synthetic, predicted feature values for the graph node 510 in response to an identification that the graph node 510 does not include an evaluation feature value for at least one evaluation feature. The one or more predictive feature values may be based one or more non-evaluation features of the graph node 510 and/or the predictive representation 506 for the graph node 510.

In some embodiments, the predictive representation 506 is a feature embedding that encodes one or more features of a graph node 510 and/or one or more adjacent features of one or more neighboring nodes of the graph node 510. The one or more neighboring nodes of the graph node 510, for example, may include one or more nodes of the graph training dataset that are connected to the graph node 510 by one or more edges. In some examples, the neighboring nodes may include direct neighbors that are directly linked to the graph node 510 by at least one edge. In some examples, the neighboring nodes may include indirect neighbors that are indirectly linked to the graph node 510 through a chain of edges across one or more intermediary nodes.

The predictive representation 506 may include an intermediate output by the target graph model 512. For example, predictive representation 506 may be leveraged by the target graph model 512 to generate the predictive output 504 for the graph node 510 of the graph training dataset. The predictive representation 506 (e.g., $H_v$) may include aggregated information from the graph node 510 and/or one or more the graph node's neighboring nodes in the graph training dataset. By way of example, $F^{(n)}{}_G$ may be aggregation information of the graph node 510 and its n-hop neighborhood through n layers of iterations in the target graph model (e.g., $F_G$). The predictive representation 506 of the graph node 510 (e.g., v) of the final layer may be defined as:

$$H_{v=}F^{(n)}{}_G\left(X_v, N_v^{(n)}\right)$$

where $N_v^{(n)}$ may represent the n-hop neighborhoods of v. The y^ may be obtained by sigmoid $H_{v,w}$.

In some embodiments, the target graph model 512 and the feature prediction model 508 are jointly trained to optimize a joint objective function. The joint objective function, for example, may include an algorithm, equation, and/or any other sequence of operations that is configured for training and/or evaluating the performance of a machine learning model. For example, the joint objective function may include an optimization function for jointly training the target graph model 512 and the feature prediction model 508. The target graph model 512. for example, may be configured to update one or more of its parameters by minimizing the joint objective function. The joint objective function may be based on a first objective function for the target graph model 512 and a second objective function for the feature prediction model 508.

In some embodiments, during a training phase, for each graph node, such as graph node 510, of the graph training dataset, the feature prediction model 508 (e.g., $F_D$) may predict evaluation feature values while the target graph model 512 (e.g., $F_G$) learns an evaluation feature agnostic predictive representation 506 (e.g., $H_v$) that prevents the target graph model 512 from recognizing which evaluation group (e.g., a demographic group in an auto-adjudication prediction domain) a graph node 510 (e.g., a patient in an auto-adjudication prediction domain) belongs to:

$$\text{Min}_\theta \ \max_\theta \ L_A = p(h \mid d^\wedge = 1) + p(h \mid d^\wedge = 0)$$

where p(h|d^=1) may identify a sampling node with evaluation feature values as 1 from the graph training dataset. In this way, the target graph model 512 may be trained to generate an evaluation feature agnostic predictive representation 506 that at least partially prevents the target graph model 512 from generating the predictive output 504 based on one or more evaluation features identified by a data evaluation profile for a graph training dataset.

The joint objective function for the target graph model 512 may be defined as:

$$\text{Min}_\theta \ L_D + L_{A+} L_G$$

where $L_D$ may be an output of a second objective function and $L_G$ may be an output from a first objective function.

In some embodiments, the first objective function refers to an algorithm, equation, and/or any other sequence of operations for training and/or evaluating the performance of the target graph model 512. For example, the first objective function may include an optimization function for (e.g., tailored to, etc.) the target graph model 512. The first objective function may include a comparison between the predictive output 504 and a ground truth label 502 for the graph node 510. By way of example, the first objective function may be formulated as:

$$\text{Min}_q \ L_G = -1/VS\left[y \log y^\wedge + (1-y) \log (1-y^\wedge)\right]$$

where q denotes parameters of the target graph model 512 (e.g., $F_G$) and y denotes a ground truth label 502 for a graph node 510. Due to graph structure as well as its aggregation mechanisms, the target graph model (e.g., $F_G$) may initially generate biased predictive outputs. Graph nodes with similar evaluation feature values, for example, may be more likely to connect to each other in a graph training dataset. This helps the feature prediction model 508 (e.g., $F_D$) to estimate the evaluation feature values for graph nodes with unknown values. The feature prediction model 508 may be optimized using a second objective function that may be combined with the first objective function by the joint objective function to debias the target graph model 512.

In some embodiments, the second objective function is an algorithm, equation, and/or any other sequence of operations for training and/or evaluating the performance of the feature prediction model 508. For example, the second objective function may include an optimization function for (e.g., tailored to) the feature prediction model 508. The second objective function may be formulated as:

$$\text{Min}_q \ L_D = -1/VS\left[d \log d^\wedge + (1-d) \log (1-d^\wedge)\right]$$

where q denotes parameters of the feature prediction model 508 (e.g., $F_D$) and d^ may be the predicted feature values.

In some embodiments, for training datasets that include graph data, the data evaluation score is generated for a target machine learning model, such as the target graph model 512, based on the performance of the feature prediction model 508. For instance, the data evaluation score may be based on a graph feature confidence score associated with the feature prediction model 508.

In some embodiments, the graph feature confidence score is a value that describes a predicted accuracy of one or more predicted feature values for a graph training dataset. In some examples, the graph feature confidence score (e.g., $DFI_{GraphRiskScore}$) may include a value between 0 and 1. In some examples, the graph feature confidence score may be the inverse of a predicted feature confidence score (e.g., $F_D$ConfidenceScore) associated with the feature prediction model 508. For example, the graph feature confidence score may be defined as: $DFI_{GraphRiskScore}=1-F_D$ConfidenceScore.

In some embodiments, the predicted feature confidence score is a data value that describes a confidence level for one or more predicted feature values generated by the feature prediction model 508. The predicted feature confidence score may include a number between 0 and 1. In some examples, the predicted feature confidence score may be closer to 1 in the event that the confidence of a feature prediction model 508 is high with respect to the predicted feature values. The confidence may be high in the event that (i) the predicted feature values already exist within a graph node 510 such that they are not synthesized by the feature prediction model 508 (e.g., $F_D$ConfidenceScore=1) or (ii) the feature prediction model 508 is able to infer the predicted feature values with high confidence (e.g., $F_D$ConfidenceScore>0.5). The confidence may be low in the event that (i) the feature prediction model 508 is unable to infer the predicted feature values for a graph node 510 (e.g., $F_D$ConfidenceScore=0) or (ii) the feature prediction model 508 is able to infer the predicted feature values with low confidence (e.g., $F_D$ConfidenceScore<0.5).

In some embodiments, the predicted feature confidence score is generated by the feature prediction model 508. For instance, the feature prediction model 508 may consider one or more neighboring node's evaluation feature values as attributes as part of a confidence calculation to generate the predicted feature confidence score. For instance, the graph node 510 may be queried for a predictive process, such as an auto-adjudication process, and if the graph node 510 does not have an evaluation feature value, then the feature prediction model 508 will estimate the evaluation feature value by employing the evaluation feature values of direct neighboring graph nodes. The predicted feature confidence score may be equal to 0, when estimation was not possible and less than or equal to 1 when estimation was possible. If the predicted feature value is based on neighboring nodes' evaluation feature values that were synthesized, then the predicted feature value will be less than 1 (according to the amount of evaluation data synthesized in the neighboring nodes) and equal to 1 when the neighboring nodes' evaluation feature values are not synthesized and are available as part of the neighboring nodes.

The data evaluation score for a target machine learning model may be based on the graph feature confidence score to generate a holistic metric tailored to the training dataset used to train a target machine learning model, such as the target graph model 512. This score may be combined with one or more additional evaluation scores to generate the holistic evaluation score for the target machine learning model. In some examples, an additional evaluation score may include a model evaluation score. An operational example for generating a model evaluation score will now further be described with reference to FIG. 6.

Figure 6:
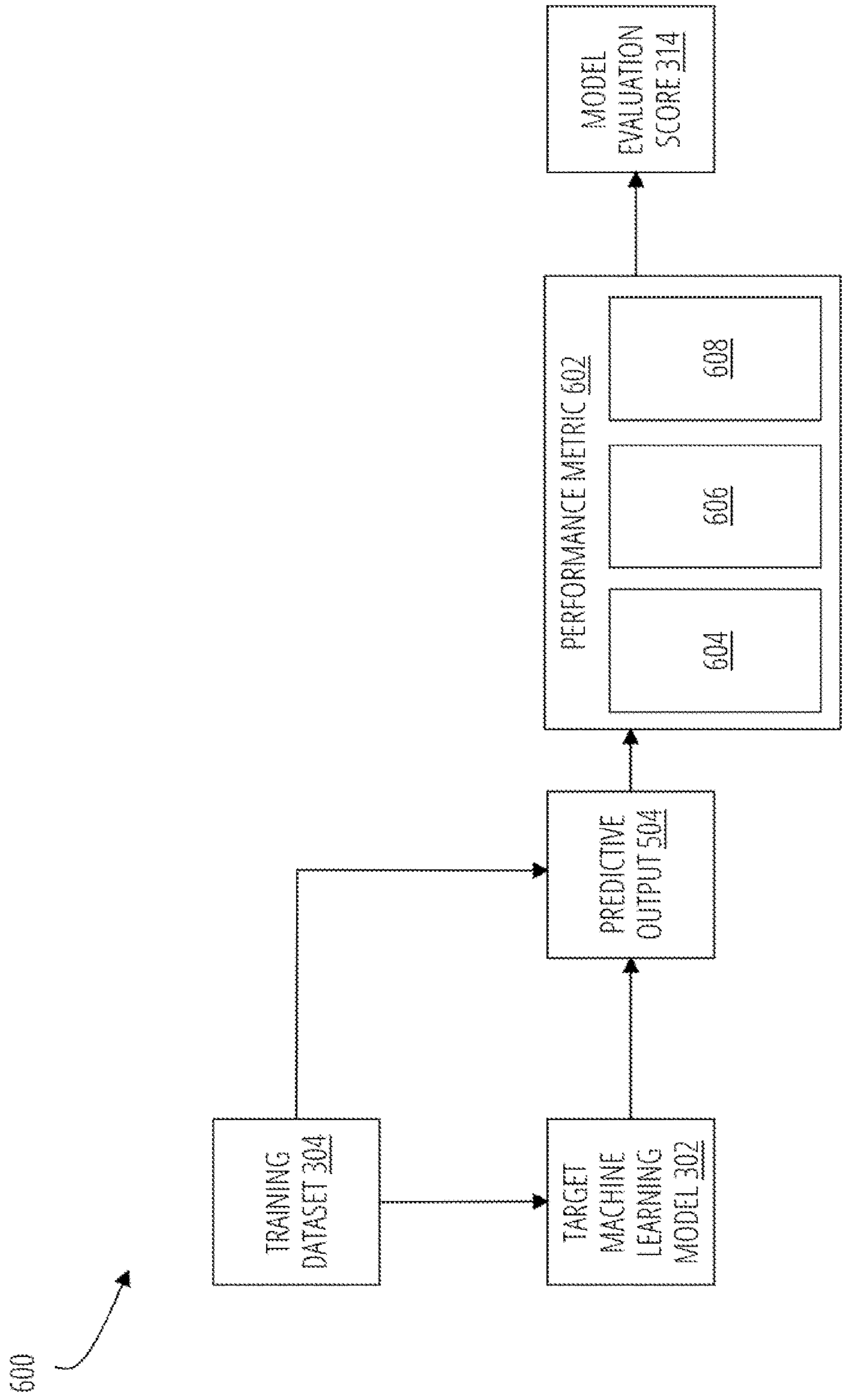
FIG. 6 is a dataflow diagram of an evaluation technique for generating a model evaluation score for a target machine learning model in accordance with some embodiments discussed herein.

FIG. 6 is a dataflow diagram 600 of an evaluation technique for generating a model evaluation score for a target machine learning model in accordance with some embodiments discussed herein. The dataflow diagram 600 depicts a set of data structures, data values, and/or the like for evaluating one or more aspects of a target machine learning model 302's performance. As described herein, the target machine learning model 302 may be trained using the training dataset 304. In some examples, the training dataset 304 may include a plurality of ground truth labels. The ground truth labels may be compared to a plurality of corresponding predictive outputs 504 of the target machine learning model 302 to determine one or more performance metrics 602 for the target machine learning model 302. The performance metrics 602 may be leveraged to generate a model evaluation score 314 for the target machine learning model 302.

In some embodiments, training dataset 304 includes a plurality of input data objects that include one or more evaluation data object sets. Each evaluation data object set may include a subset of the input data objects that are associated with a particular evaluation feature value of an evaluation feature. In some embodiments, the model evaluation score 314 is based on a comparison between at least two of the one or more evaluation data object sets. For instance, an evaluation feature may define a first evaluation feature value and a second evaluation feature value. The at least two evaluation data object sets may include (i) a first evaluation data object sets with a subset of input data objects that are associated with the first evaluation feature value and (ii) a second evaluation data object set with a subset of input data objects that are associated with the second evaluation feature value. The model evaluation score 314 may be based on one or more performance metrics 602 between the first and second evaluation data object sets.

In some embodiments, the one or more performance metrics 602 include a first performance metric 606, a second performance metric 608, and/or a third performance metric 610. The first performance metric 606 may be determined based on a selection rate comparison between the at least two evaluation data object sets. The second performance metric 608 may be determined based on a false positive rate comparison between the at least two evaluation data object sets. The third performance metric 610 may be determined based on a false negative rate comparison between the at least two evaluation data object sets. The model evaluation score may be generated based on an aggregation of the first performance metric 606, the second performance metric 608, and/or the third performance metric 610.

In some embodiments, the model evaluation score 314 (e.g., $\text{modelRisk}_{FairnessScore}$) is defined by:

$$modelRiskNumerator_{FairnessScore} = \left(\sum_{f=1}^{N} \text{selectionRateRisk\_f}_{FairnessScore} + \sum_{f=1}^{N} \text{falsePositiveRisk\_f}_{FairnessScore} + \sum_{f=1}^{N} \text{falseNegativeRisk\_f}_{FairnessScore}\right)$$

$$modelRisk_{FairnessScore} = \frac{(modelRiskNumerator_{FairnessScore}/3)}{N}$$

In some embodiments, the selection rate (e.g., $\text{selectionRateRisk\_f}_{FairnessScore}$) is assigned as follows: (i) the selection rate equals 1 when the selection rate values are higher only for few evaluation feature values defined by an evaluation feature, (ii) the selection rate equals 0.5 when the selection rate values are not equally distributed across evaluation feature values, and (iii) the selection rate equals 0 when the selection rate values are equally favoring across the evaluation feature values.

In some embodiments, the false positive rate (e.g., $\text{falsePositiveRisk\_f}_{FairnessScore}$) is assigned as follows: (i) the false positive rate equals 1 when the false positive values are generally higher in the target machine learning model or false positive values are higher for few evaluation feature values defined by the demographic feature, (ii) the false positive rate equals 0.5 when the false positive values are generally lower in the target machine learning model and false positive values are not equally distributed among the evaluation feature values, and (iii) the false positive rate equals 0 when the false positive values are equally favoring across evaluation feature values, and they are generally lower for the target machine learning model.

The false negative rate (e.g., $\text{falseNegativeRisk\_f}_{FairnessScore}$) may be assigned as follows: (i) false negative rate equals 1 when the false negative values are generally higher in the target machine learning model or false negative values are higher for few evaluation feature values defined by the evaluation feature (ii) the false negative rate equals 0.5 when the false negative values are generally lower in the target machine learning model and false negative values are not equally distributed among the evaluation feature values, and (iii) the false negative rate equals 0 when the false negative values are equally favoring across evaluation feature values, and they are generally lower for the target machine learning model.

The model evaluation score for the target machine learning model may be combined with one or more additional evaluation scores, such as the data evaluation score, to generate the holistic evaluation score for the target machine learning model. In some examples, an additional evaluation score may include a decision evaluation score. An operational example for generating a decision evaluation score will now further be described with reference to FIG. 7.

Figure 7:
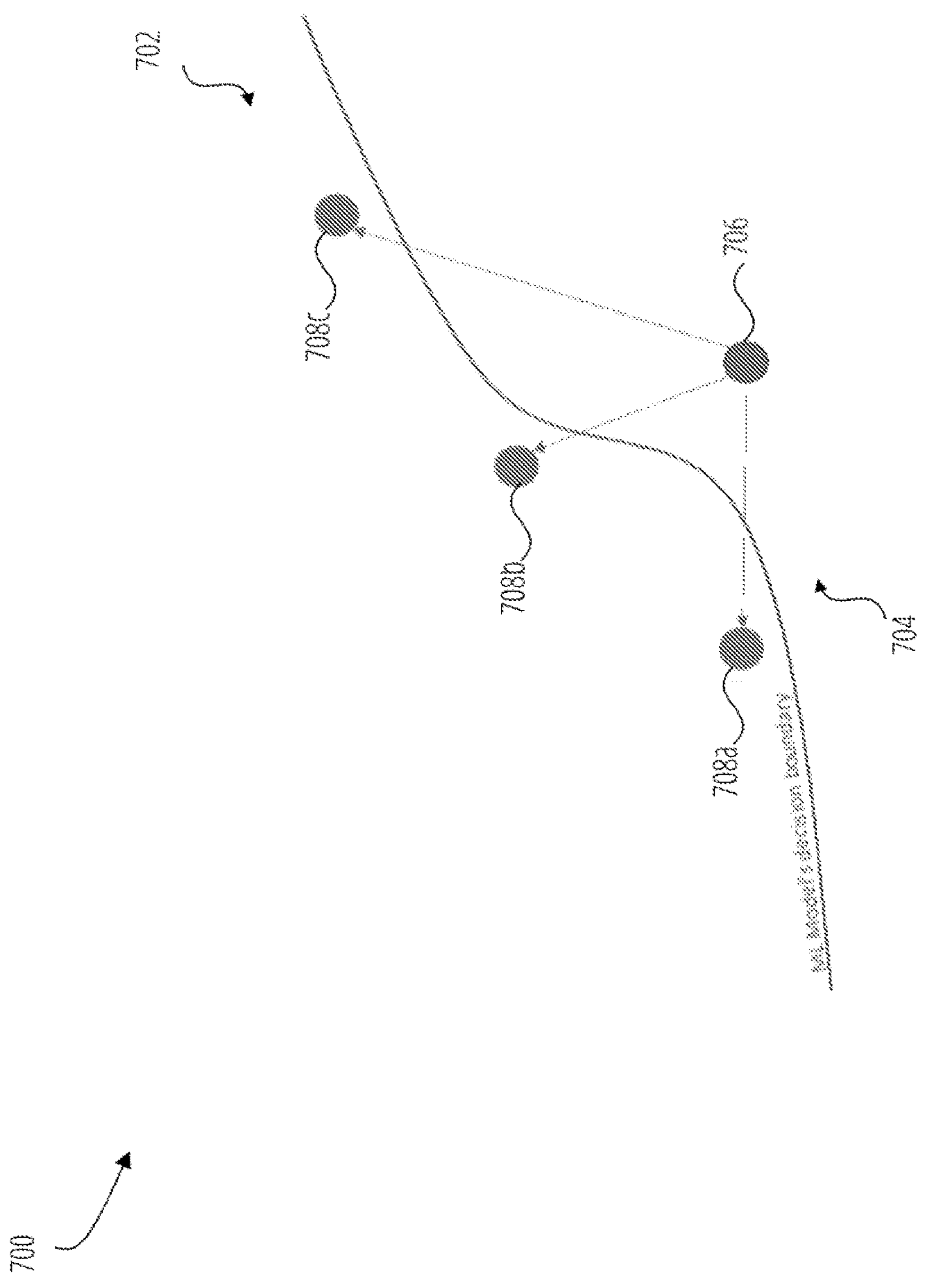
FIG. 7 is an operational example of an evaluation technique for generating a decision evaluation score for a target machine learning model in accordance with some embodiments discussed herein.

FIG. 7 is an operational example 700 of an evaluation technique for generating a decision evaluation score for a target machine learning model in accordance with some embodiments discussed herein. The operational example 700 depicts a plurality of example counterfactual proposals 708*a-c* for an input data object 706. Each counterfactual proposal may identify a predictive change to a feature value of the input data object 706 that may change a predictive output for the input data object 706 from a negative output class 704 to a positive output class 702. The decision evaluation score may be based on the plurality of counterfactual proposals 708*a-c*.

For example, the target machine learning model is previously trained to generate a plurality of predictive outputs for a plurality of input data objects. Each predictive output is one of one or more predictive output classes that may include a positive output class and/or a negative output class. The plurality of counterfactual proposals 708*a-c* may be generated for one or more input data objects for which a predictive output of a negative output class is generated. Each counterfactual proposal may identify a feature value of an input data object that may be changed to change the predictive output to a positive output class. The decision evaluation score may be based on a plurality of counterfactual proposals 708*a-c* that are respectively generated for each of a plurality of predictive outputs that correspond to a negative output class.

In some embodiments, the decision evaluation score is an evaluation score that is associated with one or more particular decisions of a target machine learning model. The decision evaluation score (e.g., CounterFactual $Risk_{FairnessScore}$) may include a fairness metric for individual predictive outputs (e.g., at auto-adjudication claim level) that are generated using the counterfactual proposals 708*a-c*. A counterfactual proposal may be used to explain individual predictive outputs during inference phase once the target machine learning model is deployed. A counterfactual proposal may be generated by leveraging one or more counterfactual algorithms, such as DiCE, CCHVAE, CEM, CLUE, CRUDS, FACE, Growing Spheres, Revise, Wacter, and/or the like. The counterfactual algorithms may be used with the plurality of input features to generate the plurality of counterfactual proposals 708*a-c* for a predictive output of the input data object 706.

A counterfactual proposal is indicative of a predictive change to one or more input features of the input data object 706 that may impact the predictive output for the input data object 706. By way of example, for an input data object 706 associated with a negative predictive output (e.g., a predictive output of a negative output class 704), a counterfactual proposal may identify one or more input feature values that may be modified to change the negative output class 704 to a positive output class 702. The counterfactual proposal may depend on the input features and/or a prediction domain. As one example, for an auto-adjudication prediction domain, one or more counterfactual proposals of a medical claim may include: a first counterfactual proposal 708*a* for modifying a policy attribute for the medical claim (e.g., a current policy has not been renewed such that the claim cannot be processed), a second counterfactual proposal 708*b* for adding medical claims artifacts (e.g., claims artifacts are missing for adjudication process and claim limit is exceeded), a third counterfactual proposal 708*c* for modifying an evaluation feature value (e.g., if the gender is changed from male to female), and/or the like.

In some embodiments, the decision evaluation score is based on a percentage of the counterfactual proposals 708*a-c* that identify one or more evaluation features for the prediction domain. For example, when an evaluation feature is identified by a counterfactual proposal for an input data object 706, a recourse method may be applied to generate the decision evaluation score. The recourse method may include using a machine learning model, such as a Bayesian network learning and inference model (e.g., bnlearn package, etc.), to predict a possibility of the counterfactual proposal. In the event that the counterfactual proposal is possible, and the proposal is allowed by one or more input data object exceptions for the evaluation feature, the decision evaluation score may be high. For instance, the decision evaluation score may include the product of 1 and the feature confidence score:

$$CounterFactualRisk_{FairnessScore} = 1 * FeatureGoodnessFairness_{RiskScore)}$$

In the event that the counterfactual proposal is not possible, but the proposal is allowed by one or more input data object exceptions for the evaluation feature, the decision evaluation score may be intermediate. For instance, the decision evaluation score may include the product of 0.5 and the feature confidence score:

$$CounterFactualRisk_{FairnessScore} = 0.5 * FeatureGoodnessFairness_{RiskScore.}$$

In the event that the counterfactual proposal is not possible, or the proposal is prohibited by one or more input data object exceptions for the evaluation feature, the decision evaluation score may be low. For instance, the decision evaluation score may be 0.

The decision evaluation score for the target machine learning model may be combined with one or more additional evaluation scores, such as the data evaluation score and the model evaluation score, to generate the holistic evaluation score for the target machine learning model. In some examples, the holistic evaluation score, and/or one or more components thereof, may be used to monitor the performance of the target machine learning model over time. A dataflow diagram illustrating example monitoring techniques will now further be described with reference to FIG. 8.

Figure 8:
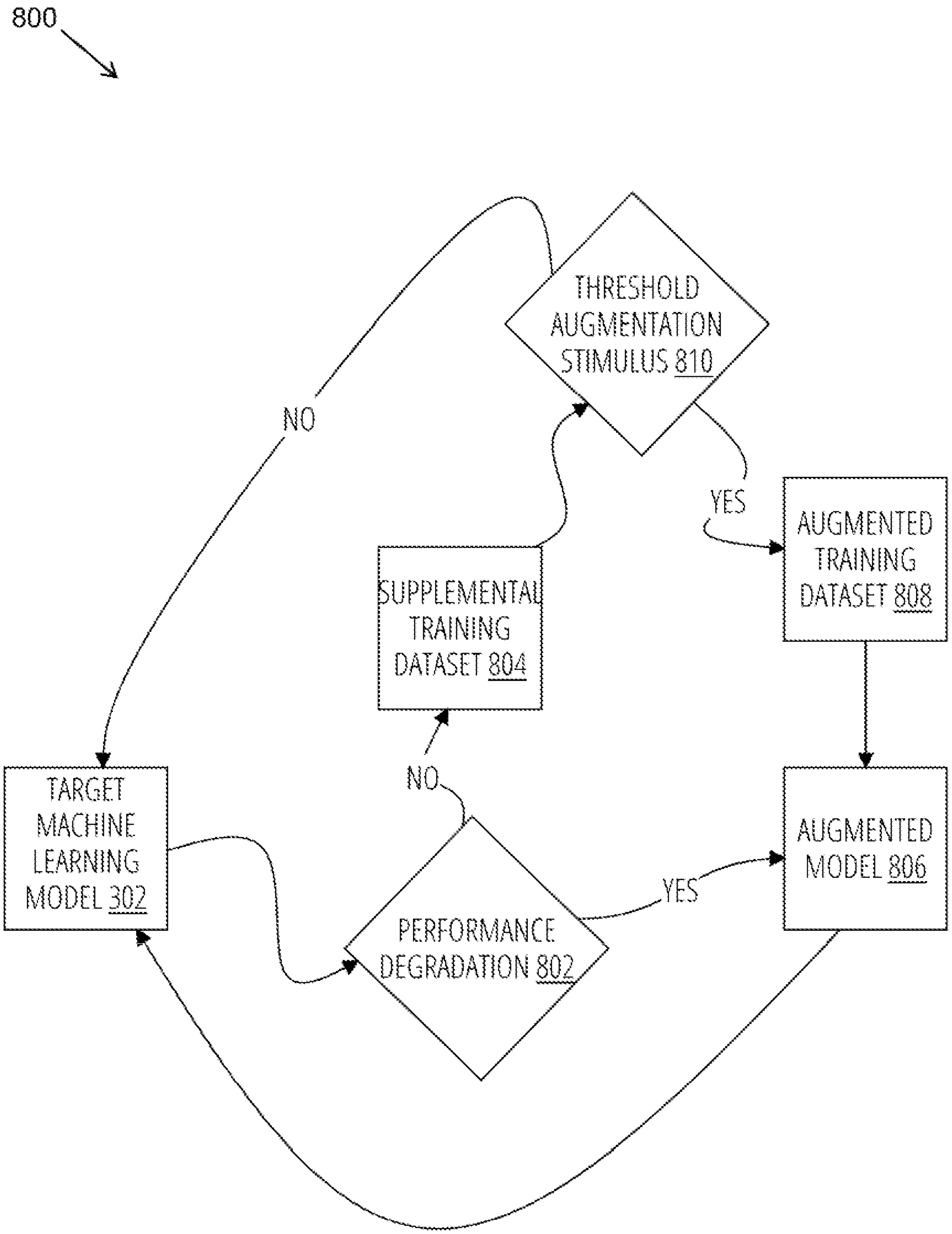
FIG. 8 is a dataflow diagram of a machine learning monitoring technique for monitoring one or more aspects of a target machine learning model in accordance with some embodiments discussed herein.

FIG. 8 is a dataflow diagram 800 of a machine learning monitoring technique for monitoring one or more aspects of a target machine learning model in accordance with some embodiments discussed herein. The dataflow diagram 800 depicts a set of data structures, data values, and/or the like for monitoring one or more aspects of a pretrained target machine learning model 302. As described herein, the target machine learning model 302 may be previously trained using a training dataset that includes a plurality of synthetic data objects and a plurality of historical data objects.

In some embodiments, the target machine learning model 302 is associated with a holistic evaluation score and/or a holistic evaluation vector that describes the performance of the target machine learning model. The target machine learning model 302 may be monitored over time using the holistic evaluation score and/or holistic evaluation vector. For instance, the holistic evaluation score, the holistic evaluation vector, and/or any other performance metric for the target machine learning model 302 may be monitored to identify a performance degradation 802 of the model.

In some embodiments, the performance degradation 802 is a post-deployment event for the target machine learning model 302. The performance degradation 802 may be indicative of a threshold change in one or more evaluation scores for the target machine learning model 302, such as the data evaluation scores, model evaluation scores, and/or decision evaluation scores described herein. In some examples, the threshold change may include a threshold decrease in a holistic evaluation score. In some examples, the threshold change may include a threshold decrease in a decision evaluation score, for example, due to counterfactual proposals favoring an evaluation feature value.

In some embodiments, an influencing feature value is identified that corresponds to the performance degradation 802. In some embodiments, the influencing feature is an input feature that is correlated to the performance degradation 802 for the target machine learning model 302. For instance, the influencing feature may be identified using one or more counterfactual proposals as described herein. For example, the influencing feature value may be based on one or more counterfactual proposals for a plurality of predictive outputs generated by the target machine learning model 302. In some examples, the influencing feature may include an evaluation feature.

In some embodiments, the target machine learning model 302 may be modified based on the influencing feature value. For example, the target machine learning model 302 may be continuously monitored to detect the performance degradation 802. The performance degradation 802 may be detected in the event that the holistic evaluation score degrades, for example, in the event that decision evaluation score is high due to counterfactual proposals that favor a particular evaluation feature value. In such a case, at least one influencing feature may be reported. Knowledge of the reported influencing feature may be used to mitigate biased predictive outputs by updating or more parameters of the target machine learning model 302. An updated holistic evaluation score may be generated for the updated target machine learning model 302.

In some embodiments, the target machine learning model 302 is intelligently retrained in response to the performance degradation 802. In some examples, the target machine learning model 302 may be retrained using an augmented training dataset 808. The augmented training dataset 808 may include a supplemental training dataset 804 that is intelligently generated over while the target machine learning model 302 is deployed.

For example, a request to process an input data object with the target machine learning model 302 may be received. In response to the request and, in some examples, in response to a determination that the performance degradation 802 is not sufficient to initiate one or more retraining operations, the input data object may be compared to a synthetic dataset portion of the training dataset to determine whether the input data object includes one or more shared input feature values with a synthetic data object. In some examples, a synthetic data object may be identified that corresponds to the input data object based on one or more corresponding input feature values shared by the synthetic data object and the input data object.

In some embodiments, in response to identifying the synthetic data object, the holistic evaluation score is modified, and the performance of a labeling process is initiated for assigning a ground truth label to the input data object. In some examples, a supplemental training dataset 804 may be augmented with the input data object and the ground truth label. In some examples, the holistic evaluation score may be modified by reducing the holistic evaluation score. By way of example, when a specific request for an input data object (e.g., a medical claim in an auto-adjudication predictive domain) includes an evaluation feature value that matches with an evaluation feature value of a synthetic dataset, the holistic evaluation score may be reduced and the prediction process for the input data object may be set to manual and/or an alert may be provided to initiate the performance of a manual labeling process.

In some embodiments, a threshold augmentation stimulus 810 is detected based on the supplemental training dataset 804. The threshold augmentation stimulus 810 may be based on a threshold number of supplemental input data objects in the supplemental training dataset 804.

In some embodiments, the supplemental training dataset 804 includes a plurality of supplemental data objects associated with a prediction domain. The type, format, and parameters of each data object may be based on the prediction domain. The supplemental training dataset 804 may include a plurality of supplemental input data objects. The supplemental input data objects may include manually classified input data objects corresponding to an influencing feature associated with a performance degradation 802 of the target machine learning model 302. In some embodiments, the threshold augmentation stimulus 810 is a threshold number of input data objects in the supplemental training dataset 804. The threshold augmentation stimulus 810 may identify a number of supplemental input data objects sufficient for retraining the target machine learning model 302.

In some embodiments, in response to the threshold augmentation stimulus 810, an augmented training dataset 808 is generated by augmenting the training dataset with the supplemental training dataset 804. For example, the corresponding input feature values may be associated with an evaluation feature of the training dataset. The plurality of synthetic data objects of the training dataset may include one or more synthetic data objects that are associated with the evaluation feature. The augmented training dataset 808 may be generated by replacing the one or more synthetic data objects with the supplemental training dataset 804.

In some embodiments, the performance degradation 802 is identified for the target machine learning model 302. In response, the augmented model 806 may be generated by retraining the target machine learning model 302 with the augmented training dataset 808. By way of example, when there are enough supplemental input data objects for a specific evaluation feature with synthetic data objects in the training dataset, the synthetic data objects may be replaced with more reliable, real-world objects, to improve the performance of the target machine learning model 302. The resulting augmented model 806 may be deployed and reevaluated to regenerate a holistic evaluation score and/or holistic evaluation vector for the model.

In this way, autonomous retraining and deployment of the target machine learning model 302 may be implemented based on drift detection in holistic evaluation metrics. On a trigger, such as a performance degradation threshold, a threshold augmentation stimulus, and/or the like, the autonomous retraining operations may be performed to receive the target machine learning model 302 and training dataset, generate an augmented training dataset 808 using the supplemental training dataset 804, generate an augmented model 806 by retraining the target machine learning model 302 with the augmented training dataset 808 to generate a new version of the target machine learning model 302, and once the augmented training dataset 808 is trained, trigger the regeneration of the holistic evaluation score and/or holistic evaluation vector for the augmented model 806.

Figure 9:
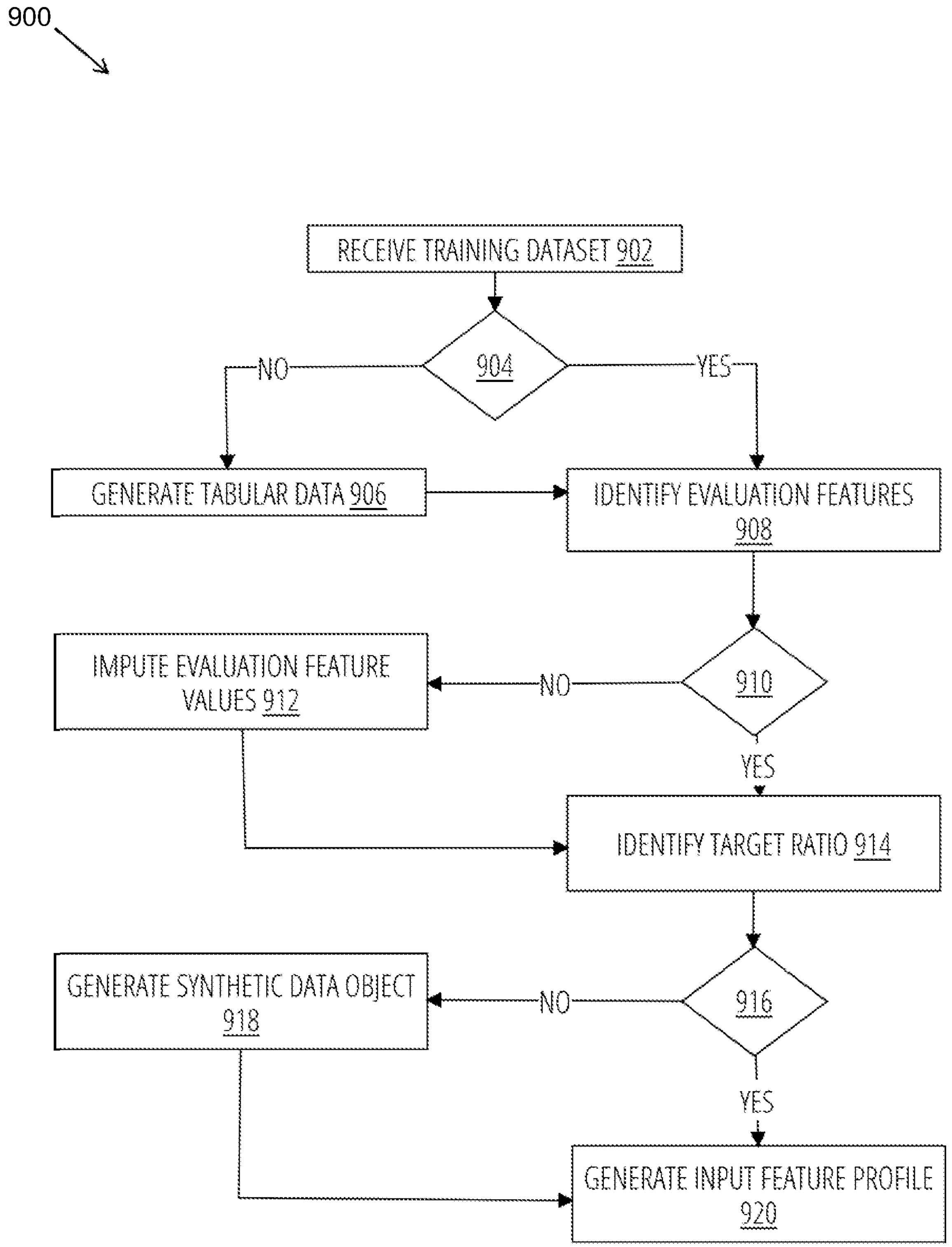
FIG. 9 is a flowchart showing an example of a process for generating a balanced training dataset for a target machine learning model in accordance with some embodiments discussed herein.

FIG. 9 is a flowchart showing an example of a process 900 for generating a balanced training dataset for a target machine learning model in accordance with some embodiments discussed herein. The process 900 leverages a plurality of different data synthesizing and imputation techniques to generate a universal balanced training dataset from data of any of a plurality of different data types. The process 900 may be implemented by one or more computing devices, entities, and/or systems described herein. For example, via the various steps/operations of the process 900, the computing system 100 may leverage the data synthesizing techniques to overcome various limitations with conventional data synthesis techniques that are limited to specific data types and/or groupings.

FIG. 9 illustrates an example process 900 for explanatory purposes. Although the example process 900 depicts a particular sequence of steps/operations, the sequence may be altered without departing from the scope of the present disclosure. For example, some of the steps/operations depicted may be performed in parallel or in a different sequence that does not materially impact the function of the process 900. In other examples, different components of an example device or system that implements the process 900 may perform functions at substantially the same time or in a specific sequence.

According to some examples, the process 900 includes, at step/operation 902, receiving a training dataset for a target machine learning model. For example, the computing system 100 may receive the training dataset. As described herein, the training dataset may include input data objects and/or contextual data for the input data objects stored in a plurality of different data formats, such as tabular formats, media formats, textual formats, graph formats, and/or the like.

In some embodiments, the training dataset includes a plurality of input data objects and a plurality of input features. The input features may include evaluation and non-evaluation features. Each input data object of the plurality of input data objects may include an input feature value for one or more of the pluralities of input features.

According to some examples, the process 900 includes, at step/operation 904, determining whether the data is in a tabular format. For example, the computing system 100 may process one or more portions (e.g., input data objects, etc.) of the training dataset to determine one or more data formats for the one or more portions. In the event that a portion of the training dataset is not in a tabular format, the computing system 100 may proceed to step/operation 906. In the event that each portion of the training dataset is in a tabular format, the computing system 100 may proceed to step/operation 908.

According to some examples, the process 900 includes, at step/operation 906, in response to determining that a portion of the training dataset is not in tabular format, generating tabular data for the portion of the training dataset. For example, the computing system 100 may generate the tabular data. By way of example, the computing system 100 may derive input feature values (e.g., non-evaluation feature values, evaluation feature values, etc.) from the portion of the training dataset and generate the tabular data from the portion of the training dataset. In some examples, the computing system 100 may extract the input feature values from media data (e.g., x-rays, etc.), textual data (e.g., conversation transcripts, etc.), and/or the like using the data augmentations techniques described herein.

According to some examples, the process 900 includes, at step/operation 908, in response to determining that the portion of the training dataset is in tabular format, identifying one or more evaluation features for the training dataset. For example, the computing system 100 may identify the one or more evaluation features for the training dataset. For instance, the computing system 100 may receive a data evaluation profile for the training dataset. The data evaluation profile may be indicative of: (i) one or more evaluation features from the plurality of input features, (ii) one or more defined feature values for each of the one or more evaluation features, and/or (iii) one or more input data object exceptions each of the one or more evaluation features. The computing system 100 may identify the one or more evaluation features based on the data evaluation profile.

According to some examples, the process 900 includes, at step/operation 910, determining whether each input data object includes an evaluation feature value for each of the identified evaluation features. For example, the computing system 100 may determine whether each input data object includes an evaluation feature value for each of the identified evaluation features. In the event that an evaluation feature value for an identified evaluation feature is missing from an input data object, the computing system 100 may proceed to step/operation 912. In the event that each input data object includes an evaluation feature value for each of the identified evaluation features, the computing system 100 may proceed to step/operation 914.

According to some examples, the process 900 includes, at step/operation 912, imputing evaluation feature values for each input data object of the training dataset. For example, the computing system 100 may impute missing evaluation feature values for each input data object of the training dataset using the imputation techniques described herein.

According to some examples, the process 900 includes, at step/operation 914, identifying a target ratio for each evaluation feature of the training dataset. For example, the computing system 100 may identify the target ratio for each evaluation feature of the training dataset. In some examples, the computing system 100 may determine the target ratio for an evaluation feature. For instance, the one or more defined feature values of the evaluation feature may include a first and second feature value and the target ratio may be indicative of a first expected frequency for the first feature value and a second expected frequency for the second feature value in the training dataset.

According to some examples, the process 900 includes, at step/operation 916, determining whether the training dataset is balanced. For example, the computing system 100 may determine whether the training dataset is balanced based on a comparison between the training dataset and the target ratios for each of the evaluation features of the training dataset. In the event that the training dataset is not balanced, the computing system 100 may proceed to step/operation 918. In the event that the training dataset is balanced, the computing system 100 may proceed to step/operation 920.

According to some examples, the process 900 includes, at step/operation 918, generating one or more synthetic datasets for the one or more evaluation features. For example, the computing system 100 may generate the one or more synthetic datasets for the one or more evaluation features. For instance, the computing system 100 may generate a synthetic dataset for an evaluation feature based on a target ratio for the evaluation feature and the data evaluation profile. The synthetic dataset may include a plurality of synthetic data objects each including at least one feature value from one or more defined feature values of the evaluation feature. By way of example, the plurality of synthetic data objects may include one or more first synthetic data objects that each include a first feature value for the evaluation feature and one or more second synthetic data objects that each include a second feature value for the evaluation feature. The one or more first synthetic data objects may be based on a first expected frequency for the first feature value. The one or more second synthetic data objects may be based on a second expected frequency for the second feature value.

According to some examples, the process 900 includes, at step/operation 920, generating one or more input feature profiles for the input features of the training dataset. For example, the computing system 100 may generate input feature profiles for each non-evaluation feature of the plurality of input features associated with the training dataset. By way of example, the computing system 100 may generate an input feature profile for a non-evaluation feature of the training dataset based on the training dataset and the synthetic dataset. The input feature profile may be indicative of a feature confidence score between the non-evaluation feature and an evaluation feature.

Figure 10:
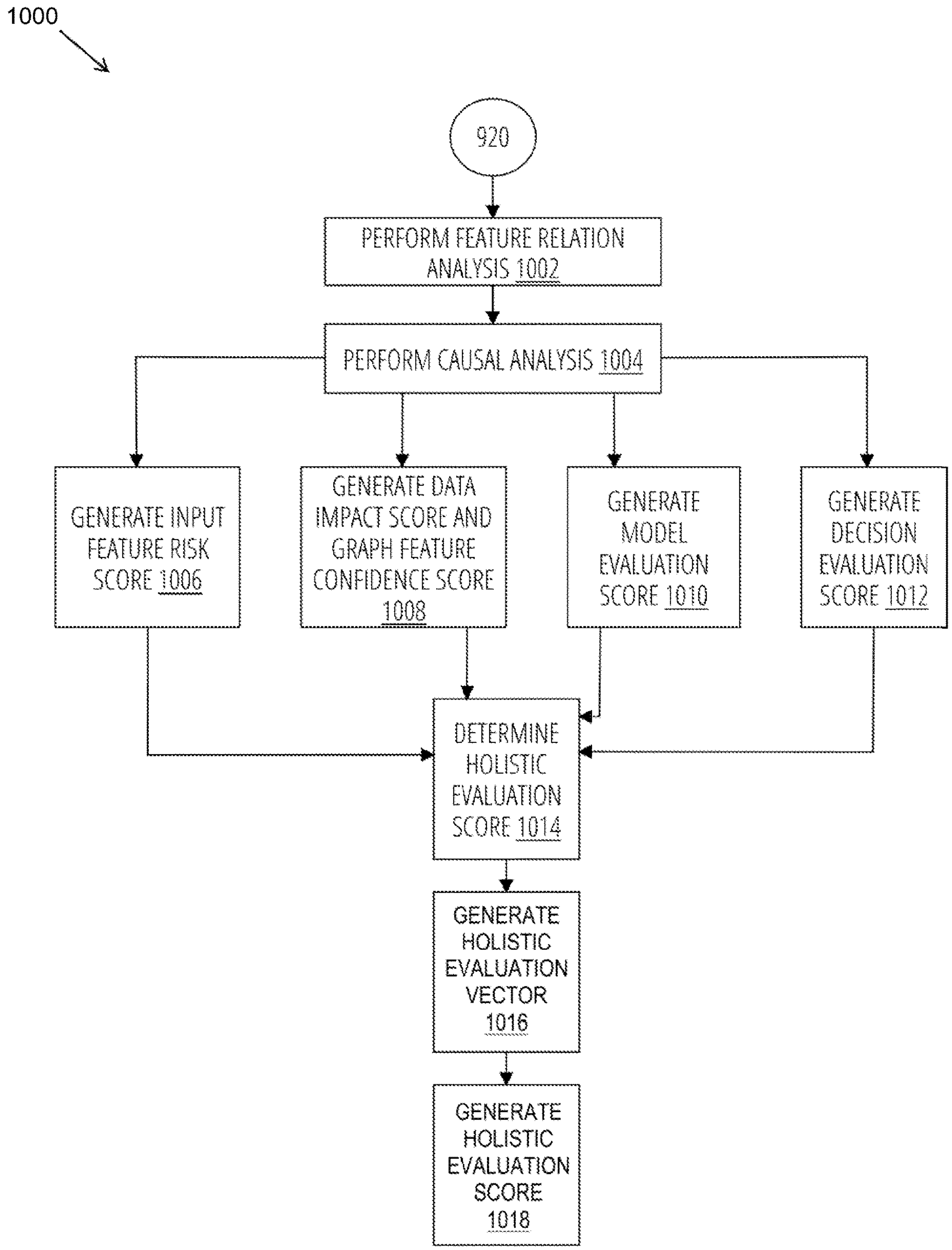
FIG. 10 is a flowchart showing an example of a process for generating a holistic evaluation score for a target machine learning model in accordance with some embodiments discussed herein.

FIG. 10 is a flowchart showing an example of a process 1000 for generating a holistic evaluation score for a target machine learning model in accordance with some embodiments discussed herein. The process 1000 leverages a plurality of different data evaluation techniques to generate an evaluation output for a target machine learning model that holistically evaluates each of a plurality of different aspects of the machine learning model using one data structure. The process 1000 may be implemented by one or more computing devices, entities, and/or systems described herein. For example, via the various steps/operations of the process 1000, the computing system 100 may leverage the data evaluation techniques to overcome various limitations with conventional machine learning evaluation techniques that (i) are limited to particular aspects of machine learning models, (ii) lack explainability, and/or (iii) are narrowly tailored to specifically identified evaluation features.

FIG. 10 illustrates an example process 1000 for explanatory purposes. Although the example process 1000 depicts a particular sequence of steps/operations, the sequence may be altered without departing from the scope of the present disclosure. For example, some of the steps/operations depicted may be performed in parallel or in a different sequence that does not materially impact the function of the process 1000. In other examples, different components of an example device or system that implements the process 1000 may perform functions at substantially the same time or in a specific sequence. The process 1000 may begin at step/operation 920 in which the process 900 includes generating one or more input feature profiles for one or more input features of a training dataset.

According to some examples, the process 1000 includes, at step/operation 1002. initiating the performance of a feature relation analysis for the training dataset. For example, the computing system 100 may initiate the performance of the feature relation analysis. For instance, the computing system 100 may apply one or more feature relation algorithms to each of a plurality of pairs of non-evaluation and evaluation features to identify relationships between the non-evaluation and evaluation features.

According to some examples, the process 1000 includes, at step/operation 1004, initiating the performance of a causal analysis for the training dataset. For example, the computing system 100 may initiate the performance of the causal analysis. For instance, the computing system 100 may apply one or more causal relation algorithms described herein to determine the correlation between an ultimate performance of a target machine learning model and the training dataset.

According to some examples, the process 1000 includes, at step/operation 1006, generating an input feature risk score for the training dataset. For example, the computing system 100 may generate the input feature risk score for the training dataset. For instance, the computing system 100 may generate a feature correlation score, using one or more bivariate analysis techniques described herein, between an evaluation feature and a non-evaluation feature. The computing system 100 may determine a scaled feature correlation score based on the feature correlation score and a feature confidence score corresponding to the evaluation and non-evaluation feature. In some examples, in response to the scaled feature correlation score achieving a threshold score, the computing system may augment the evaluation feature profile with the non-evaluation feature.

In some embodiments, the computing system 100 may generate an input feature risk score for the training dataset based on an aggregation of a plurality of scaled feature correlation scores for the non-evaluation features of the training dataset. The input feature risk score may be indicative of a probability that the one or more non-evaluation features are impacted by the feature confidence scores.

According to some examples, the process 1000 includes, at step/operation 1008, generating a data impact score and/or a graph feature confidence score for the training dataset. For example, the computing system 100 may generate the data impact score and/or the graph feature confidence score for the training dataset. For instance, the computing system 100 may generate, using an interpretable machine learning model, a plurality of first feature impact measures for the one or more evaluation features. A first feature impact measure may be indicative of a relative impact of an evaluation feature to a predictive output of the target machine learning model. In addition, or alternatively, the computing system 100 may generate, using one or more partial dependency plots, a plurality of second feature impact measures for the one or more evaluation features. A second feature impact measure may be indicative of a relationship type between the evaluation feature and one or more predicted output classes of the target machine learning model.

In some embodiments, the computing system 100 determines the data impact score for the training dataset based on the plurality of first feature impact measures and the plurality of second feature impact measures. For instance, the data impact score may be indicative of a probability that a predictive output by the target machine learning model is impacted by the feature confidence score. The graph feature confidence score may be generated using one or more techniques described herein, such as those described with reference to FIG. 11.

In some embodiments, the computing system 100 generates a data evaluation score corresponding to the training dataset for the target machine learning model based on at least one of the input feature risk scores, the data impact score, and/or the graph feature confidence score as described herein.

According to some examples, the process 1000 includes, at step/operation 1010, generating a model evaluation score for the target machine learning model. For example, the computing system 100 may generate the model evaluation score for the target machine learning model. For instance, the plurality of input data objects may include one or more evaluation data object sets. Each of the evaluation data object sets may include one or more input data objects that each include a particular feature value of an evaluation feature. In some examples, the model evaluation score may be based on a comparison between at least two of the one or more evaluation data object sets.

By way of example, the model evaluation score may correspond to one or more performance metrics for the target machine learning model. The one or more performance metrics may include a first performance metric, a second performance metric, and/or a third performance metric. The computing system 100 may determine the first performance metric based on a selection rate comparison between the at least two evaluation data object sets. The computing system 100 may determine the second performance metric based on a false positive rate comparison between the at least two evaluation data object sets. The computing system 100 may determine the third performance metric based on a false negative rate comparison between the at least two evaluation data object sets. In some examples, the computing system 100 may generate the model evaluation score based on an aggregation of the first performance metric, the second performance metric, and the third performance metric.

According to some examples, the process 1000 includes, at step/operation 1012, generating a decision evaluation score for the target machine learning model. For example, the computing system 100 may generate the decision evaluation score for the target machine learning model. The decision evaluation score may correspond to an output class of the target machine learning model. For instance, the target machine learning model may be previously trained to generate a plurality of predictive outputs for a plurality of input data objects. In some examples, each of the plurality of predictive outputs may correspond to a positive output class and/or a negative output class.

In some embodiments, the decision evaluation score is based on one or more counterfactual proposals for one or more of the pluralities of predictive outputs that correspond to the negative output class. For instance, the computing system 100 may identify, from the one or more counterfactual proposals, an evaluation counterfactual proposal that includes an evaluation feature of the one or more evaluation features. In response to identifying the evaluation counterfactual, the computing system 100 may generate, using a machine learning recourse model, a recourse action for the evaluation counterfactual. In some examples, the computing system 100 may generate the decision evaluation score based on the recourse action.

According to some examples, the process 1000 includes, at step/operation 1014, generating a holistic evaluation score for the target machine learning model. For example, the computing system 100 may generate the holistic evaluation score for the target machine learning model. For instance, the computing system 100 may generate the holistic evaluation score for the target machine learning model based on an aggregation of one or more of the data evaluation scores, the model evaluation score, and/or the decision evaluation score.

According to some examples, the process 1000 includes, at step/operation 1016, generating a holistic evaluation vector for the target machine learning model. For example, the computing system 100 may generate the holistic evaluation vector for the target machine learning model. For instance, the computing system 100 may generate the holistic evaluation vector for the target machine learning model based on a plurality of evaluation scores for the target machine learning model. The plurality of evaluation scores may include (i) the data evaluation score corresponding to a training dataset for the target machine learning model, (ii) the model evaluation score corresponding to one or more performance metrics for the target machine learning model, and/or (iii) the decision evaluation score corresponding to an output class of the target machine learning model.

According to some examples, the process 1000 includes, at step/operation 1018, providing an evaluation output for the target machine learning model. For example, the computing system 100 may generate the evaluation output for the target machine learning model based on the holistic evaluation score and/or the holistic evaluation vector and provide the evaluation output as an output.

Figure 11:
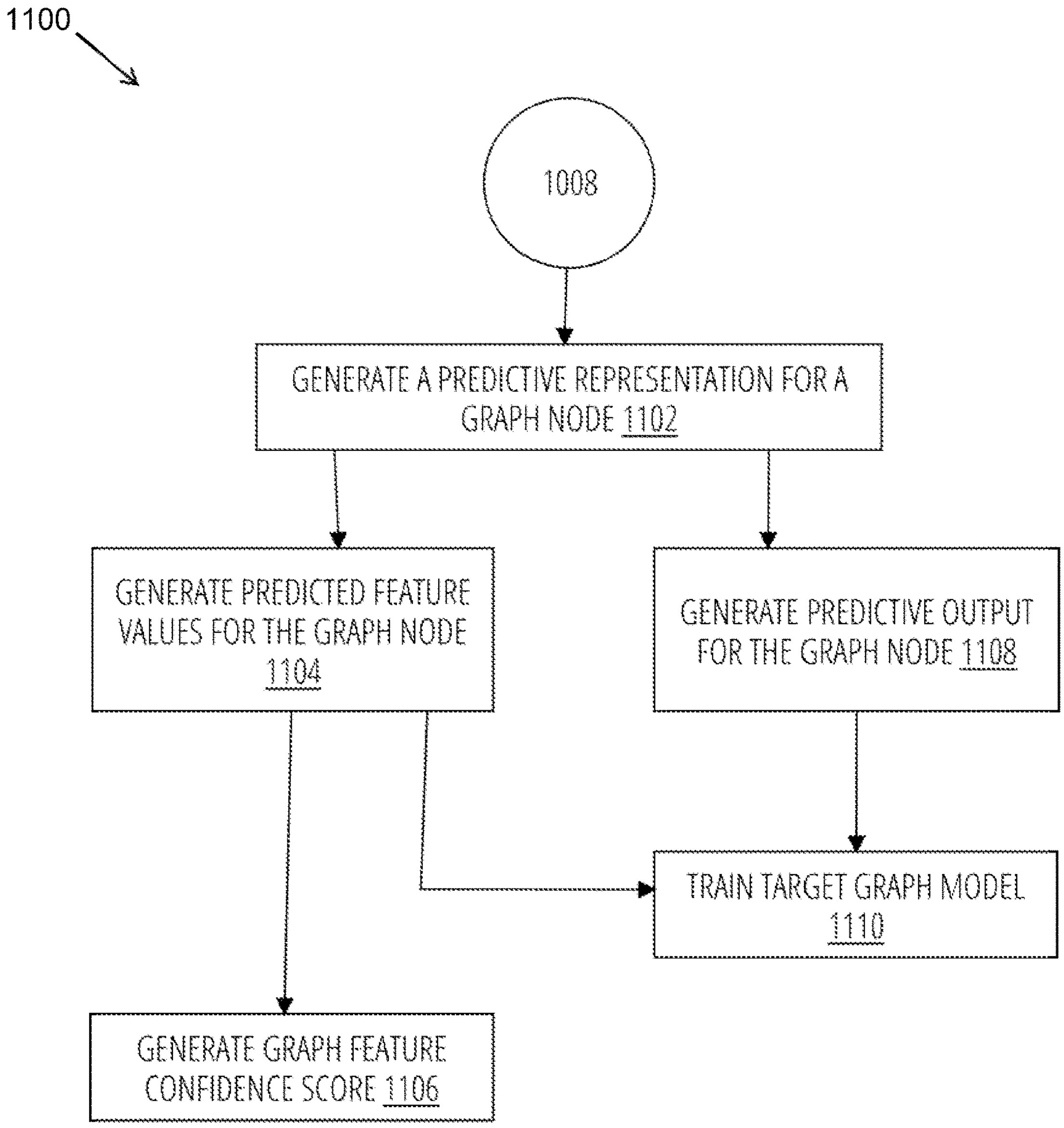
FIG. 11 is a flowchart showing an example of a process for training and/or evaluating a target graph model in accordance with some embodiments discussed herein

FIG. 11 is a flowchart showing an example of a process 1100 for training and/or evaluating a target graph model in accordance with some embodiments discussed herein. The process 1100 leverages new training and evaluation techniques to (i) reduce bias of a target graph model and (ii) generate metrics tailored to a graph training dataset. The process 1100 may be implemented by one or more computing devices, entities, and/or systems described herein. For example, via the various steps/operations of the process 1100, the computing system 100 may leverage the training and evaluation techniques to overcome various limitations with conventional machine learning training and evaluation techniques that fail to account for the various nuances particular to graph datasets and graph neural networks.

FIG. 11 illustrates an example process 1100 for explanatory purposes. Although the example process 1100 depicts a particular sequence of steps/operations, the sequence may be altered without departing from the scope of the present disclosure. For example, some of the steps/operations depicted may be performed in parallel or in a different sequence that does not materially impact the function of the process 1100. In other examples, different components of an example device or system that implements the process 1100 may perform functions at substantially the same time or in a specific sequence. The process 1100 may begin at step/operation 1008 in which the process 1000 includes generating a data impact score and/or graph feature confidence score for a training dataset. By way of example, the process 1100 may include one or more sub-operations of step/operation 1008. In some examples, the process 1100 may be performed in the event that a training dataset includes a graph training dataset.

According to some examples, the process 1100 includes, at step/operation 1102, generating a predictive representation for a graph node of a graph training dataset. For example, the computing system 100 may generate, using a target graph model, the predictive representation for the graph node of the graph training dataset. The target graph model may include a first GNN.

In some embodiments, the predictive representation includes a feature embedding that encodes one or more features of the graph node and/or one or more adjacent features of one or more neighboring nodes of the graph node in the graph training dataset. For example, the one or more neighboring nodes of the graph node may include one or more nodes of the graph training dataset that are connected to the graph node by one or more edges.

According to some examples, the process 1100 includes, at step/operation 1104, generating predicted feature values for the graph node. For example, the computing system 100 may generate, using a feature prediction model, the predicted feature values for the graph node based on the predictive representation. The feature prediction model may include a second GNN.

According to some examples, the process 1100 includes, at step/operation 1106, generating a graph feature confidence score for the graph training dataset. For example, the computing system 100 may generate the graph feature confidence score for the graph training dataset based on the predicted feature values and/or the predictive representation. In some examples, the computing system may generate a data evaluation score for the graph training dataset based on the one or more predicted feature values. For example, the data evaluation score may be based on the graph feature confidence score. The graph feature confidence score may be indicative of a predicted accuracy of the one or more predicted feature values. For example, the graph feature confidence score may be based on a predicted feature confidence score indicative of a confidence level for the one or more predicted feature values. In some examples, the predicted feature confidence score may be generated by the feature prediction model.

According to some examples, the process 1100 includes, at step/operation 1108, generating a predictive output for the graph node. For example, the computing system 100 may generate, using the target graph model, the predictive output for the graph node. For instance, the predictive output may include a node classification for the graph node. In some examples, the one or more predicted feature values may correspond to one or more evaluation features of the graph training dataset. The target graph model may be previously trained to generate an evaluation feature-agnostic predictive representation that at least partially prevents the target graph model from generating the predictive output based on the one or more evaluation features.

According to some examples, the process 1100 includes, at step/operation 1110, training the target graph model. For example, the computing system 100 may train the target graph model based on the predictive output and/or one or more ground truth labels for the graph node. For instance, the target graph model and the feature prediction model may be jointly trained using a joint objective function.

The joint objective function may include a first objective function and a second objective function. The first objective function may include an optimization function for the target graph model. For instance, the first objective function may include a comparison between the predictive output and a ground truth label for the graph node. The second objective function may include an optimization function for the feature prediction model.

Figure 12:
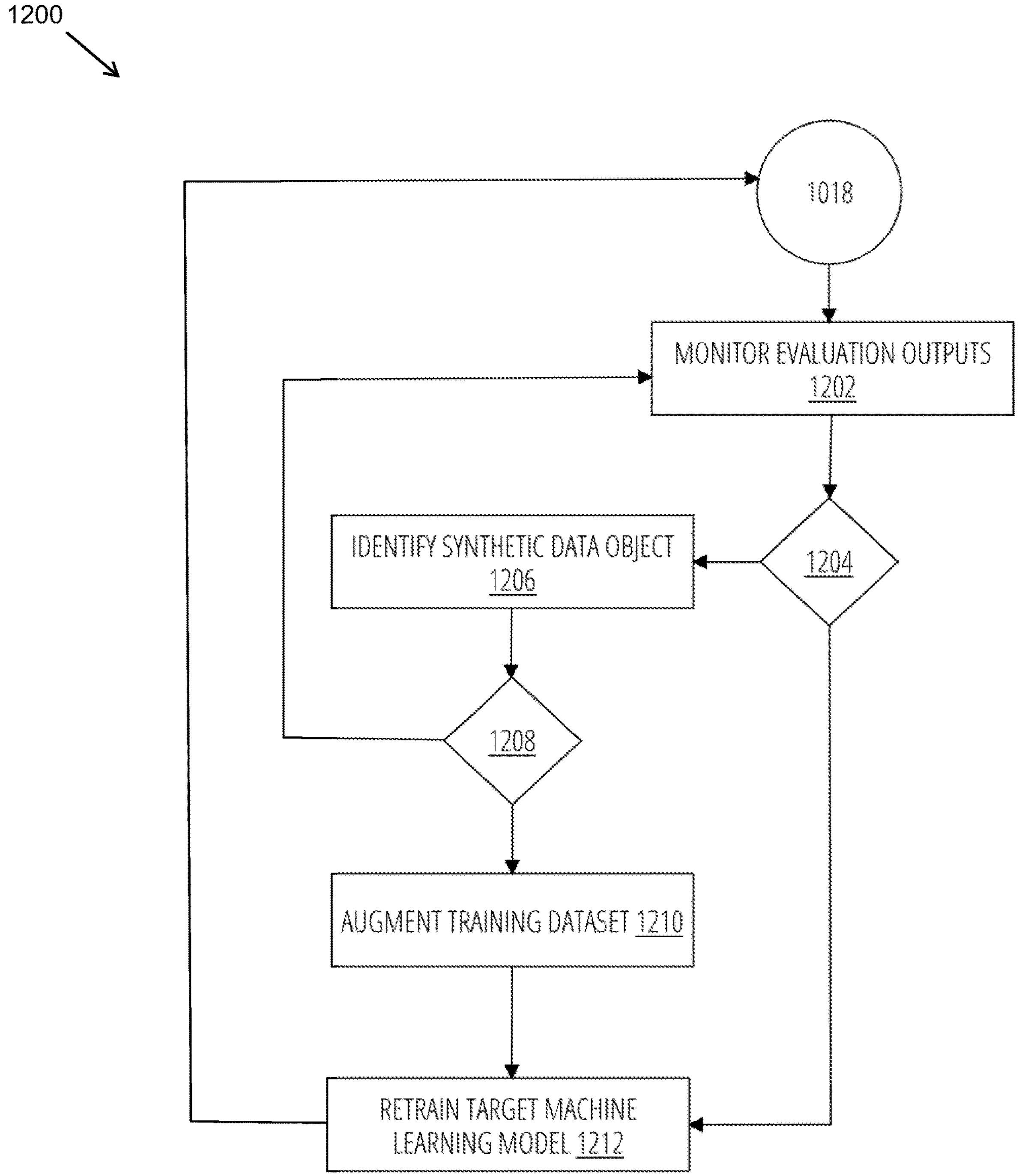
FIG. 12 is a flowchart showing an example of a process 1200 for monitoring the performance of a machine learning model in accordance with some embodiments discussed herein.

FIG. 12 is a flowchart showing an example of a process 1200 for monitoring the performance of a machine learning model in accordance with some embodiments discussed herein. The process 1200 leverages new evaluation and monitoring techniques to monitor the performance of a machine learning model automatically and continuously after deployment based on the real time use of the model. The process 1200 may be implemented by one or more computing devices, entities, and/or systems described herein. For example, via the various steps/operations of the process 1200, the computing system 100 may leverage the evaluation and monitoring techniques to overcome various limitations with conventional machine learning techniques that do not have mechanisms for the continuous, accurate, holistic, and automatic evaluation of machine learning models after the models are deployed. Using the techniques of the process 1200, a machine learning model may be continuously monitored to detect performance drift and other abnormalities that may impact the performance of the model. Such detection may be used to trigger retraining operations to continuously improve machine learning model performance after deployment.

FIG. 12 illustrates an example process 1200 for explanatory purposes. Although the example process 1200 depicts a particular sequence of steps/operations, the sequence may be altered without departing from the scope of the present disclosure. For example, some of the steps/operations depicted may be performed in parallel or in a different sequence that does not materially impact the function of the process 1200. In other examples, different components of an example device or system that implements the process 1200 may perform functions at substantially the same time or in a specific sequence. The process 1200 may begin at step/operation 1018 in which the process 1000 includes providing an evaluation output. By way of example, the process 1200 may include one or more sub-operations of step/operation 1018. In addition, or alternatively, the process 1200 may include a plurality of step/operations performed subsequent to step/operation 1018. By way of example, the process 1200 may include one or more step/operations that leverage an evaluation output to monitor the performance a target machine learning model.

According to some examples, the process 1200 includes, at step/operation 1202. monitoring evaluation outputs for the target machine learning model. For example, the computing system 100 may monitor the evaluation outputs for the target machine learning model.

According to some examples, the process 1200 includes, at step/operation 1204, identifying a performance degradation. For example, the computing system 100 may monitor the evaluation outputs until the performance degradation is identified for the target machine learning model. In the event that the performance degradation is identified, the process 1200 may proceed to step/operation 1212 in which the target machine learning model is retrained to address the performance degradation. In the event that the performance degradation is not identified, the process 1200 may proceed to step/operation 1206.

In some embodiments, the computing system 100 receives a request to process an input data object with the monitored target machine learning model. The target machine learning model may be previously trained using a training dataset that includes a plurality of synthetic data objects and a plurality of historical data objects. The computing system 100 may identify the performance degradation in response to the request. In some examples, the computing system 100 may identify the performance degradation based on a holistic evaluation score for the target machine learning model.

In some embodiments, in response to the performance degradation, the computing system 100 may identify an influencing feature value corresponding to the performance degradation. The influencing feature value may be based on one or more counterfactual proposals for a plurality of predictive outputs generated by the target machine learning model.

According to some examples, the process 1200 includes, at step/operation 1206, in response to not identifying the performance degradation, identifying a synthetic data object for an input data object. For example, the computing system 100 may identify the synthetic data object from the plurality of synthetic data object. The synthetic data object may correspond to the input data object based on one or more corresponding input feature values shared by the synthetic data object and the input data object.

In some embodiments, in response to identifying the synthetic data object, the computing system 100 modifies the holistic evaluation score for the target machine learning model. For example, the computing system 100 may modify the holistic evaluation score by reducing the holistic evaluation score. The computing system 100 may initiate the performance of a labeling process for assigning a ground truth label to the input data object. In some examples, the computing system 100 may augment a supplemental training dataset with the input data object and the ground truth label.

According to some examples, the process 1200 includes, at step/operation 1208, identifying a threshold augmentation stimulus. For example, the computing system 100 may identify the threshold augmentation stimulus for a supplemental training dataset. In the event that the threshold augmentation stimulus is not identified, the process 1200 may return to step/operation 1202. In the event that the threshold augmentation stimulus is identified, the process 1200 may proceed to step/operation 1210.

According to some examples, the process 1200 includes, at step/operation 1210, in response to identifying the threshold augmentation stimulus, generating an augmented training dataset. For example, the computing system 100 may generate the augmented training dataset by augmenting the training dataset with the supplemental training dataset. By way of example, the computing system 100 may detect the threshold augmentation stimulus based on the supplemental training dataset. The threshold augmentation stimulus, for example, may be based on a threshold number of supplemental input data objects in the supplemental training dataset.

In response to the threshold augmentation stimulus, the computing system may generate an augmented training dataset by augmenting the training dataset with the supplemental training dataset. For example, the corresponding input feature values between the input data object and the synthetic data object may be associated with an evaluation feature of the training dataset. The plurality of synthetic data objects may include one or more synthetic data objects associated with the evaluation feature. In some examples, augmenting the training dataset may include replacing the one or more synthetic data objects with the supplemental training dataset.

According to some examples, the process 1200 includes, at step/operation 1212, in response to augmenting the training dataset, retraining the target machine learning model based on the augmented training dataset. For example, the computing system 100 may retrain the target machine learning model based on the augmented training dataset. In some examples, in response to the performance degradation, the computing system may modify the target machine learning model based on the augmented training dataset. In some examples, the computing system 100 may modify the target machine learning model based on the influencing feature value. In some embodiments, the computing system generates an updated holistic evaluation score for the retrained (e.g., modified, etc.) target machine learning model.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

Example 1. A computer-implemented method comprising: generating, by one or more processors, a holistic evaluation vector for a target machine learning model based on a plurality of evaluation scores for the target machine learning model, wherein the plurality of evaluation scores comprises: (i) a data evaluation score corresponding to a training dataset for the target machine learning model, (ii) a model evaluation score corresponding to one or more performance metrics for the target machine learning model, and (iii) a decision evaluation score corresponding to an output class of the target machine learning model; generating, by the one or more processors, a holistic evaluation score for the target machine learning model based on an aggregation of the holistic evaluation vector; and providing, by the one or more processors, an evaluation output for the target machine learning model based on the holistic evaluation score.

Example 2. The computer-implemented method of example 1, wherein (i) the target machine learning model is previously trained based on the training dataset, (ii) the training dataset comprises a plurality of input data objects and a plurality of input features, (iii) each input data object of the plurality of input data objects comprises an input feature value for one or more of the plurality of input features, and (iv) the data evaluation score is indicative of a balance of the training dataset with respect to one or more of the plurality of input features.

Example 3. The computer-implemented method of example 2 further comprising: receiving a data evaluation profile for the training dataset, wherein the data evaluation profile is indicative of: (i) one or more evaluation features from the plurality of input features, (ii) one or more feature values respectively defined for each of the one or more evaluation features, and (iii) one or more input data object exceptions for each of the one or more evaluation features; and generating the data evaluation score based on the data evaluation profile.

Example 4. The computer-implemented method of example 3 further comprising: determining a target ratio for an evaluation feature of the one or more evaluation features; generating a synthetic dataset for the evaluation feature based on the target ratio and the data evaluation profile, wherein the synthetic dataset comprises a plurality of synthetic data objects each comprising at least one feature value from one or more defined feature values of the evaluation feature; and generating the data evaluation score based on the synthetic dataset.

Example 5. The computer-implemented method of example 4, wherein: (i) the one or more defined feature values comprise a first feature value and a second feature value, (ii) the target ratio is indicative of a first expected frequency for the first feature value and a second expected frequency for the second feature value, (iii) the plurality of synthetic data objects comprises (a) one or more first synthetic data objects, each comprising the first feature value and (b) one or more second synthetic data objects, each comprising the second feature value, (iv) the one or more first synthetic data objects are based on the first expected frequency, and (v) the one or more second synthetic data objects are based on the second expected frequency.

Example 6. The computer-implemented method of examples 4 or 5, wherein the plurality of input features comprises the one or more evaluation features and one or more non-evaluation features, wherein the computer-implemented method further comprises: generating an input feature profile for a non-evaluation feature of the training dataset based on the training dataset and the synthetic dataset, wherein the input feature profile is indicative of a feature confidence score between the non-evaluation feature and the evaluation feature; and generating the data evaluation score based on the feature confidence score.

Example 7. The computer-implemented method of example 6 further comprising: generating a feature correlation score between the evaluation feature and the non-evaluation feature; determining a scaled feature correlation score based on the feature correlation score and the feature confidence score; and in response to the scaled feature correlation score achieving a threshold score, augmenting the data evaluation profile with the non-evaluation feature.

Example 8. The computer-implemented method of example 7 further comprising: generating an input feature risk score for the training dataset based on an aggregation of a plurality of scaled feature correlation scores for the one or more non-evaluation features, wherein the input feature risk score is indicative of a probability that the one or more non-evaluation features are impacted by the feature confidence score; and generating the data evaluation score based on the input feature risk score.

Example 9. The computer-implemented method of example 8 further comprising: generating, using an interpretable machine learning model, a plurality of first feature impact measures for the one or more evaluation features, wherein a first feature impact measure is indicative of a relative impact of the evaluation feature to a predictive output of the target machine learning model; generating, using one or more partial dependency plots, a plurality of second feature impact measures for the one or more evaluation features, wherein a second feature impact measure for the evaluation feature is indicative of a relationship type between the evaluation feature and one or more predicted output classes of the target machine learning model; determining a data impact score for the training dataset based on the plurality of first feature impact measures and the plurality of second feature impact measures, wherein the data impact score is indicative of a probability that one or more predictive outputs by the target machine learning model are impacted by the feature confidence score; and generating the data evaluation score based on the data impact score.

Example 10. The computer-implemented method of any of the preceding examples, wherein: (i) the training dataset comprises a plurality of input data objects and a plurality of input features, (ii) the plurality of input features comprises one or more evaluation features, (iii) the plurality of input data objects comprises one or more evaluation data object sets, (iv) each evaluation data object set comprises one or more input data objects that each comprise a particular feature value of an evaluation feature, and (v) the model evaluation score is based on a comparison between at least two of the one or more evaluation data object sets.

Example 11. The computer-implemented method of example 10, wherein the one or more performance metrics comprise a first performance metric, a second performance metric, and a third performance metric, wherein generating the model evaluation score comprises: determining the first performance metric based on a selection rate comparison between the at least two evaluation data object sets; determining the second performance metric based on a false positive rate comparison between the at least two evaluation data object sets; determining the third performance metric based on a false negative rate comparison between the at least two evaluation data object sets; and generating the model evaluation score based on an aggregation of the first performance metric, the second performance metric, and the third performance metric.

Example 12. The computer-implemented method of any of the preceding examples, wherein: (i) the target machine learning model is previously trained to generate a plurality of predictive outputs for a plurality of input data objects, (ii) each of the plurality of predictive outputs correspond to a positive output class or a negative output class, and (iii) the decision evaluation score is based on one or more counterfactual proposals for one or more of the plurality of predictive outputs that correspond to the negative output class.

Example 13. The computer-implemented method of example 12, wherein the plurality of input data objects is associated with one or more evaluation features, and wherein the computer-implemented method further comprises: identifying, from the one or more counterfactual proposals, an evaluation counterfactual proposal that comprises an evaluation feature of the one or more evaluation features; in response to identifying the evaluation counterfactual proposal, generating, using a machine learning recourse model, a recourse action for the evaluation counterfactual proposal; and generating the decision evaluation score based on the recourse action.

Example 14. A computing apparatus comprising memory and one or more processors communicatively coupled to the memory, the one or more processors configured to: generate a holistic evaluation vector for a target machine learning model based on a plurality of evaluation scores for the target machine learning model, wherein the plurality of evaluation scores comprises: (i) a data evaluation score corresponding to a training dataset for the target machine learning model, (ii) a model evaluation score corresponding to one or more performance metrics for the target machine learning model, and (iii) a decision evaluation score corresponding to an output class of the target machine learning model; generate a holistic evaluation score for the target machine learning model based on an aggregation of the holistic evaluation vector; and provide an evaluation output for the target machine learning model based on the holistic evaluation score.

Example 15. The computing apparatus of example 14, wherein: (i) the target machine learning model is previously trained based on the training dataset, (ii) the training dataset comprises a plurality of input data objects and a plurality of input features, (iii) each input data object of the plurality of input data objects comprises an input feature value for one or more of the plurality of input features, and (iv) the data evaluation score is indicative of a balance of the training dataset with respect to one or more of the plurality of input features.

Example 16. The computing apparatus of example 15, wherein the one or more processors are further configured to: receive a data evaluation profile for the training dataset, wherein the data evaluation profile is indicative of: (i) one or more evaluation features from the plurality of input features, (ii) one or more feature values respectively defined for each of the one or more evaluation features, and (iii) one or more input data object exceptions each of the one or more evaluation features; and generate the data evaluation score based on the data evaluation profile.

Example 17. The computing apparatus of example 16, wherein the one or more processors are further configured to: determine a target ratio for an evaluation feature of the one or more evaluation features; generate a synthetic dataset for the evaluation feature based on the target ratio and the data evaluation profile, wherein the synthetic dataset comprises a plurality of synthetic data objects each comprising at least one feature value from one or more defined feature values of the evaluation feature; and generate the data evaluation score based on the synthetic dataset.

Example 18. The computing apparatus of any of examples 14 through 17, wherein: (i) the target machine learning model is previously trained to generate a plurality of predictive outputs for a plurality of input data objects, (ii) each of the plurality of predictive outputs correspond to a positive output class or a negative output class, and (iii) the decision evaluation score is based on one or more counterfactual proposals for one or more of the plurality of predictive outputs that correspond to the negative output class.

Example 19. One or more non-transitory computer-readable storage media including instructions that, when executed by one or more processors, cause the one or more processors to: generate a holistic evaluation vector for a target machine learning model based on a plurality of evaluation scores for the target machine learning model, wherein the plurality of evaluation scores comprises: (i) a data evaluation score corresponding to a training dataset for the target machine learning model, (ii) a model evaluation score corresponding to one or more performance metrics for the target machine learning model, and (iii) a decision evaluation score corresponding to an output class of the target machine learning model; generate a holistic evaluation score for the target machine learning model based on an aggregation of the holistic evaluation vector; and provide an evaluation output for the target machine learning model based on the holistic evaluation score.

Example 20. The one or more non-transitory computer-readable storage media of example 19, wherein the instructions further cause the one or more processors to: (i) the training dataset comprises a plurality of input data objects and a plurality of input features, (ii) the plurality of input features comprises one or more evaluation features, (iii) the plurality of input data objects comprises one or more evaluation data object sets, (iv) each evaluation data object set comprises one or more input data objects that each comprise a particular feature value of an evaluation feature, and (v) the model evaluation score is based on a comparison between at least two of the one or more evaluation data object sets.

Example 21. A computer-implemented method comprising: generating, by one or more processors and using a target graph model, a predictive representation for a graph node of a graph training dataset; generating, by the one or more processors and using a feature prediction model, one or more predicted feature values for the graph node based on the predictive representation; generating, by the one or more processors, a data evaluation score for the graph training dataset based on the one or more predicted feature values; generating, by the one or more processors and using the target graph model, a predictive output for the graph node based on the predictive representation, wherein the predictive output comprises a node classification for the graph node, wherein the one or more predicted feature values correspond to one or more evaluation features of the graph training dataset, and wherein the target graph model is previously trained to generate an evaluation feature-agnostic predictive representation that at least partially prevents the target graph model from generating the predictive output based on the one or more evaluation features; and generating, by the one or more processors, an evaluation output for the target graph model based on the data evaluation score and the predictive output.

Example 22. The computer-implemented method of example 21, wherein the target graph model comprises a first graph neural network (GNN) and the feature prediction model comprises a second GNN.

Example 23. The computer-implemented method of examples 21 or 22, wherein the target graph model and the feature prediction model are jointly trained using a joint objective function.

Example 24, The computer-implemented method of example 23, wherein: the joint objective function comprises a first objective function and a second objective function, the first objective function comprises a first optimization function for the target graph model, and the second objective function comprises a second optimization function for the feature prediction model.

Example 25. The computer-implemented method of example 24, wherein the first objective function comprises a comparison between a predictive output of the target graph model and a ground truth label for the graph node.

Example 26. The computer-implemented method of any of examples 21 through 25, wherein the predictive representation comprises a feature embedding that encodes one or more features of the graph node and one or more adjacent features of one or more neighboring nodes of the graph node in the graph training dataset.

Example 27. The computer-implemented method of example 26, wherein the one or more neighboring nodes of the graph node comprise one or more nodes of the graph training dataset that are connected to the graph node by one or more edges.

Example 28. The computer-implemented method of any of examples 21 through 27, wherein the data evaluation score is based on a graph feature confidence score indicative of a predicted accuracy of the one or more predicted feature values.

Example 29. The computer-implemented method of example 28, wherein the graph feature confidence score is based on a predicted feature confidence score indicative of a confidence level for the one or more predicted feature values.

Example 30. The computer-implemented method of example 29, wherein the predicted feature confidence score is generated by the feature prediction model.

Example 31. A computing apparatus comprising memory and one or more processors communicatively coupled to the memory, the one or more processors configured to: generate, using a target graph model, a predictive representation for a graph node of a graph training dataset; generate, using a feature prediction model, one or more predicted feature values for the graph node based on the predictive representation; generate data evaluation score for the graph training dataset based on the one or more predicted feature values; generate, using the target graph model, a predictive output for the graph node based on the predictive representation, wherein the predictive output comprises a node classification for the graph node, wherein the one or more predicted feature values correspond to one or more evaluation features of the graph training dataset, and wherein the target graph model is previously trained to generate an evaluation feature-agnostic predictive representation that at least partially prevents the target graph model from generating the predictive output based on the one or more evaluation features; and generate an evaluation output for the target graph model based on the data evaluation score and the predictive output.

Example 32. The computing apparatus of example 31, wherein the target graph model comprises a first graph neural network (GNN) and the feature prediction model comprises a second GNN.

Example 33. The computing apparatus of examples 31 or 32, wherein the target graph model and the feature prediction model are jointly trained using a joint objective function.

Example 34. The computing apparatus of example 33, wherein: the joint objective function comprises a first objective function and a second objective function, the first objective function comprises a first optimization function for the target graph model, and the second objective function comprises a second optimization function for the feature prediction model.

Example 35. The computing apparatus of example 34, wherein the first objective function comprises a comparison between the predictive output generated by the target graph model and a ground truth label for the graph node.

Example 36. One or more non-transitory computer-readable storage media including instructions that, when executed by one or more processors, cause the one or more processors to: generate, using a target graph model, a predictive representation for a graph node of a graph training dataset; generate, using a feature prediction model, one or more predicted feature values for the graph node based on the predictive representation; generate data evaluation score for the graph training dataset based on the one or more predicted feature values; generate, using the target graph model, a predictive output for the graph node based on the predictive representation, wherein the predictive output comprises a node classification for the graph node, wherein the one or more predicted feature values correspond to one or more evaluation features of the graph training dataset, and wherein the target graph model is previously trained to generate an evaluation feature-agnostic predictive representation that at least partially prevents the target graph model from generating the predictive output based on the one or more evaluation features; and generate an evaluation output for the target graph model based on the data evaluation score and the predictive output.

Example 37. The one or more non-transitory computer-readable storage media of example 36, wherein the predictive representation comprises a feature embedding that encodes one or more features of the graph node and one or more adjacent features of one or more neighboring nodes of the graph node in the graph training dataset.

Example 38. The one or more non-transitory computer-readable storage media of examples 36 or 37, wherein the target graph model comprises a first graph neural network (GNN) and the feature prediction model comprises a second GNN.

Example 39. The one or more non-transitory computer-readable storage media of any of examples 36 through 38, wherein the target graph model and the feature prediction model are jointly trained using a joint objective function.

Example 40. The one or more non-transitory computer-readable storage media of example 39, wherein: the joint objective function comprises a first objective function and a second objective function, the first objective function comprises a first optimization function for the target graph model, and the second objective function comprises a second optimization function for the feature prediction model.

Example 41. A computer-implemented method comprising: receiving, by one or more processors, a request to process an input data object with a target machine learning model, wherein the target machine learning model is previously trained using a training dataset comprising a plurality of synthetic data objects and a plurality of historical data objects; identifying, by the one or more processors, a synthetic data object of the plurality of synthetic data objects that corresponds to the input data object based on one or more corresponding input feature values shared by the synthetic data object and the input data object; and in response to identifying the synthetic data object: modifying, by the one or more processors, a holistic evaluation score for the target machine learning model, initiating, by the one or more processors, the performance of a labeling process for assigning a ground truth label to the input data object, and augmenting, by the one or more processors, a supplemental training dataset with the input data object and the ground truth label.

Example 42. The computer-implemented method of example 41 further comprising: identifying a performance degradation for the target machine learning model based on the holistic evaluation score for the target machine learning model; identifying an influencing feature value corresponding to the performance degradation; modifying the target machine learning model based on the influencing feature value; and determining an updated holistic evaluation score for the target machine learning model.

Example 43. The computer-implemented method of example 42, wherein the influencing feature value is based on one or more counterfactual proposals for a plurality of predictive outputs generated by the target machine learning model.

Example 44. The computer-implemented method of any of examples 41 through 43, wherein modifying the holistic evaluation score comprises reducing the holistic evaluation score.

Example 45. The computer-implemented method of any of examples 41 through 44 further comprising: detecting a threshold augmentation stimulus based on the supplemental training dataset; and in response to the threshold augmentation stimulus, generating an augmented training dataset by augmenting the training dataset with the supplemental training dataset.

Example 46. The computer-implemented method of example 45, wherein the one or more corresponding input feature values are associated with an evaluation feature of the training dataset, wherein the plurality of synthetic data objects comprise one or more synthetic data objects associated with the evaluation feature, and wherein augmenting the training dataset comprises: replacing the one or more synthetic data objects with the supplemental training dataset.

Example 47. The computer-implemented method of any of examples 45 or 46 further comprising: identifying a performance degradation for the target machine learning model based on the holistic evaluation score for the target machine learning model; and in response to the performance degradation, modifying the target machine learning model based on the augmented training dataset.

Example 48. The computer-implemented method of any of examples 45 through 47, wherein the threshold augmentation stimulus is based on a threshold number of supplemental input data objects in the supplemental training dataset.

Example 49. A computing apparatus comprising memory and one or more processors communicatively coupled to the memory, the one or more processors configured to: receive a request to process an input data object with a target machine learning model, wherein the target machine learning model is previously trained using a training dataset comprising a plurality of synthetic data objects and a plurality of historical data objects; identify a synthetic data object of the plurality of synthetic data objects that corresponds to the input data object based on one or more corresponding input feature values shared by the synthetic data object and the input data object; and in response to identifying the synthetic data object: modify a holistic evaluation score for the target machine learning model, initiate the performance of a labeling process for assigning a ground truth label to the input data object, and augment a supplemental training dataset with the input data object and the ground truth label.

Example 50. The computing apparatus of example 49, wherein the one or more processors are further configured to: identify a performance degradation for the target machine learning model based on the holistic evaluation score for the target machine learning model; identify an influencing feature value corresponding to the performance degradation; modify the target machine learning model based on the influencing feature value; and determine an updated holistic evaluation score for the target machine learning model.

Example 51. The computing apparatus of example 50, wherein the influencing feature value is based on one or more counterfactual proposals for a plurality of predictive outputs generated by the target machine learning model.

Example 52. The computing apparatus of any of examples 49 through 51, wherein modifying the holistic evaluation score comprises reducing the holistic evaluation score.

Example 53. The computing apparatus of any of examples 49 through 52, wherein the one or more processors are further configured to: detect a threshold augmentation stimulus based on the supplemental training dataset; and in response to the threshold augmentation stimulus, generate an augmented training dataset by augmenting the training dataset with the supplemental training dataset.

Example 54. The computing apparatus of example 53, wherein the one or more corresponding input feature values are associated with an evaluation feature of the training dataset, wherein the plurality of synthetic data objects comprise one or more synthetic data objects associated with the evaluation feature, and wherein augmenting the training dataset comprises: replacing the one or more synthetic data objects with the supplemental training dataset.

Example 55. The computing apparatus of examples 54 or 55, wherein the one or more processors are further configured to: identify a performance degradation for the target machine learning model based on the holistic evaluation score for the target machine learning model; and in response to the performance degradation, modify the target machine learning model based on the augmented training dataset.

Example 56. The computing apparatus of any of examples 53 through 55, wherein the threshold augmentation stimulus is based on a threshold number of supplemental input data objects in the supplemental training dataset.

Example 57. One or more non-transitory computer-readable storage media including instructions that, when executed by one or more processors, cause the one or more processors to: receive a request to process an input data object with a target machine learning model, wherein the target machine learning model is previously trained using a training dataset comprising a plurality of synthetic data objects and a plurality of historical data objects; identify a synthetic data object of the plurality of synthetic data objects that corresponds to the input data object based on one or more corresponding input feature values shared by the synthetic data object and the input data object; and in response to identifying the synthetic data object: modify a holistic evaluation score for the target machine learning model, initiate the performance of a labeling process for assigning a ground truth label to the input data object, and augment a supplemental training dataset with the input data object and the ground truth label.

Example 58. The one or more non-transitory computer-readable storage media of example 57, wherein the instructions further cause the one or more processors to: identify a performance degradation for the target machine learning model based on the holistic evaluation score for the target machine learning model; identify an influencing feature value corresponding to the performance degradation; modify the target machine learning model based on the influencing feature value; and determine an updated holistic evaluation score for the target machine learning model.

Example 59. The one or more non-transitory computer-readable storage media of example 58, wherein the influencing feature value is based on one or more counterfactual proposals for a plurality of predictive outputs generated by the target machine learning model.

Example 60. The one or more non-transitory computer-readable storage media of any of examples 57 through 59, wherein modifying the holistic evaluation score comprises reducing the holistic evaluation score.

The invention claimed is:

1. A computer-implemented method comprising:

generating, by one or more processors and using a target graph model, a predictive representation for a graph node of a graph training dataset;

generating, by the one or more processors and using a feature prediction model, one or more predicted feature values for the graph node based on the predictive representation;

generating, by the one or more processors, a data evaluation score for the graph training dataset based on the one or more predicted feature values, wherein the data evaluation score is based on a graph feature confidence score indicative of a predicted accuracy of the one or more predicted feature values;

generating, by the one or more processors and using the target graph model, a predictive output for the graph node based on the predictive representation, wherein (i) the predictive output comprises a node classification for the graph node, (ii) the one or more predicted feature values correspond to one or more evaluation features of the graph training dataset, and (iii) the target graph model is previously trained to generate an evaluation feature-agnostic predictive representation that at least partially prevents the target graph model from generating the predictive output based on the one or more evaluation features; and generating, by the one or more processors, an evaluation output for the target graph model based on the data evaluation score and the predictive output.

2. The computer-implemented method of claim 1, wherein the target graph model comprises a first graph neural network (GNN) and the feature prediction model comprises a second GNN.

3. The computer-implemented method of claim 1, wherein the target graph model and the feature prediction model are jointly trained using a joint objective function.

4. The computer-implemented method of claim 3, wherein:

the joint objective function comprises a first objective function and a second objective function, the first objective function comprises a first optimization function for the target graph model, and the second objective function comprises a second optimization function for the feature prediction model.

5. The computer-implemented method of claim 4, wherein the first objective function comprises a comparison between the predictive output of the target graph model and a ground truth label for the graph node.

6. The computer-implemented method of claim 1, wherein the predictive representation comprises a feature embedding that encodes one or more features of the graph node and one or more adjacent features of one or more neighboring nodes of the graph node in the graph training dataset.

7. The computer-implemented method of claim 6, wherein the one or more neighboring nodes of the graph node comprise one or more nodes of the graph training dataset that are connected to the graph node by one or more edges.

8. The computer-implemented method of claim 1, wherein the graph feature confidence score is based on a predicted feature confidence score indicative of a confidence level for the one or more predicted feature values.

9. The computer-implemented method of claim 8, wherein the predicted feature confidence score is generated by the feature prediction model.

10. A system comprising:

one or more processors; and at least one memory storing processor-executable instructions that, when executed by the one or more processors, cause the one or more processors to:

generate, using a target graph model, a predictive representation for a graph node of a graph training dataset;

generate, using a feature prediction model, one or more predicted feature values for the graph node based on the predictive representation;

generate data evaluation score for the graph training dataset based on the one or more predicted feature values, wherein the data evaluation score is based on a graph feature confidence score indicative of a predicted accuracy of the one or more predicted feature values;

generate, using the target graph model, a predictive output for the graph node based on the predictive representation, wherein the predictive output comprises a node classification for the graph node, wherein the one or more predicted feature values correspond to one or more evaluation features of the graph training dataset, and wherein the target graph model is previously trained to generate an evaluation feature-agnostic predictive representation that at least partially prevents the target graph model from generating the predictive output based on the one or more evaluation features; and generate an evaluation output for the target graph model based on the data evaluation score and the predictive output.

11. The system of claim 10, wherein the target graph model comprises a first graph neural network (GNN) and the feature prediction model comprises a second GNN.

12. The system of claim 10, wherein the target graph model and the feature prediction model are jointly trained using a joint objective function.

13. The system of claim 12, wherein:

the joint objective function comprises a first objective function and a second objective function, the first objective function comprises a first optimization function for the target graph model, and the second objective function comprises a second optimization function for the feature prediction model.

14. The system of claim 13, wherein the first objective function comprises a comparison between the predictive output generated by the target graph model and a ground truth label for the graph node.

15. The system of claim 10, wherein the graph feature confidence score is based on a predicted feature confidence score indicative of a confidence level for the one or more predicted feature values.

16. One or more non-transitory computer-readable storage media including instructions that, when executed by one or more processors, cause the one or more processors to:

generate, using a target graph model, a predictive representation for a graph node of a graph training dataset;

generate, using a feature prediction model, one or more predicted feature values for the graph node based on the predictive representation;

generate data evaluation score for the graph training dataset based on the one or more predicted feature values, wherein the data evaluation score is based on a graph feature confidence score indicative of a predicted accuracy of the one or more predicted feature values;

generate, using the target graph model, a predictive output for the graph node based on the predictive representation, wherein the predictive output comprises a node classification for the graph node, wherein the one or more predicted feature values correspond to one or more evaluation features of the graph training dataset, and wherein the target graph model is previously trained to generate an evaluation feature-agnostic predictive representation that at least partially prevents the target graph model from generating the predictive output based on the one or more evaluation features; and generate an evaluation output for the target graph model based on the data evaluation score and the predictive output.

17. The one or more non-transitory computer-readable storage media of claim 16, wherein the predictive representation comprises a feature embedding that encodes one or more features of the graph node and one or more adjacent features of one or more neighboring nodes of the graph node in the graph training dataset.

18. The one or more non-transitory computer-readable storage media of claim 16, wherein the target graph model comprises a first graph neural network (GNN) and the feature prediction model comprises a second GNN.

19. The one or more non-transitory computer-readable storage media of claim 16, wherein the target graph model and the feature prediction model are jointly trained using a joint objective function.

20. The one or more non-transitory computer-readable storage media of claim 19, wherein:

the joint objective function comprises a first objective function and a second objective function, the first objective function comprises a first optimization function for the target graph model, and the second objective function comprises a second optimization function for the feature prediction model.

* * * * *